US008473858B2

(12) United States Patent
Buchanan et al.

(10) Patent No.: US 8,473,858 B2
(45) Date of Patent: Jun. 25, 2013

(54) GRAPH VIEWER DISPLAYING PREDICTED ACCOUNT BALANCES AND EXPENDITURES

(75) Inventors: James Brooks Buchanan, Surrey (GB); Rosie Susan Corvo, Mooresville, NC (US); Gregory S. Phillips, Cheshire (GB); Mark Colin Pratt, Cheshire (GB); Julia Claire Richardson, Cheshire (GB); Susan Claire Daun, Buckinghamshire (GB); Paul Robert Wood, Surrey (GB); Crispin Alexander Conrad Jameson, London (GB); Timothy Adam Brennan, London (GB)

(73) Assignee: Bank of America Corporation, Charlotte, NC (US)

( * ) Notice: Subject to any disclaimer, the term of this patent is extended or adjusted under 35 U.S.C. 154(b) by 426 days.

(21) Appl. No.: 12/533,290

(22) Filed: Jul. 31, 2009

(65) Prior Publication Data

US 2011/0087985 A1    Apr. 14, 2011

Related U.S. Application Data

(60) Provisional application No. 61/196,452, filed on Oct. 16, 2008.

(51) Int. Cl.
G06F 3/048      (2006.01)
G07F 7/10       (2006.01)
G07F 19/00      (2006.01)
G06Q 40/00      (2012.01)

(52) U.S. Cl.
USPC ........... 715/771; 715/784; 715/786; 715/962; 705/42; 705/33; 705/35

(58) Field of Classification Search
USPC .... 715/784, 786, 833, 801, 771, 962; 705/33, 705/42
See application file for complete search history.

(56) References Cited

U.S. PATENT DOCUMENTS 7,165,227 B2 *  1/2007  Ubillos ................. 715/784
7,194,426 B1    3/2007  Box
(Continued)

FOREIGN PATENT DOCUMENTS

WO    WO 02/17198 A1    2/2002
WO    WO 02/19229 A2    3/2002

OTHER PUBLICATIONS

"2-D Graphics", Mar. 21, 1998, retreived from http://stuff.mit.edu/afs/sipb/project/www/matlab/imatlab/node16.html on Mar. 2, 2012.*

(Continued)

Primary Examiner — Kieu Vu
Assistant Examiner — Aaron Lowenberger
(74) Attorney, Agent, or Firm — Michael A. Springs; Moore & Van Allen, PLLC; Padowithz Alce

(57) ABSTRACT

Embodiments of the invention provide apparatuses and methods for providing a graphical user interface on the display device, where the graphical user interface includes a graph viewing tool for charting data. The graph viewing tool includes: (a) a first display area displaying a first axis and a second axis of a graph, the first axis representing a first parameter of the data over a first range of values; (b) a second display area displaying a third axis representing the first parameter over a second range of values; and (c) a first tool and a second tool displayed in the second display area proximate the third axis, wherein the first tool and the second tool are configured such that they can be moved relative to each other and relative to the third axis to increase or decrease the first range of values displayed along the first axis in the first display area.

25 Claims, 54 Drawing Sheets

U.S. PATENT DOCUMENTS

| | | | |
|---|---|---|---|
| 7,353,462 | B2 | 4/2008 | Caffarelli |
| 2002/0130868 | A1 | 9/2002 | Smith |
| 2002/0154173 | A1* | 10/2002 | Etgen et al. ................ 345/833 |
| 2003/0009402 | A1* | 1/2003 | Mullen et al. ................ 705/35 |
| 2003/0112234 | A1 | 6/2003 | Brown et al. |
| 2004/0010587 | A1* | 1/2004 | Altamirano et al. .......... 709/224 |
| 2005/0086612 | A1 | 4/2005 | Gettman et al. |
| 2005/0167487 | A1 | 8/2005 | Conlon et al. |
| 2006/0020530 | A1 | 1/2006 | Hsu et al. |
| 2006/0020538 | A1 | 1/2006 | Ram et al. |
| 2006/0235777 | A1 | 10/2006 | Takata |
| 2007/0027736 | A1 | 2/2007 | Reynolds et al. |
| 2007/0038543 | A1 | 2/2007 | Weinstein |
| 2007/0050276 | A1 | 3/2007 | Mannion |
| 2007/0168267 | A1 | 7/2007 | Zimmerman et al. |
| 2007/0203816 | A1* | 8/2007 | Costache et al. ............. 705/35 |
| 2007/0262140 | A1 | 11/2007 | Long, Sr. |
| 2007/0265954 | A1 | 11/2007 | Mather et al. |
| 2008/0000965 | A1 | 1/2008 | Zellner et al. |
| 2008/0086402 | A1 | 4/2008 | Patel et al. |
| 2009/0112932 | A1* | 4/2009 | Skierkowski et al. ..... 707/104.1 |
| 2009/0193353 | A1* | 7/2009 | Sharp et al. ................ 715/784 |

OTHER PUBLICATIONS

International Search Report and the Written Opinion of the International Searching Authority mailed Nov. 16, 2009 for International Application No. PCT/US 09/59567.

International Search Report and the Written Opinion of the International Searching Authority mailed Nov. 17, 2009 for International Application No. PCT/US 09/59578.

International Search Report and the Written Opinion of the International Searching Authority mailed Nov. 18, 2009 for International Application No. PCT/US 09/59562.

International Search Report and the Written Opinion of the International Searching Authority mailed Nov. 25, 2009 for International Application No. PCT/US2009/059572.

International Search Report and the Written Opinion of the International Searching Authority mailed Nov. 25, 2009 for International Application No. PCT/US 09/59568.

International Search Report and the Written Opinion of the International Searching Authority mailed Dec. 3, 2009 for International Application No. PCT/US2009/059555.

REUTERS. Capital One Allows Customers to Add Personalized Image on Their Cards. Jan. 8, 2008. [retrieved on Nov. 17, 2009]. Retrieved from the internet: http://www.reuters.com/article/pressRelease/idUS129573+08-Jan-2008+BW20080108 (2 pages total).

Utility U.S. Appl. No. 12/533,273, filed Jul. 31, 2009.
Utility U.S. Appl. No. 12/533,281, filed Jul. 31, 2009.
Utility U.S. Appl. No. 12/533,283, filed Jul. 31, 2009.
Utility U.S. Appl. No. 12/533,286, filed Jul. 31, 2009.
Utility U.S. Appl. No. 12/533,289, filed Jul. 31, 2009.
Examination Report for British Application No. GB1108089.2 dated May 1, 2012.

* cited by examiner

GRAPH VIEWER DISPLAYING PREDICTED ACCOUNT BALANCES AND EXPENDITURES

CROSS REFERENCE TO RELATED APPLICATIONS

This application claims benefit of priority under 35 U.S.C. §119(e) to the filing date of U.S. Provisional Application No. 61/196,452, as filed on Oct. 16, 2008, which is incorporated herein by reference in its entirety.

BACKGROUND

Financial institutions, such as banks, are constantly looking for ways to better serve their customers. In this regard, financial institutions strive to provide a customer with easy access to the customer's financial information, tools to allow the customer to analyze and manage the customer's finances effectively, and an enjoyable and intuitive experience when the customer is accessing and managing the customer's finances. The experiences that the customer encounters when interfacing with the financial institution shape the customer's perceptions and attitudes toward the financial institution which, in turn, may influence the customer's tendency to do business with the financial institution or increase the volume of business with the financial institution.

For example, most financial institutions provide websites that allow a customer to view and mange the customer's financial accounts maintained by the financial institution. Such websites allow the customer to access the customer's financial information at any time of day and from anywhere that the customer can access the internet. Although a customer may access the website of the customer's financial institution on a daily basis, these websites traditionally are quite mundane and uninviting, and do little to attract customers and distinguish one financial institution from another. There is a need for systems and methods that can improve a customer's experience and distinguish one financial institution from other financial institutions with regard to the attention paid to customer service.

SUMMARY OF ASPECTS OF THE INVENTION

Embodiments of the present invention address a financial institution's needs for improved customer service by providing a personalized online portal that integrates a customer's financial interests with the customer's other lifestyle interests in an attempt to provide the customer with a "one-stop" shop for accessing the internet and a customized online experience tailored particularly to the customer. In this regard, embodiments of the online portal described herein provide, amongst other features, improved financial planning tools, an attractive and customizable user interface, personalized merchant offers and product advertisements based specifically on the customer's financial information, tools to help integrate a customer's finances with other aspects of the customer's life, and other user-friendly and novel financial and non-financial tools.

More particularly, embodiments of the present invention attract customers to the financial institution with a number of unique financial tools that help a customer analyze his or her finances and plan for the future. For example, one aspect of the invention provides a user interface that allows a user to view data in a line graph and portions of the graph in an intuitive, user-friendly, effective, and appealing manner. Specifically, in one embodiment, a graphical user interface is provided that displays a first graph of a first portion of some data, and a second graph of a second portion of the data, where the second portion of the data includes the first portion of the data. The graphical user interface further includes a first sliding bar and a second sliding bar displayed on the second graph and configured such that a user can move the first and second sliding bars relative to each other and relative to the second graph to increase or decrease the amount of the data displayed by the first graph. Such a user interface may be particularly useful to a user when reviewing stock price histories, financial account histories, and financial projections.

More particularly, embodiments of the invention provide an apparatus having a memory, a communication interface, and a processor operatively coupled to the memory and the communication interface. The memory has data stored therein. The communication interface is configured to provide information to be displayed on a display device. The processor is configured to use the communication interface to provide a graphical user interface to be displayed on the display device, wherein the graphical user interface includes a graph viewing tool for charting data stored in the memory. The graph viewing tool includes: (a) a first display area displaying a first axis and a second axis of a graph, the first axis representing a first parameter of the data over a first range of values; (b) a second display area displaying a third axis representing the first parameter over a second range of values; and (c) a first tool and a second tool displayed in the second display area proximate the third axis, wherein the first tool and the second tool are configured such that they can be moved relative to each other and relative to the third axis to increase or decrease the first range of values displayed along the first axis in the first display area.

In one embodiment, the second range of values is greater than and includes the first range of values. In one embodiment, the third axis represents the entire range of values stored in the memory for the first parameter of the data.

In one embodiment, the graph viewing tool further includes a sliding tool displayed in the second display area that is configured to allow a user to move the first tool and the second tool simultaneously relative to the third axis while keeping a distance between the first tool and the second tool constant. The sliding tool allows the user to change the first range of values displayed along the first axis in the first display area. In one such embodiment, the first tool and the second tool may include a first bar and a second bar, respectively, perpendicular to the third axis, and the sliding tool may include a third bar parallel to the third axis. In another such embodiment, the sliding tool includes a scroll button proximate to an end of the third axis.

In one embodiment, the first tool and the second tool each include a bar perpendicular to the third axis. In one embodiment, the graph viewing tool is configured such that when the first tool and the second tool are moved toward each other, the first range of values displayed along the first axis in the first display area is decreased, and when the first tool and the second tool are moved away from each other, the first range of values displayed along the first axis in the first display area is increased.

In one embodiment, the second axis represents a second parameter of the data, and the second display area further displays a fourth axis representing the second parameter. In one such embodiment, the second axis and the fourth axis may display the same range of values for the second parameter.

In one embodiment, when the first and second tools are moved relative to each other to increase or decrease the first range of values displayed along the first axis, the range of parameters represented by the second axis changes automatically based on high and low values of the parameter in the data captured within the range of the first axis. In one embodiment, the second axis represents a second parameter of the data over a second range of values, and the graph displays a line graph of the second parameter as a function of the first parameter. In one such embodiment, the first parameter is a measure of time.

Embodiments of the invention further provide a method of displaying data. In one embodiment, the method involves providing a graphical user interface for display on a user terminal, wherein the graphical user interface comprises: (a) a first graph of a first portion of the data; (b) a second graph of a second portion of the data, the second portion of the data including the first portion of the data; and (c) a first sliding tool and a second sliding tool displayed on the second graph and configured such that a user can move the first and second sliding tools relative to each other and relative to the second graph to increase or decrease the amount of the data displayed by the first graph. The method further involves receiving an electronic communication from the user terminal indicating that a user moved the first and second sliding tools relative to each other and relative to the second graph. The method further involves using a processor to increase or decrease the amount of the data displayed by the first graph based on the user's movement of the first and second sliding tools relative to each other and relative to the second graph.

In one embodiment, the graphical user interface further includes a scrolling tool displayed on or proximate to the second graph. In such an embodiment, the method may further involve: (a) receiving an electronic communication from the user terminal indicating that a user activated the scrolling tool; and (b) using the processor to, based on the user's activation of the scrolling tool, move the first sliding tool and the second sliding tool simultaneously relative to the third axis while keeping a distance between the first sliding tool and the second sliding tool constant, and change the data displayed by the first graph. In one such embodiment, the electronic communication indicating that a user activated the scrolling tool provides an indication that the user moved the scrolling tool relative to the second graph.

In one embodiment, the electronic communication indicates that a user moved the first sliding tool and the second sliding tool toward each other. In such an embodiment, the method may further involve using the processor decrease the amount of the data displayed by the first graph based on the extent that the user moved the first and second sliding tools toward each other.

In one embodiment, the electronic communication indicates that a user moved the first sliding tool and the second sliding tool away from each other. In such an embodiment, the method may further involve using the processor increase the amount of the data displayed by the first graph based on the extent that the user moved the first and second sliding tools away from each other.

Embodiments of the invention further provide a computer program product comprising a computer-readable medium, the computer-readable medium having computer-executable program code stored therein. In one embodiment, the computer-executable program code includes a first computer-executable code portion configured to provide a graphical user interface comprising: (a) a first graph of a first portion of the data, (b) a second graph of a second portion of the data, the second portion of the data including the first portion of the data, and (c) a first sliding tool and a second sliding tool displayed on the second graph and configured such that a user can move the first and second sliding tools relative to each other and relative to the second graph to increase or decrease the amount of the data displayed by the first graph. The computer-executable code further includes a second computer-executable program code portion configured to receive a communication indicating that a user moved the first and second sliding tools relative to each other and relative to the second graph. The computer-executable code further includes a third computer-executable program code portion configured to increase or decrease the amount of the data displayed by the first graph based on the received communication indicating the user's movement of the first and second sliding tools.

Embodiments of the invention further include an apparatus having: (a) a memory having data stored therein; (b) a communication interface configured to provide information to be displayed on a display device; and (c) a processor operatively coupled to the memory and the communication interface and configured to use the communication interface to provide a graphical user interface to be displayed on the display device, wherein the graphical user interface comprises a graph viewing tool for charting data stored in the memory. The graph viewing tool includes: a first graph of a first portion of the data; a second graph of a second portion of the data, the second portion of the data including the first portion of the data; and a selection tool displayed on the second graph and configured to allow a user to select a portion of the second graph and thereby define the data displayed by the first graph.

In one embodiment, the selection tool includes a first sliding bar and a second sliding bar displayed on the second graph and configured such that a user can move the first and second sliding bars relative to each other and relative to the second graph to increase or decrease the amount of the data displayed by the first graph.

In one embodiment, the first graph and the second graph provide line graphs of monetary parameters as a function of time. In one embodiment, the first graph and the second graph chart at least one price history for at least one security. In one such embodiment, the graph viewing tool includes buttons that the user can select to show or hide one or more of a plurality of security price histories. In one embodiment, the first graph and the second graph chart assets or liabilities for a plurality of financial accounts.

In one embodiment, the graph viewing tool is configured so that the second graph is displayed beneath and lined up the first graph. In one such embodiment, the selection tool includes a first sliding bar and a second sliding bar displayed on the second graph and configured such that a user can move the first and second sliding bars relative to each other and relative to the second graph to increase or decrease the amount of the data displayed by the first graph. The first and second sliding bars are perpendicular to an axis of the first graph and the second graph, and are substantially the height of the second graph.

In one embodiment, areas of the second graph selected by the selection tool are displayed in a different color or shade of color than areas of the second graph not selected by the selection tool.

BRIEF DESCRIPTION OF THE DRAWINGS

Figure 1:
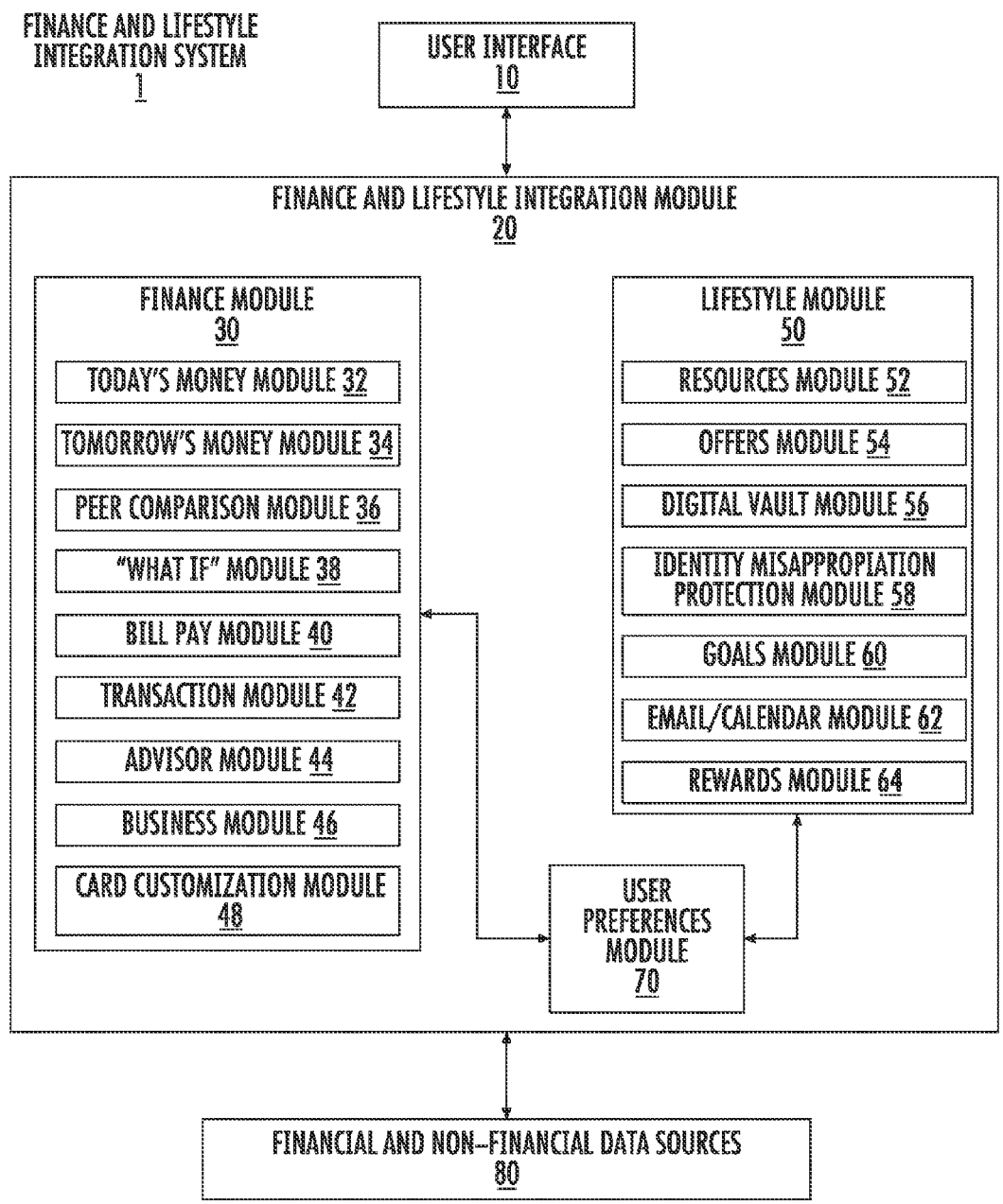
Figure 2:
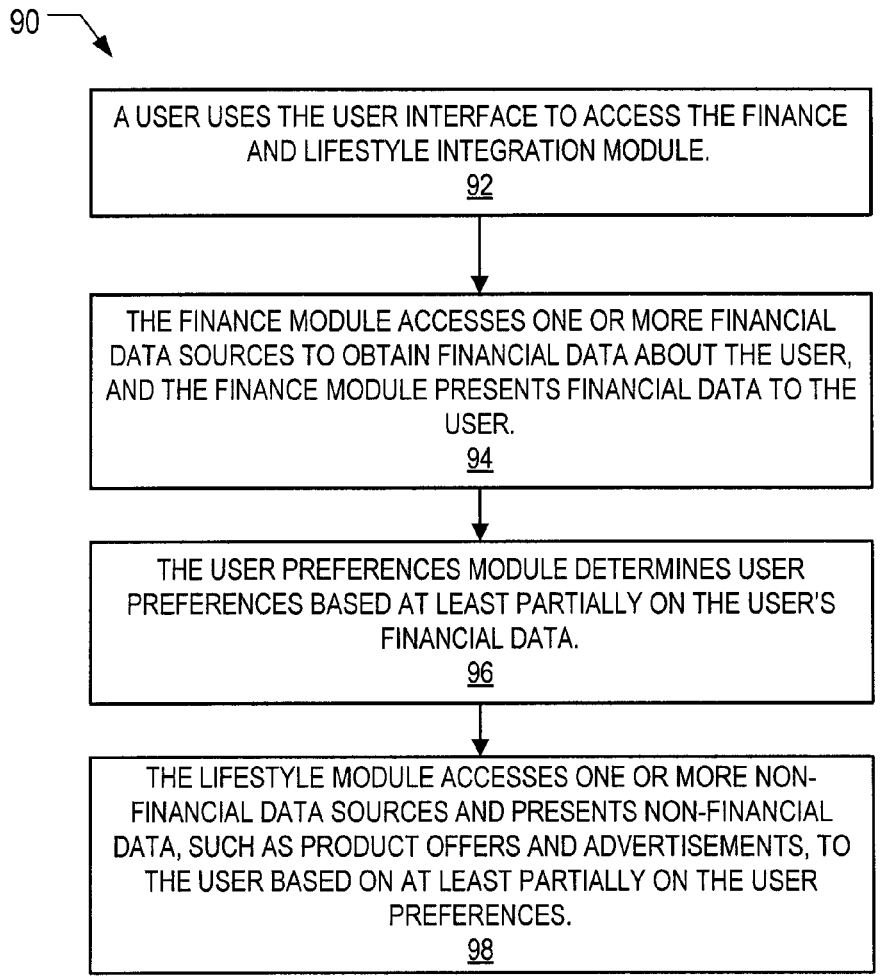
Figure 3:
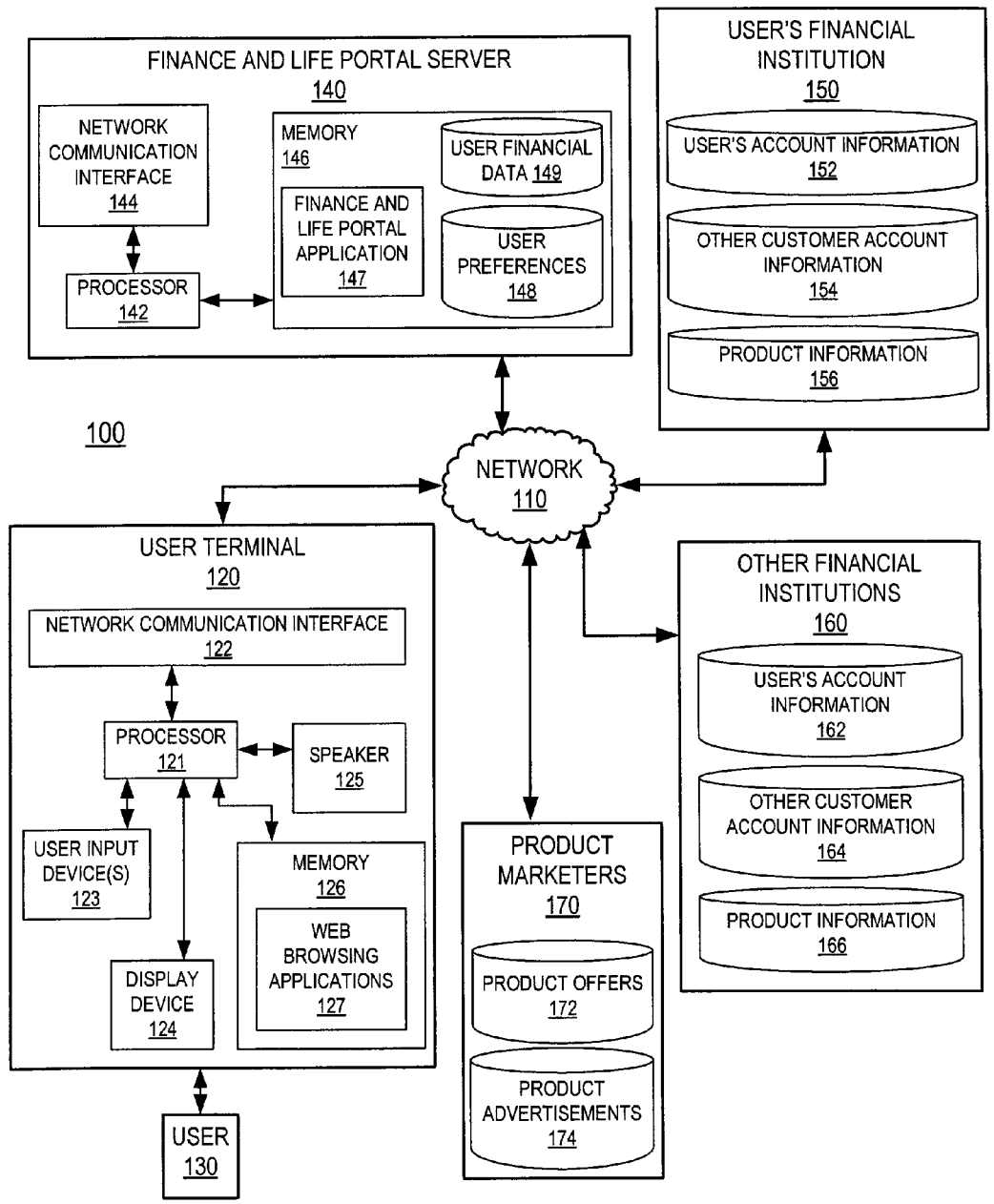
Figure 4:
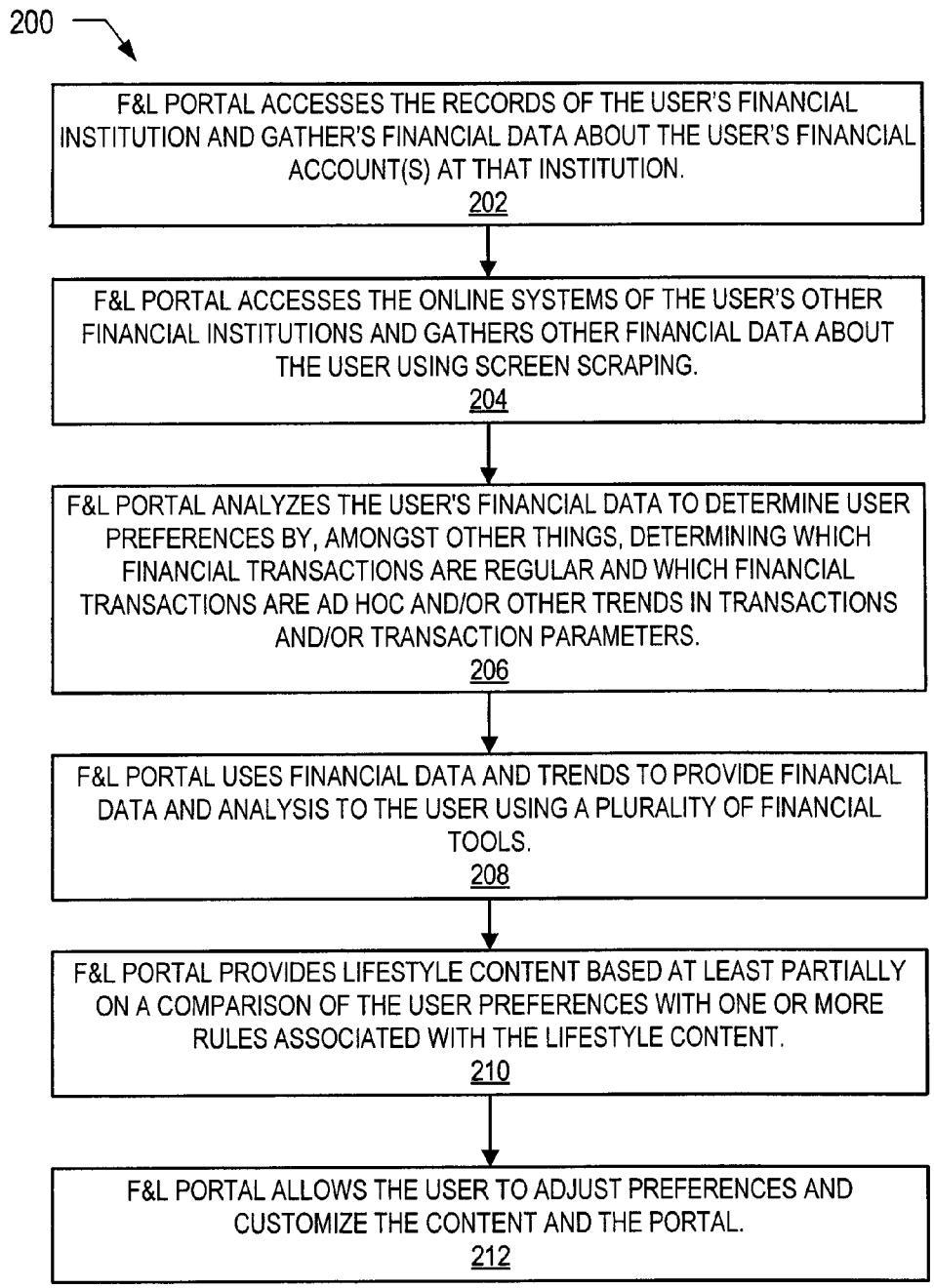
Figure 5:
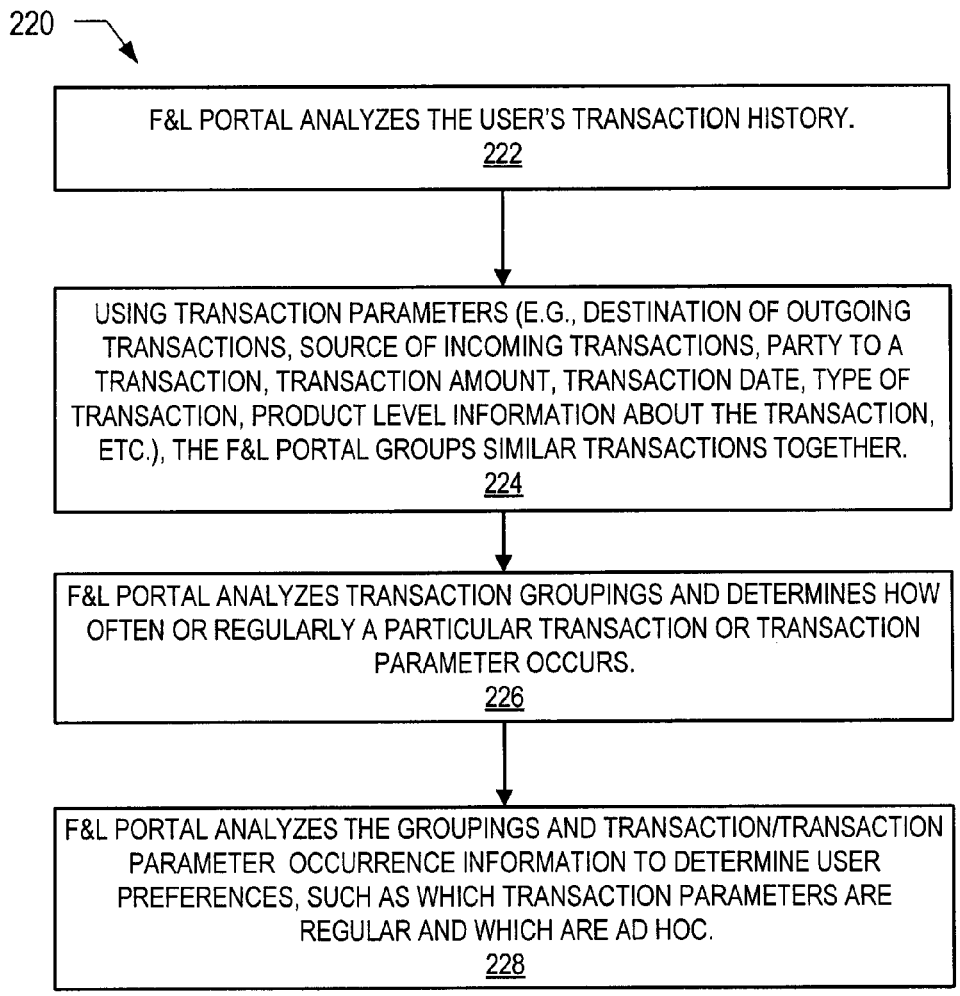
Figure 6:
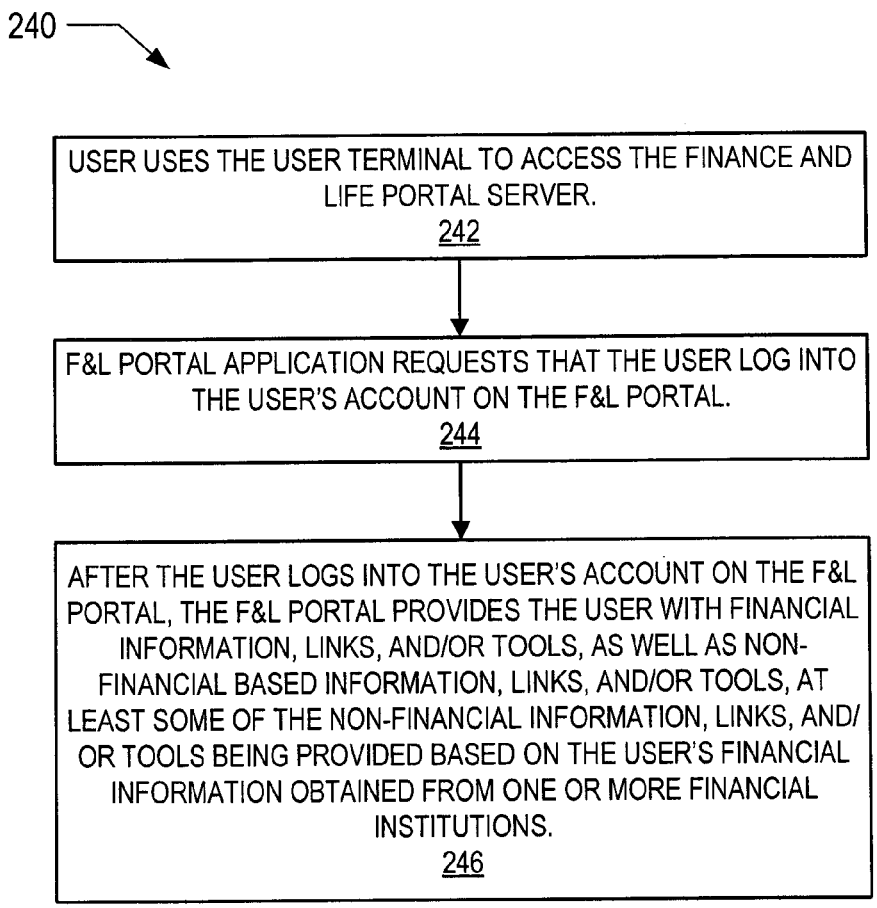
Figure 7:
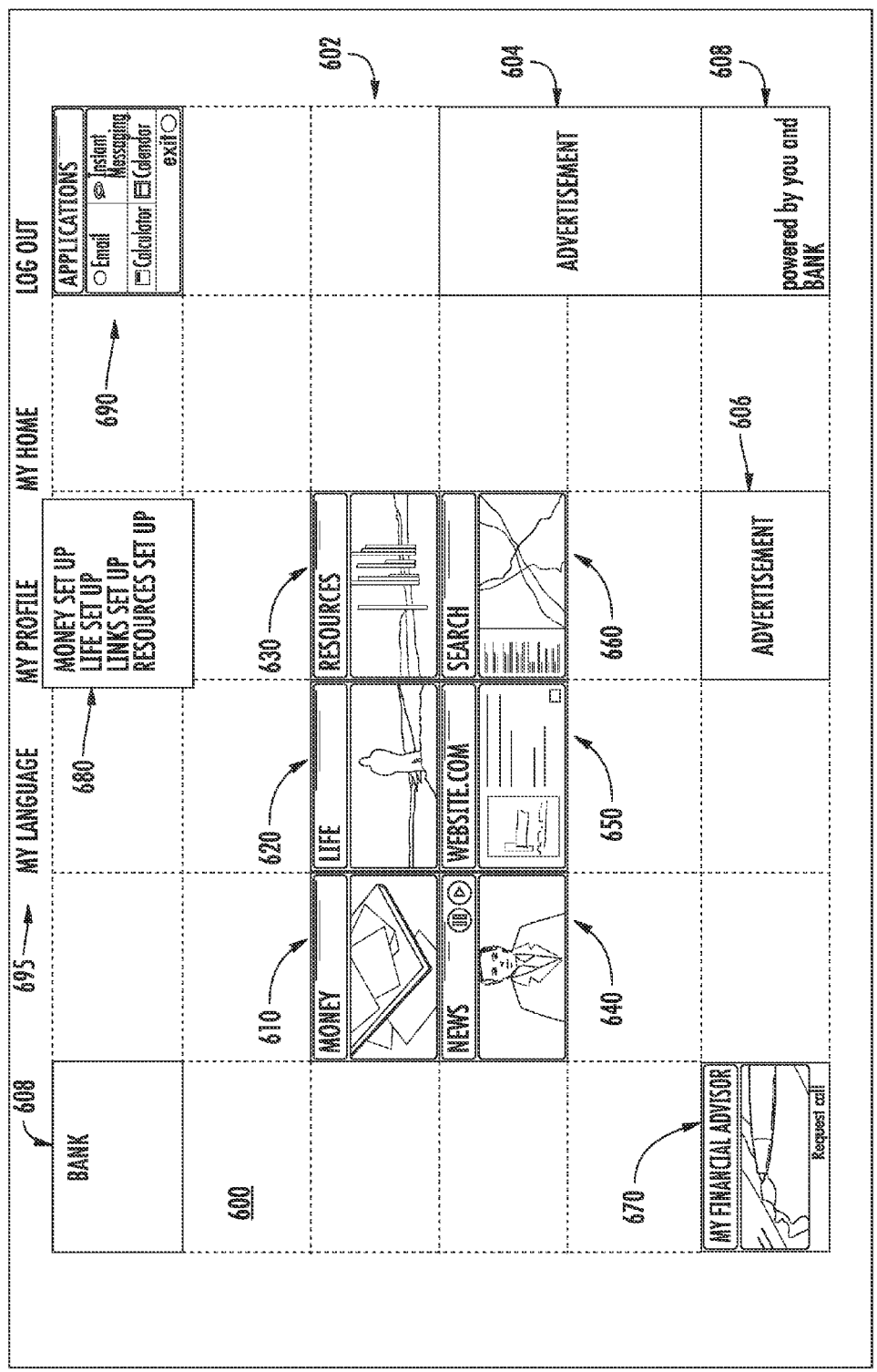
Figure 8:
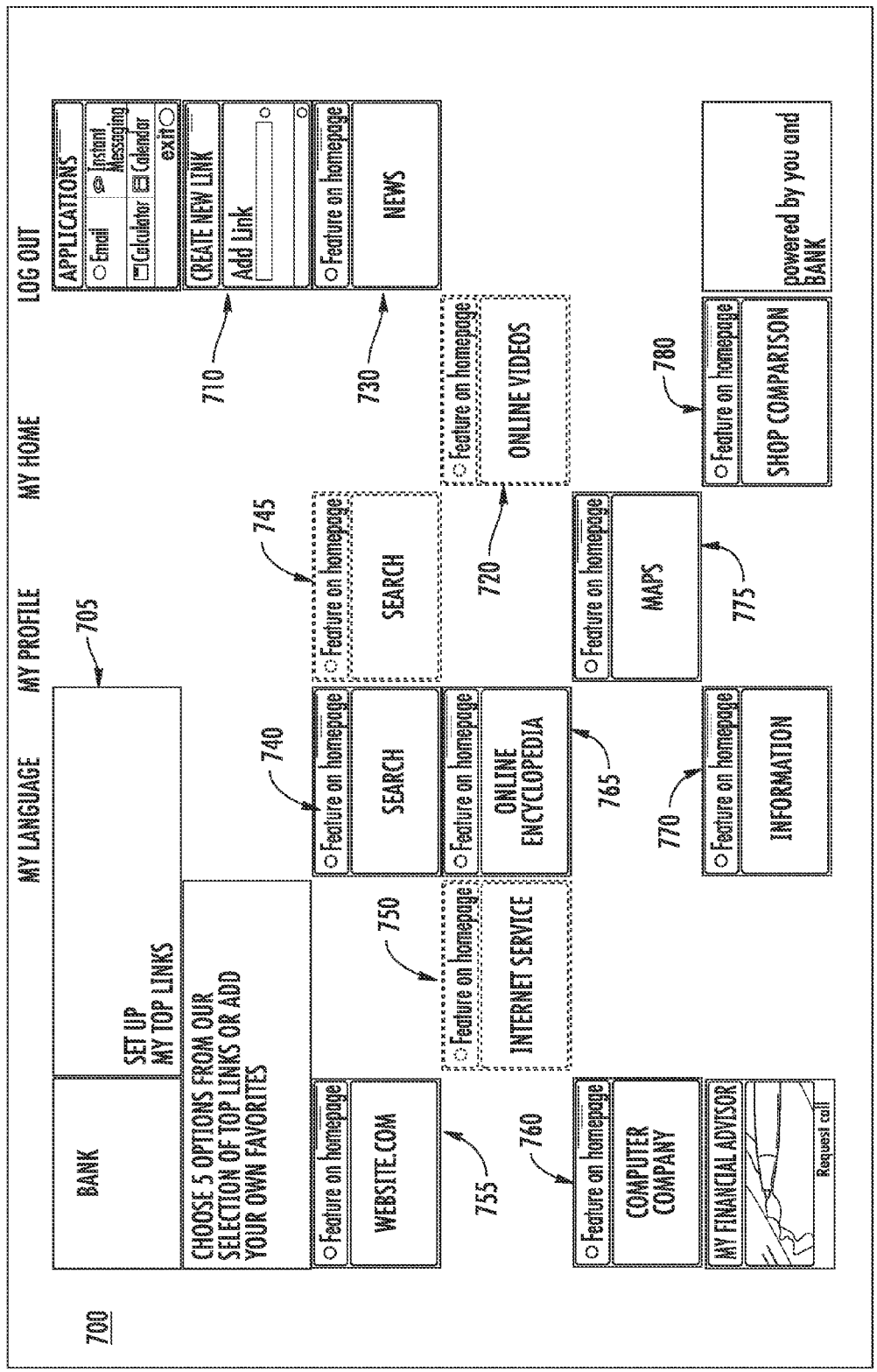
Figure 9:
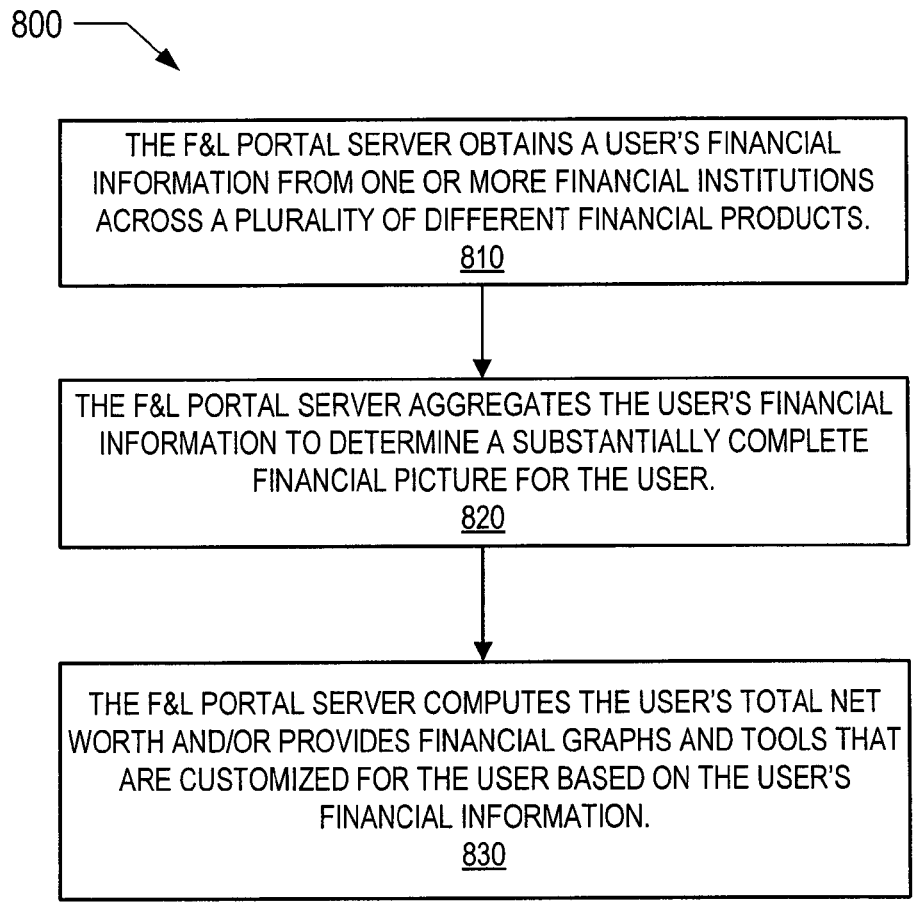
Figure 10:
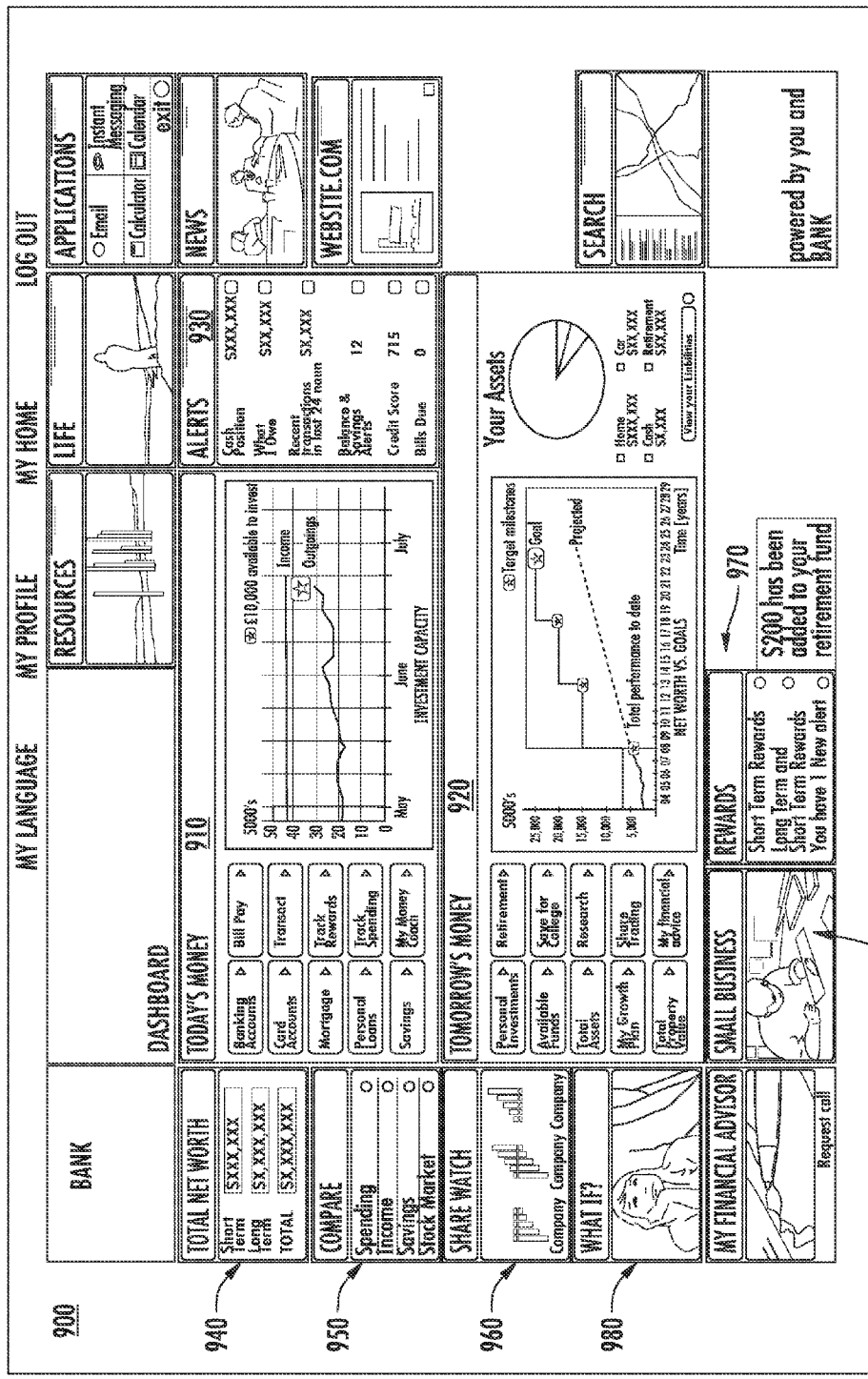
Figure 11:
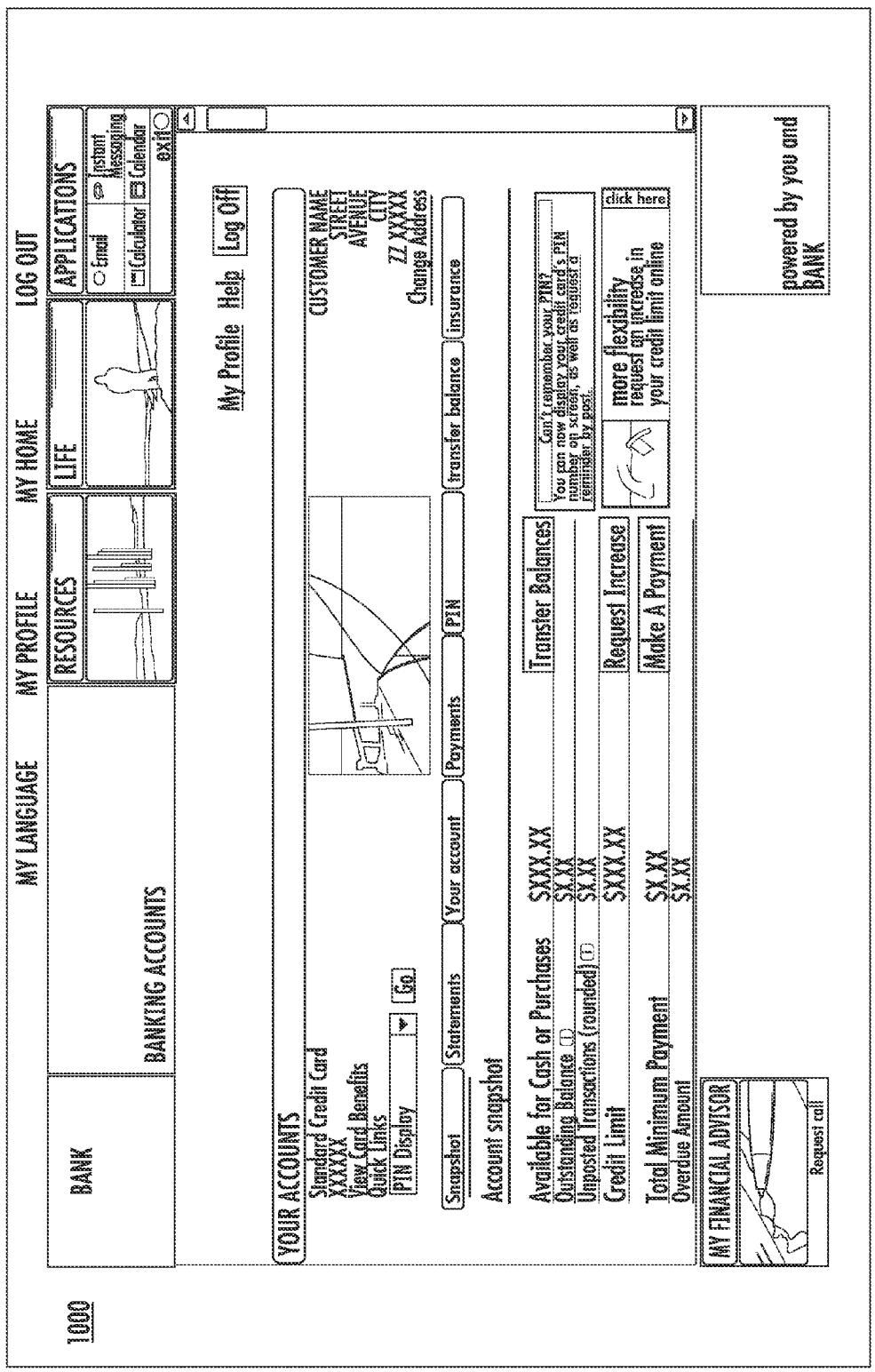
Figure 12:
Figure 13A:
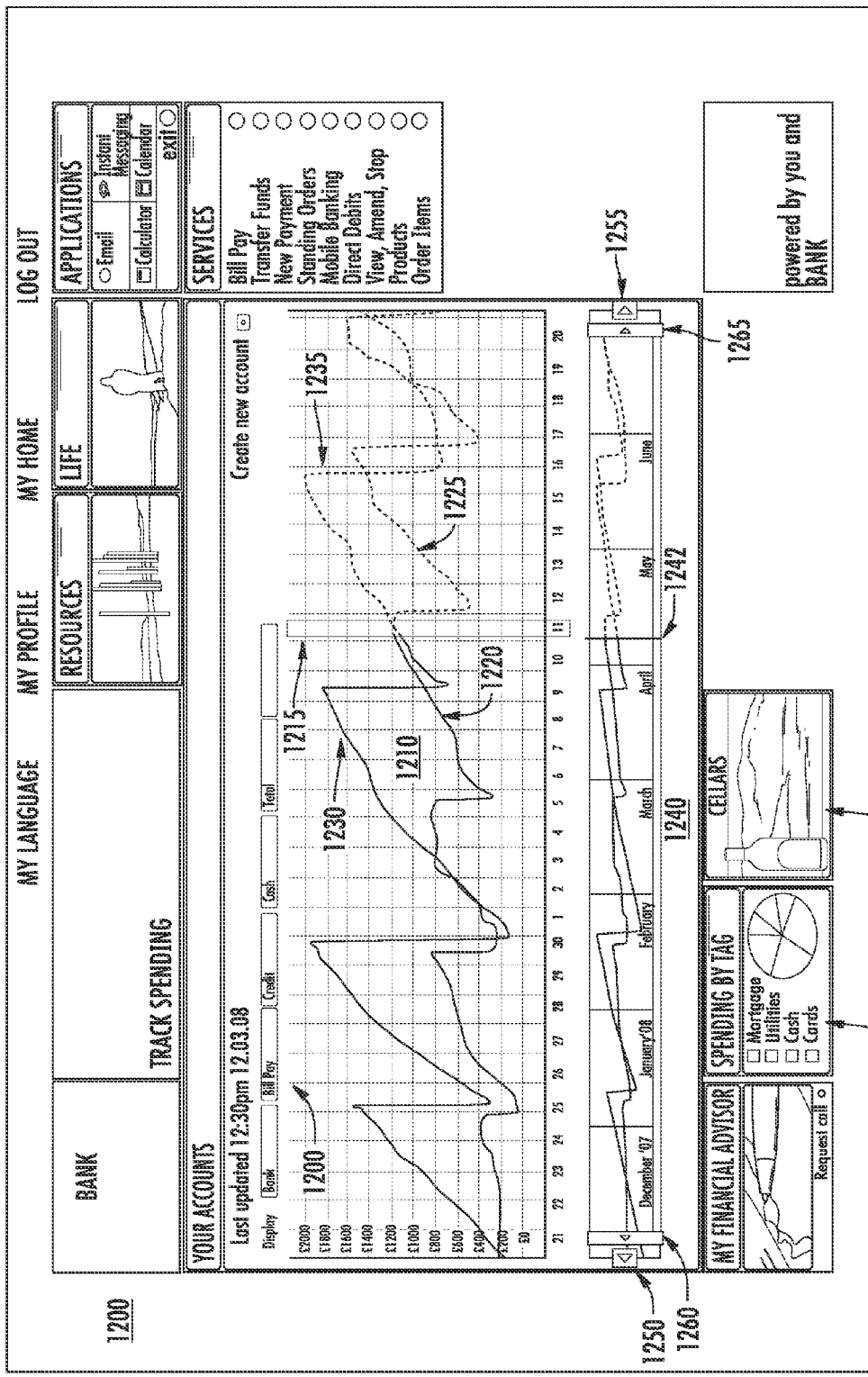
Figure 13B:
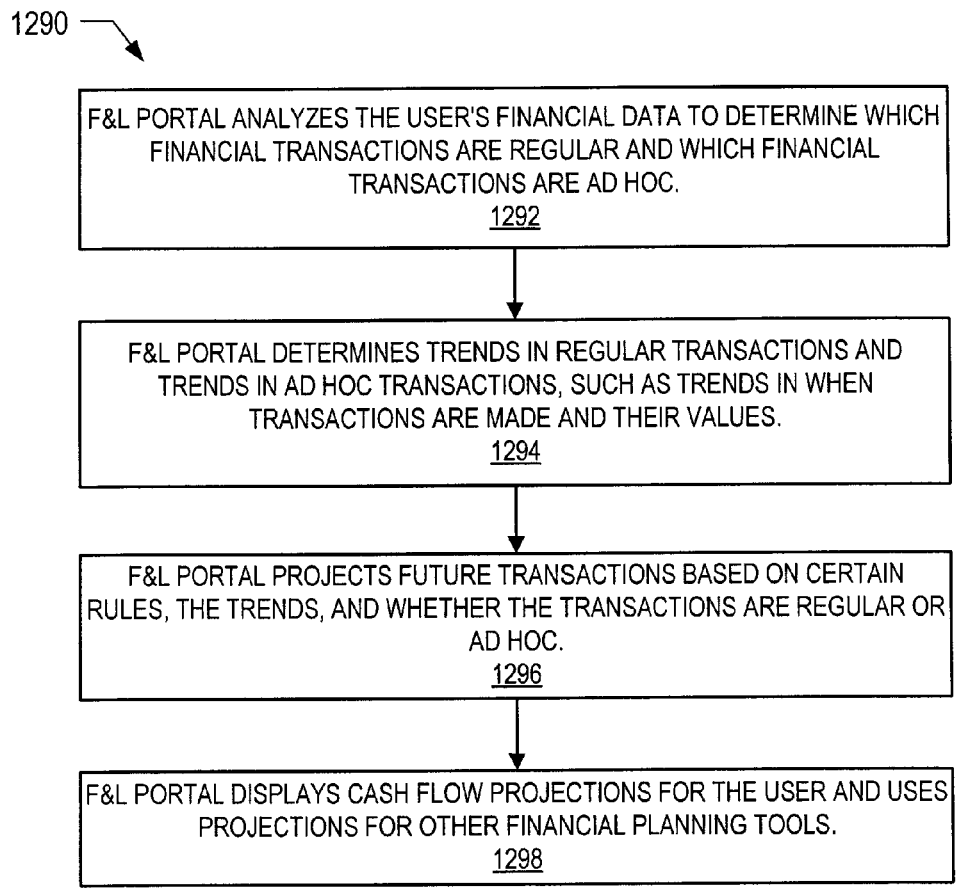
Figure 14:
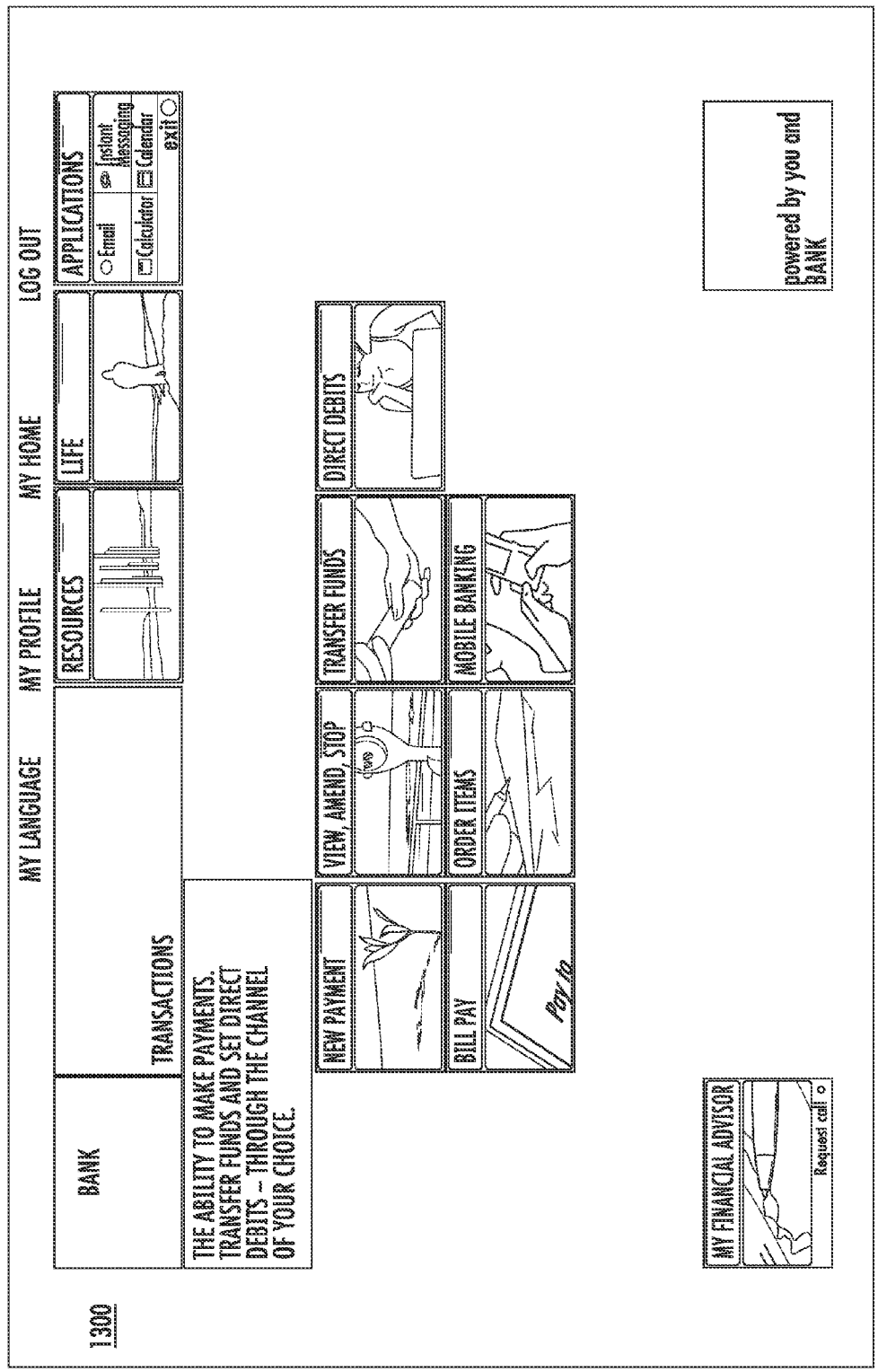
Figure 15:
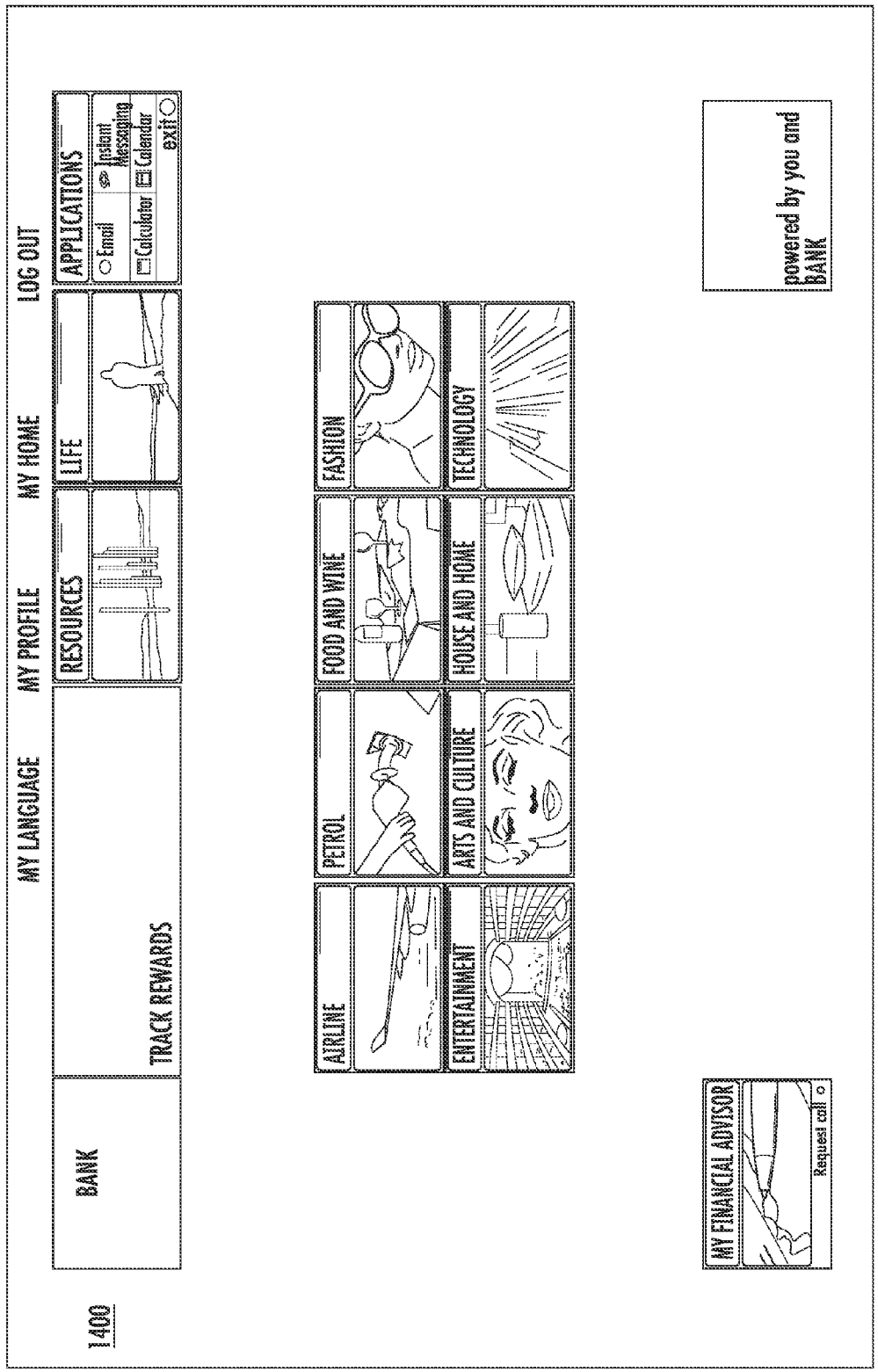
Figure 16:
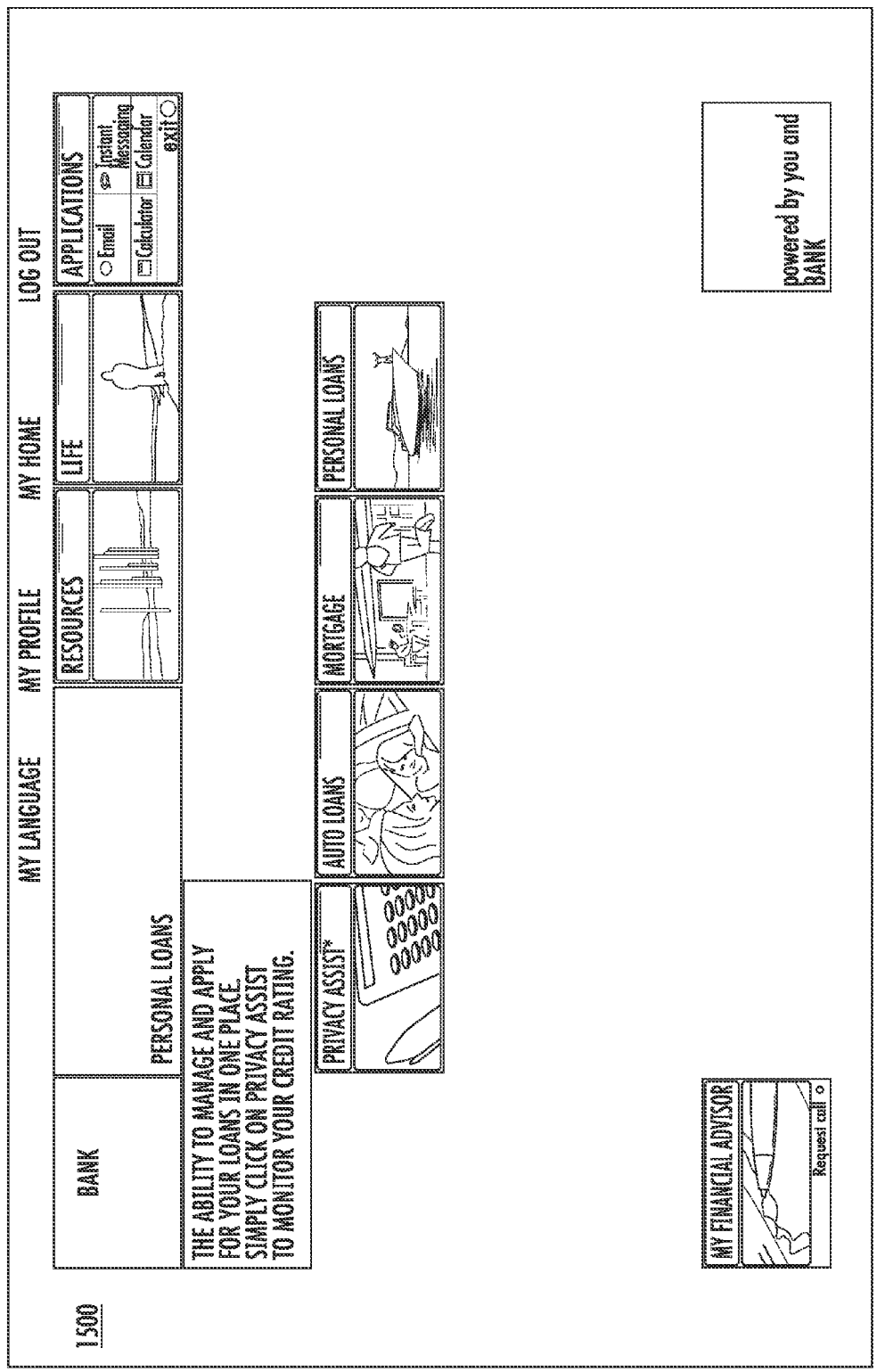
Figure 17:
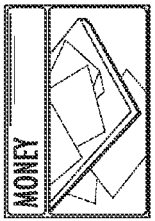
Figure 18:
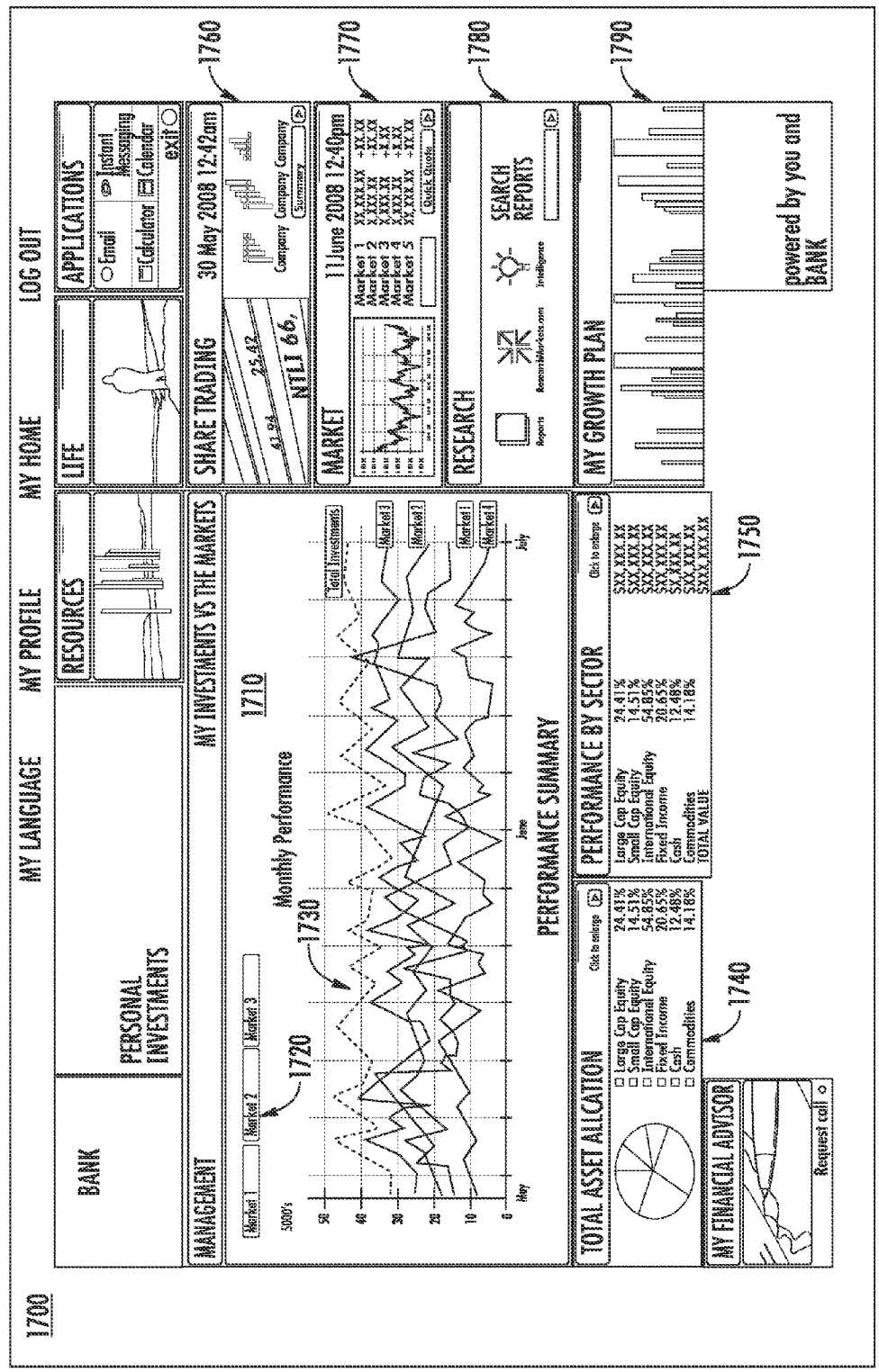
Figure 21:
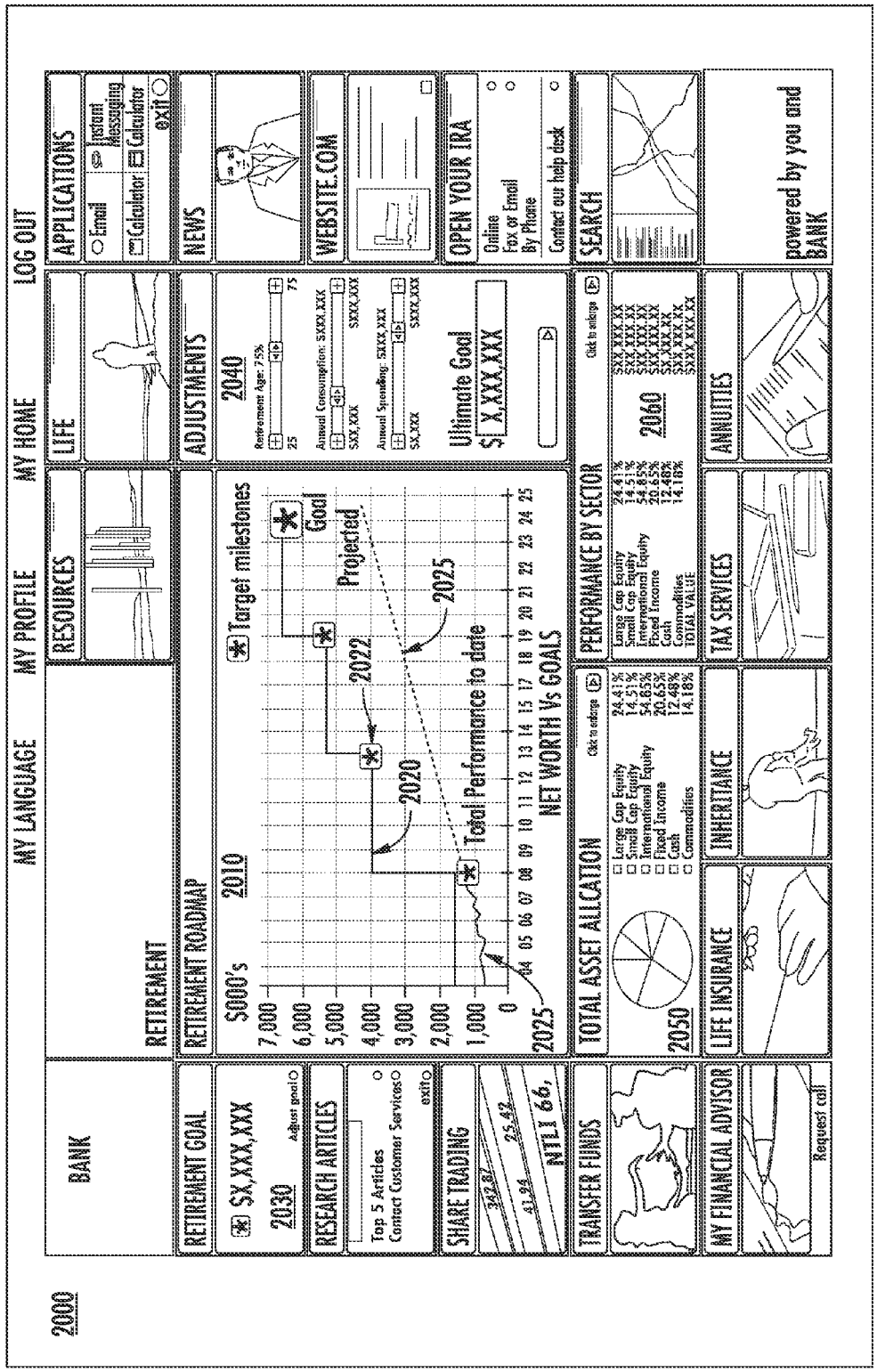
Figure 22:
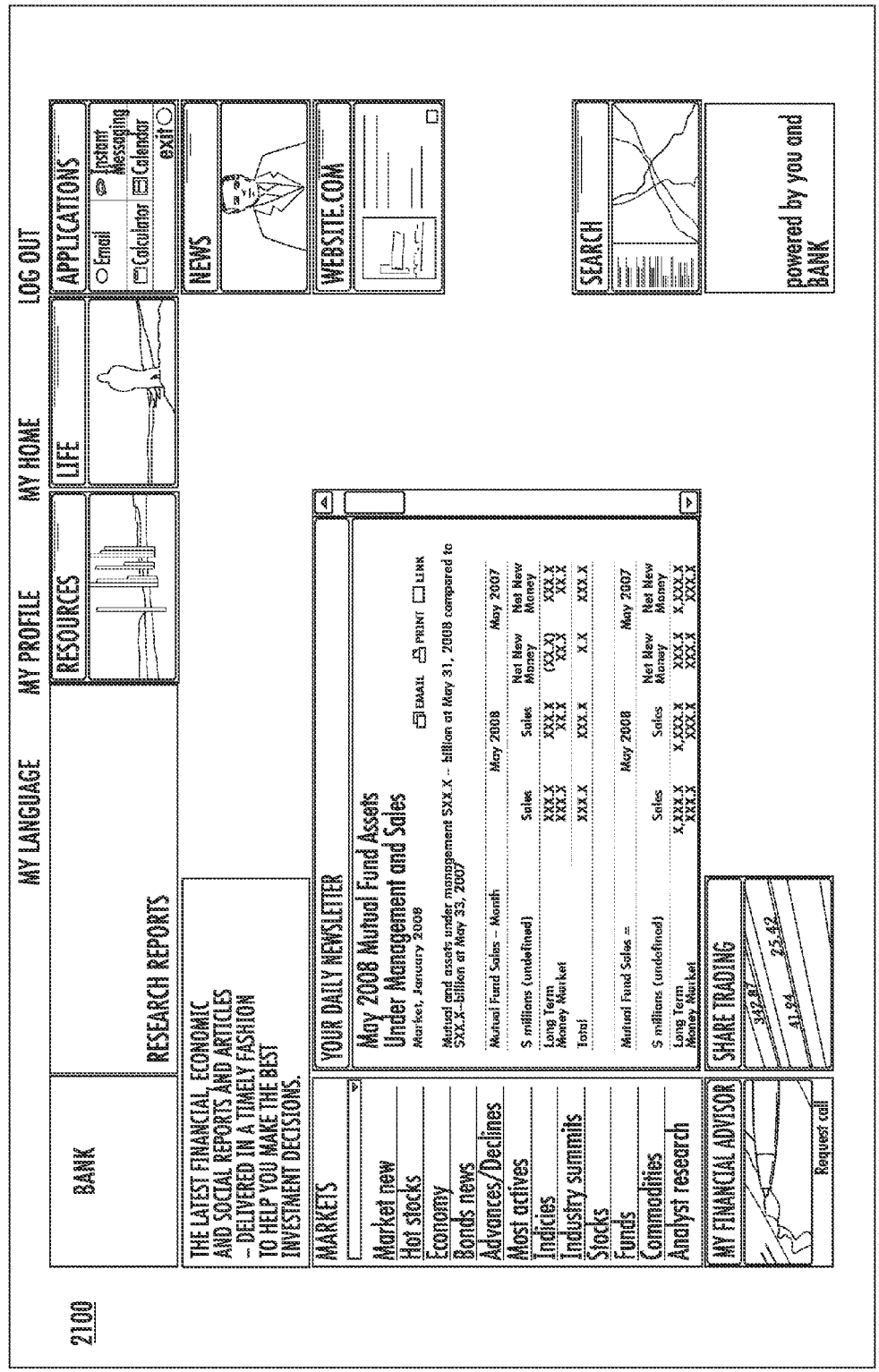
Figure 23:
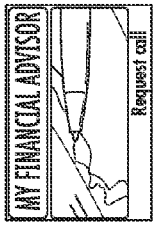
Figure 24:
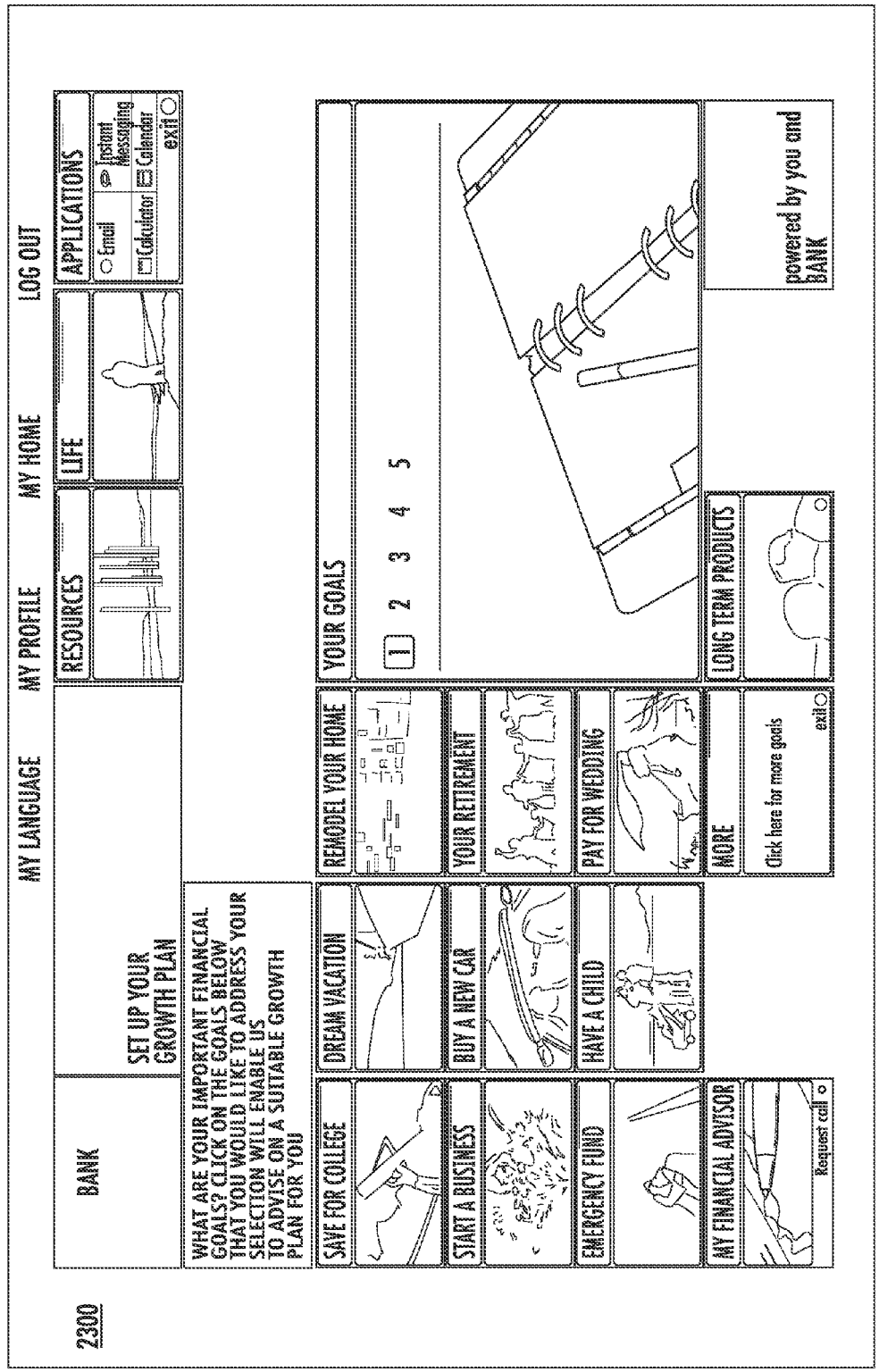
Figure 26A:
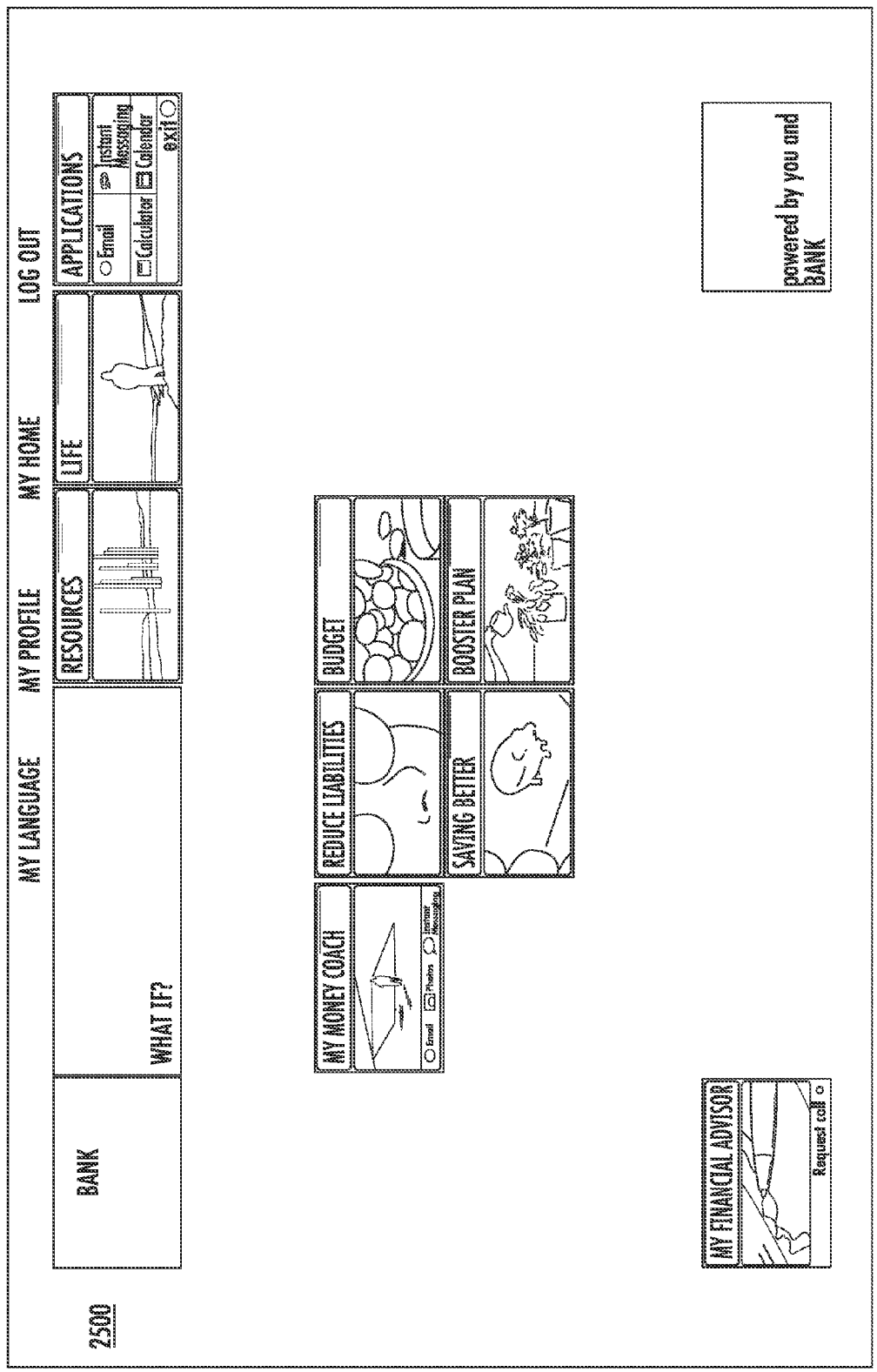
Figure 26B:
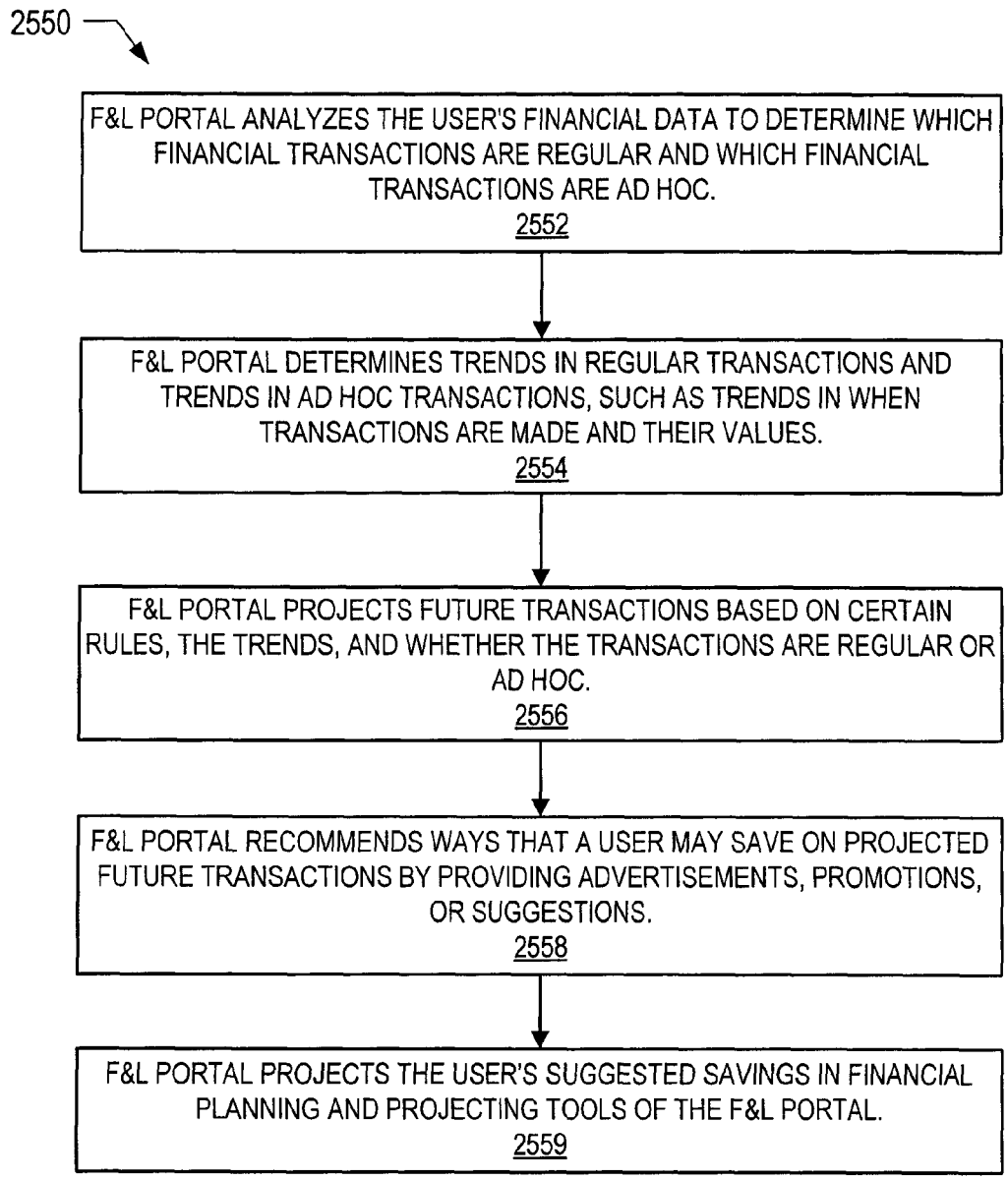
Figure 26C:
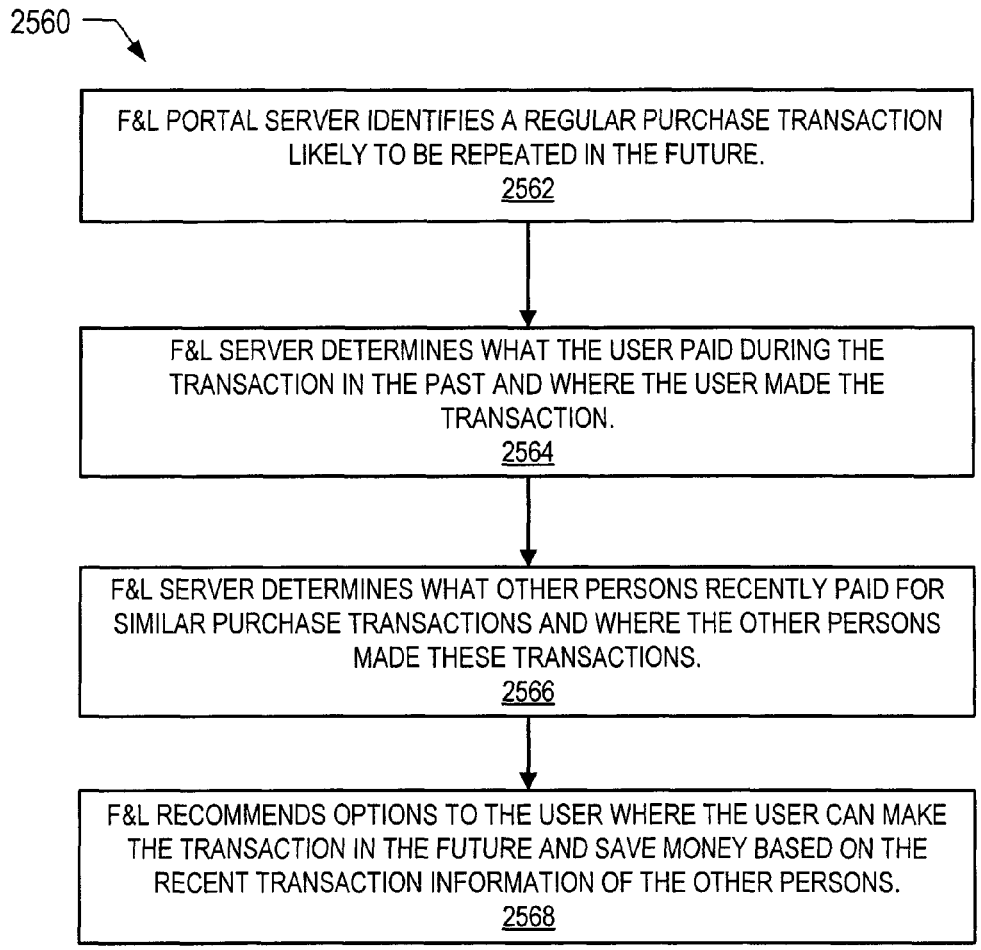
Figure 27:
Figure 28:
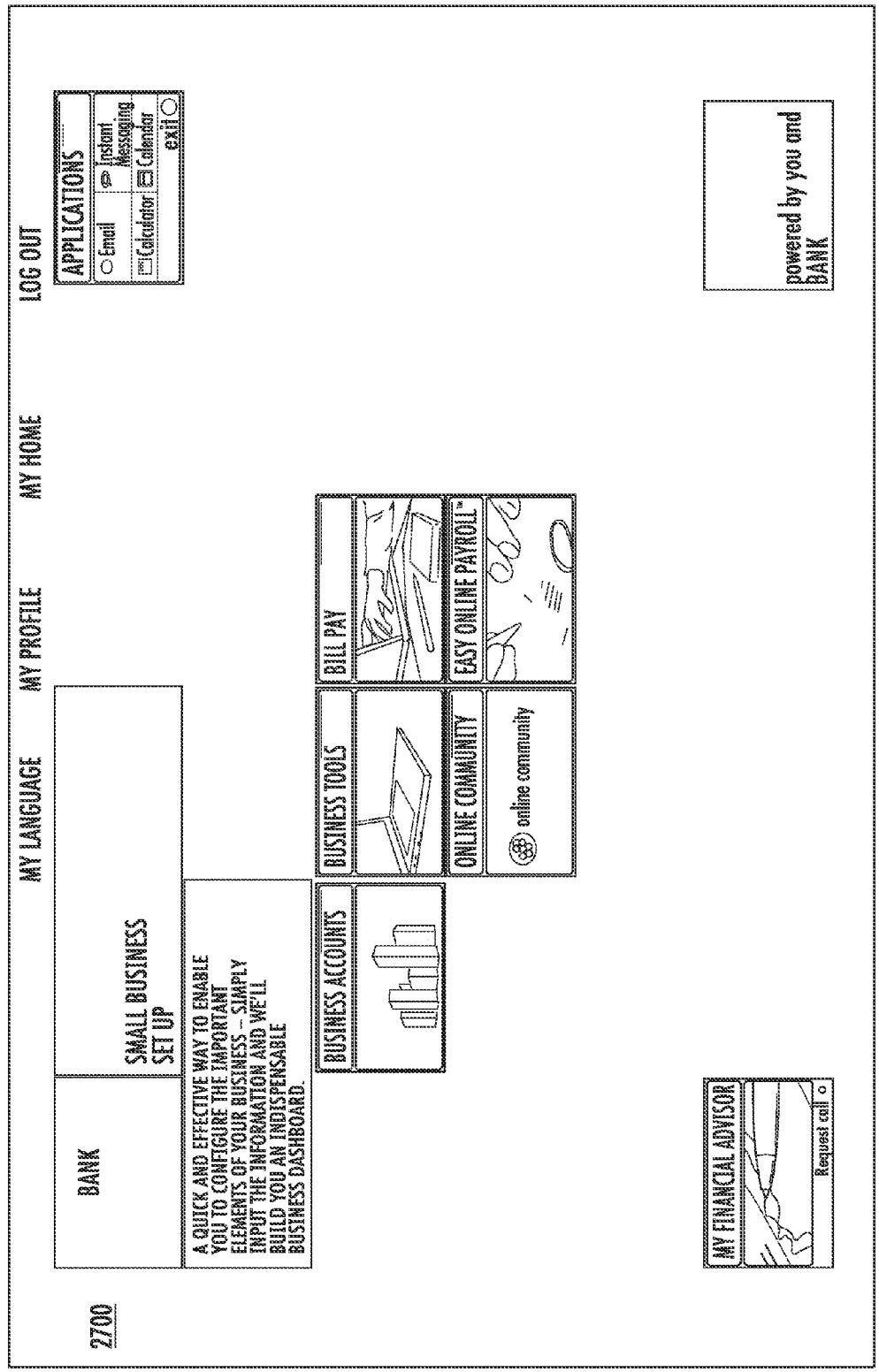
Figure 29A:
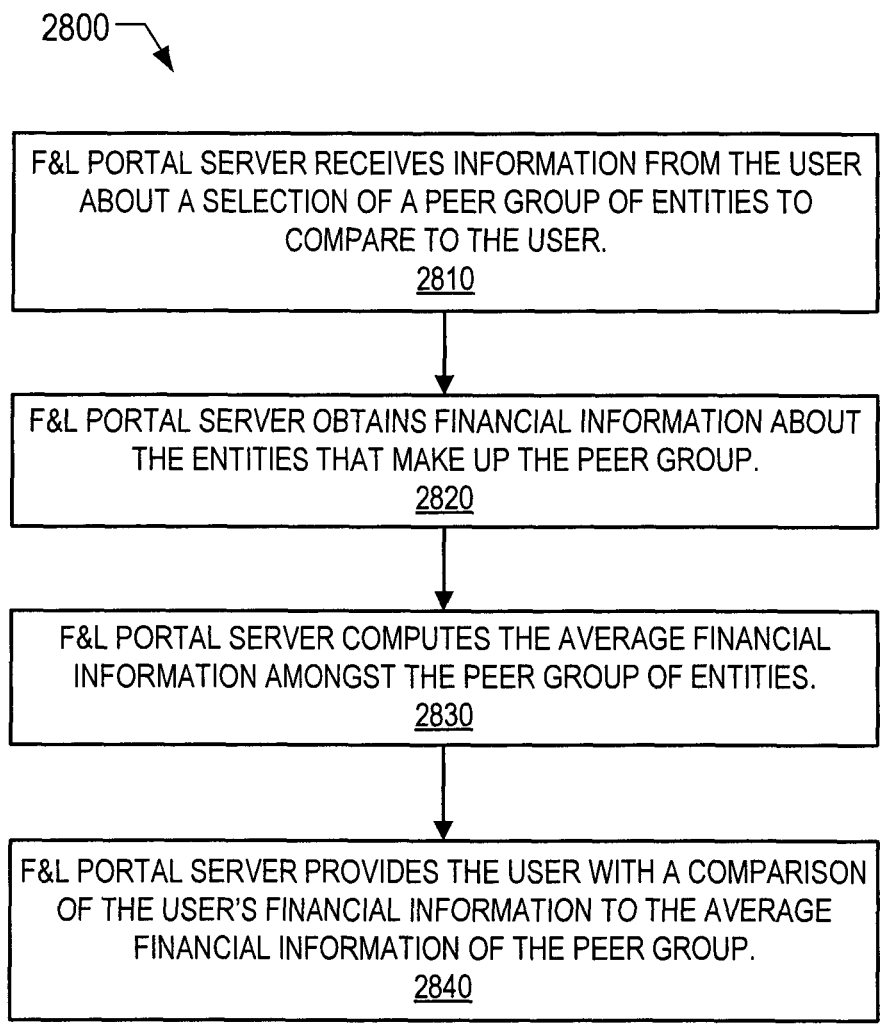
Figure 29B:
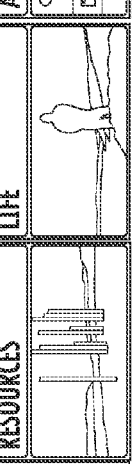
Figure 31:
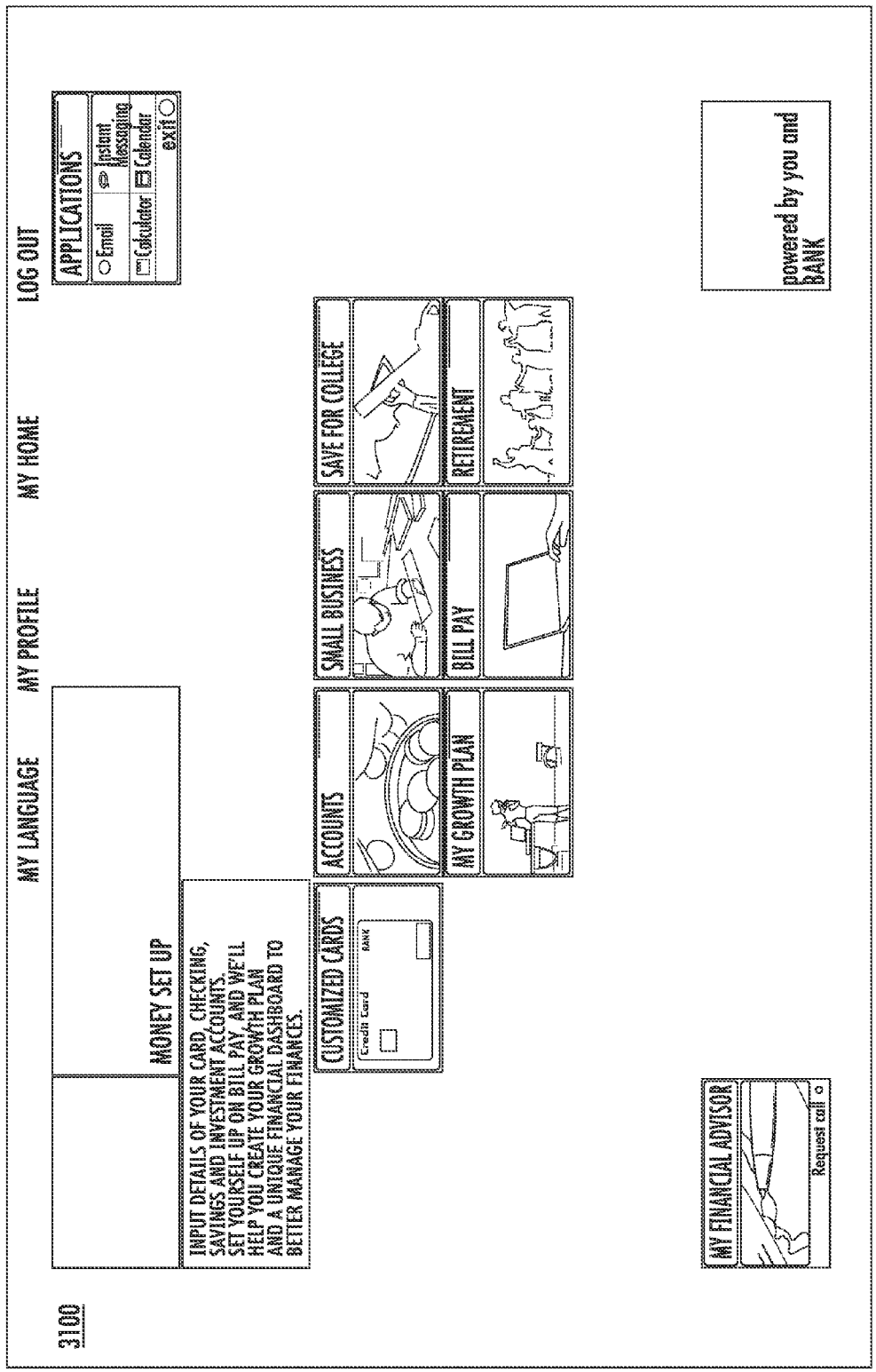
Figure 32A:
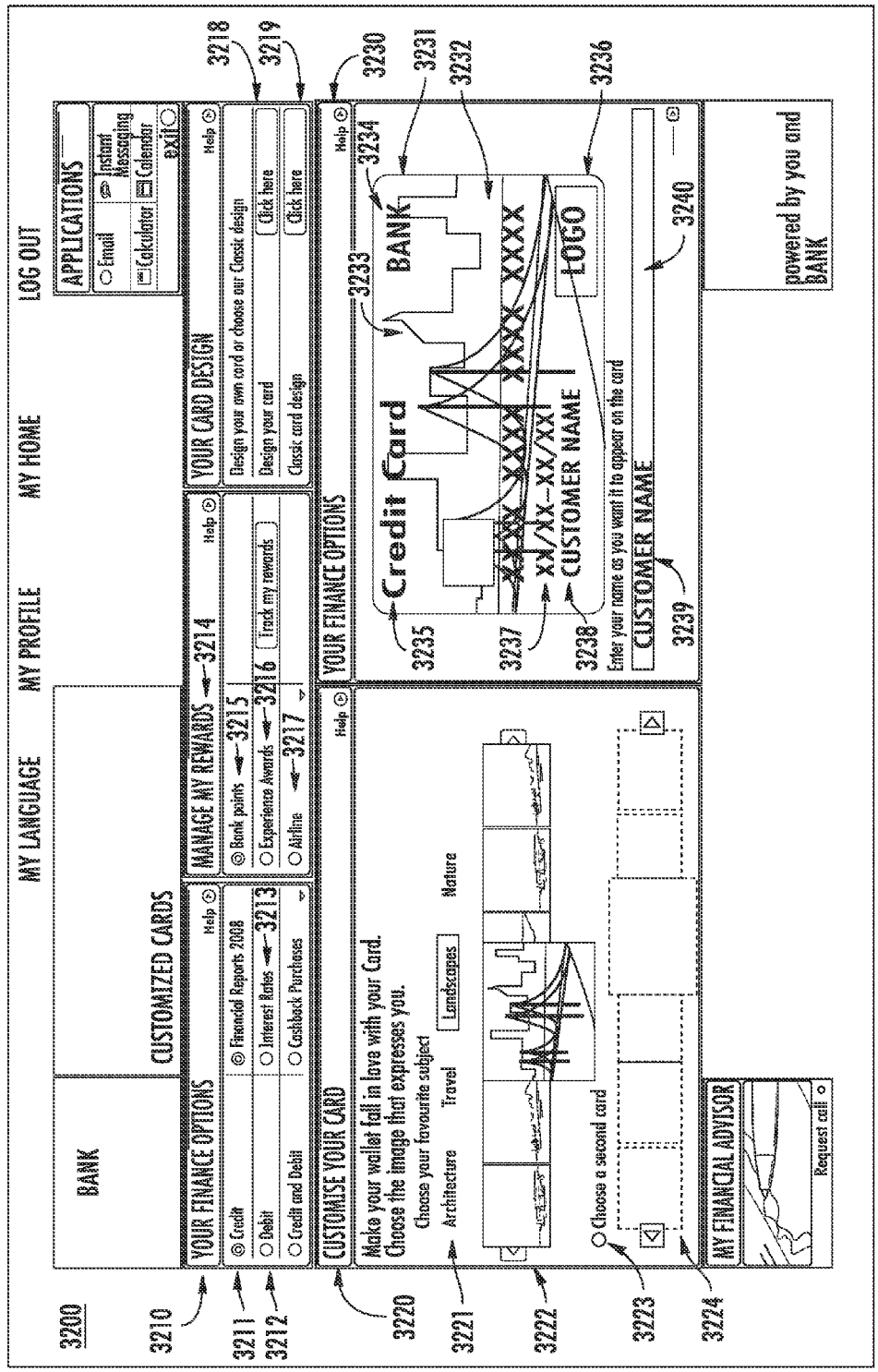
Figure 32B:
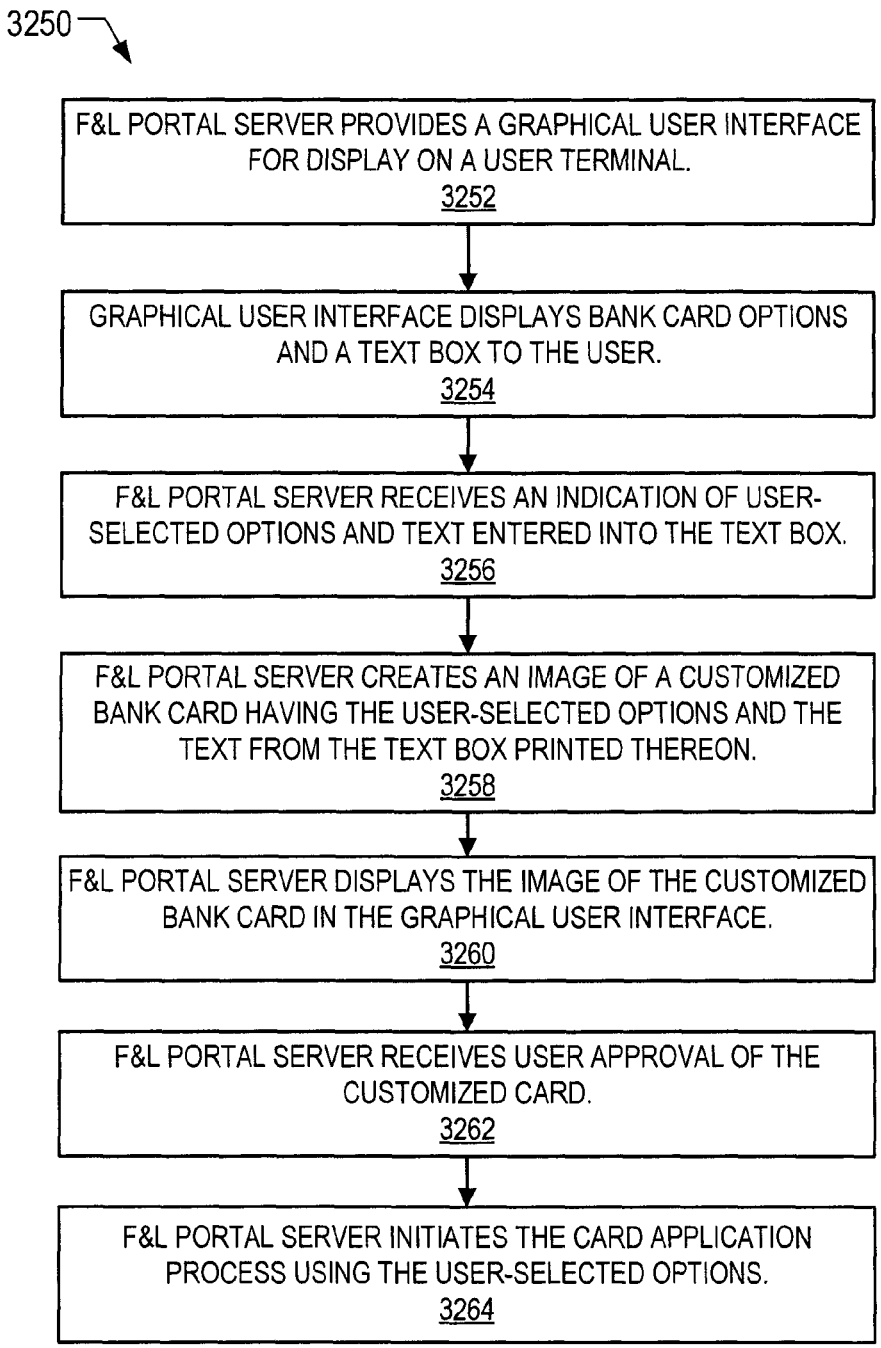
Figure 33:
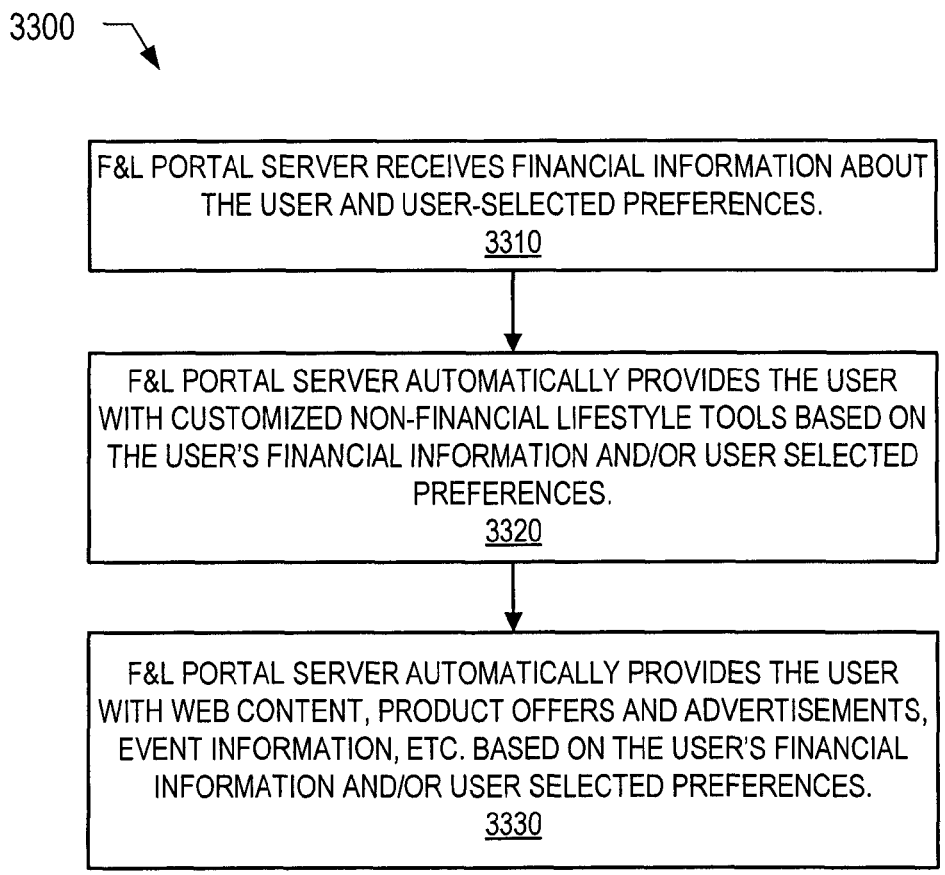
Figure 34:
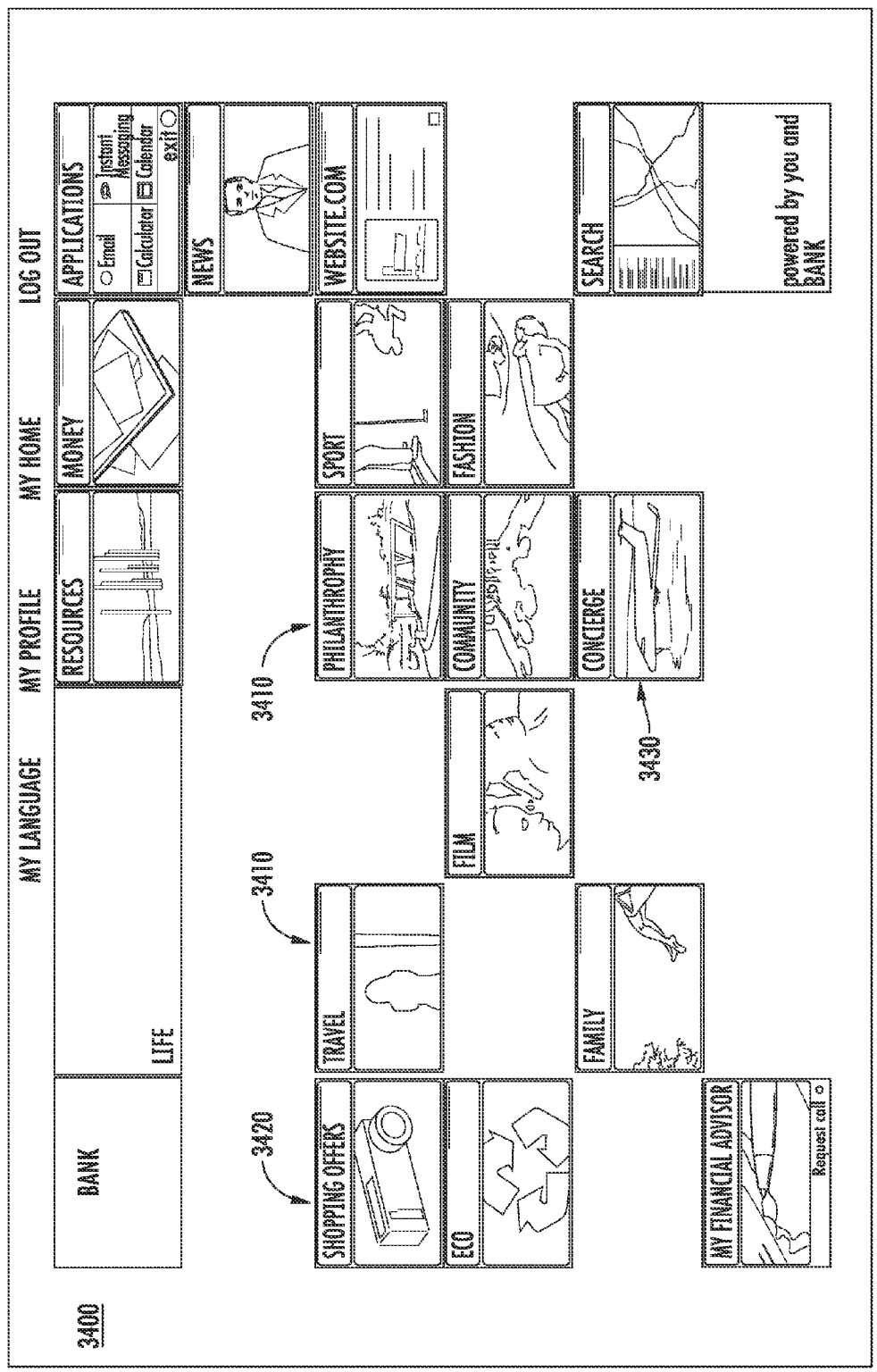
Figure 37:
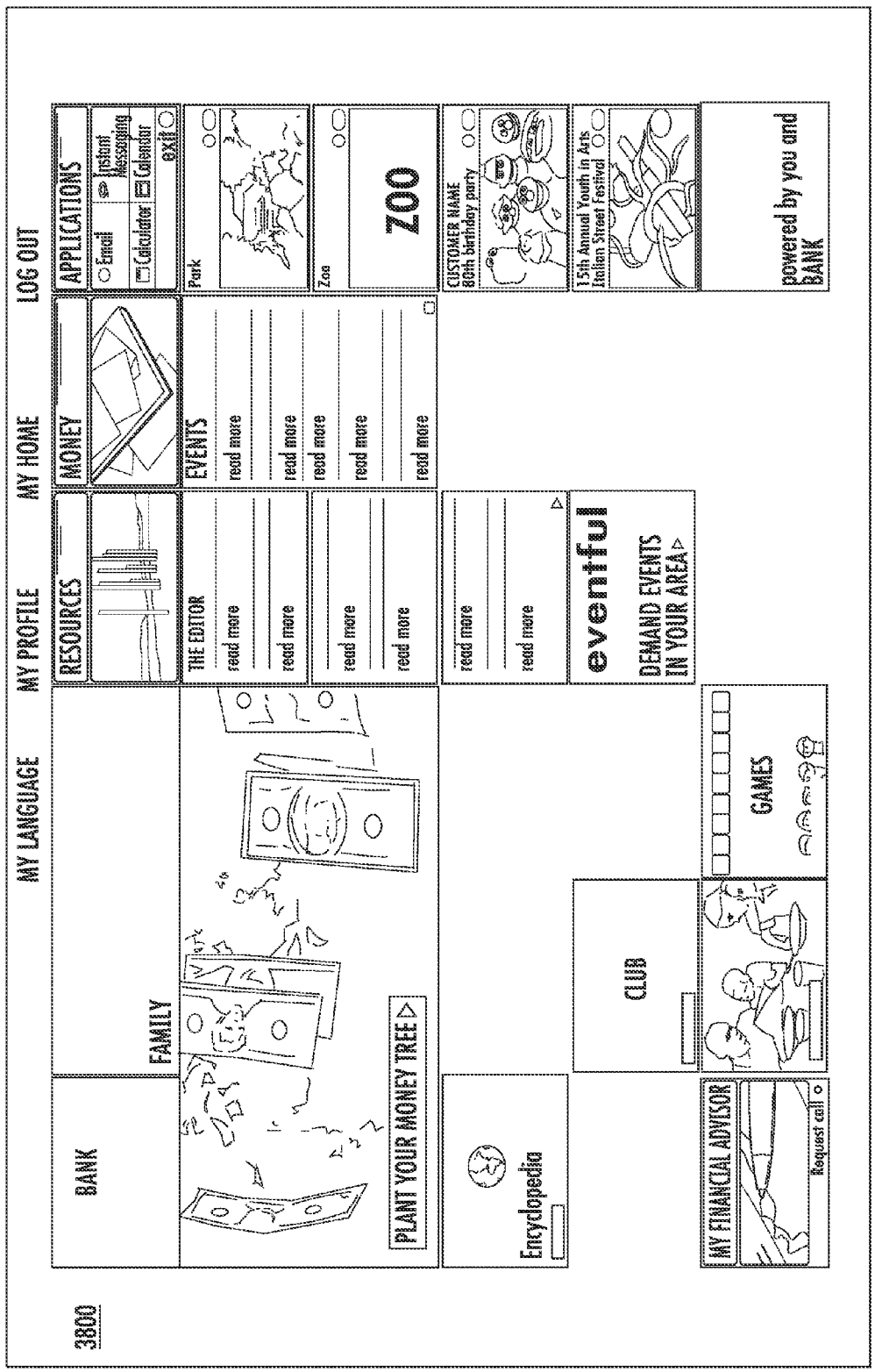
Figure 38:
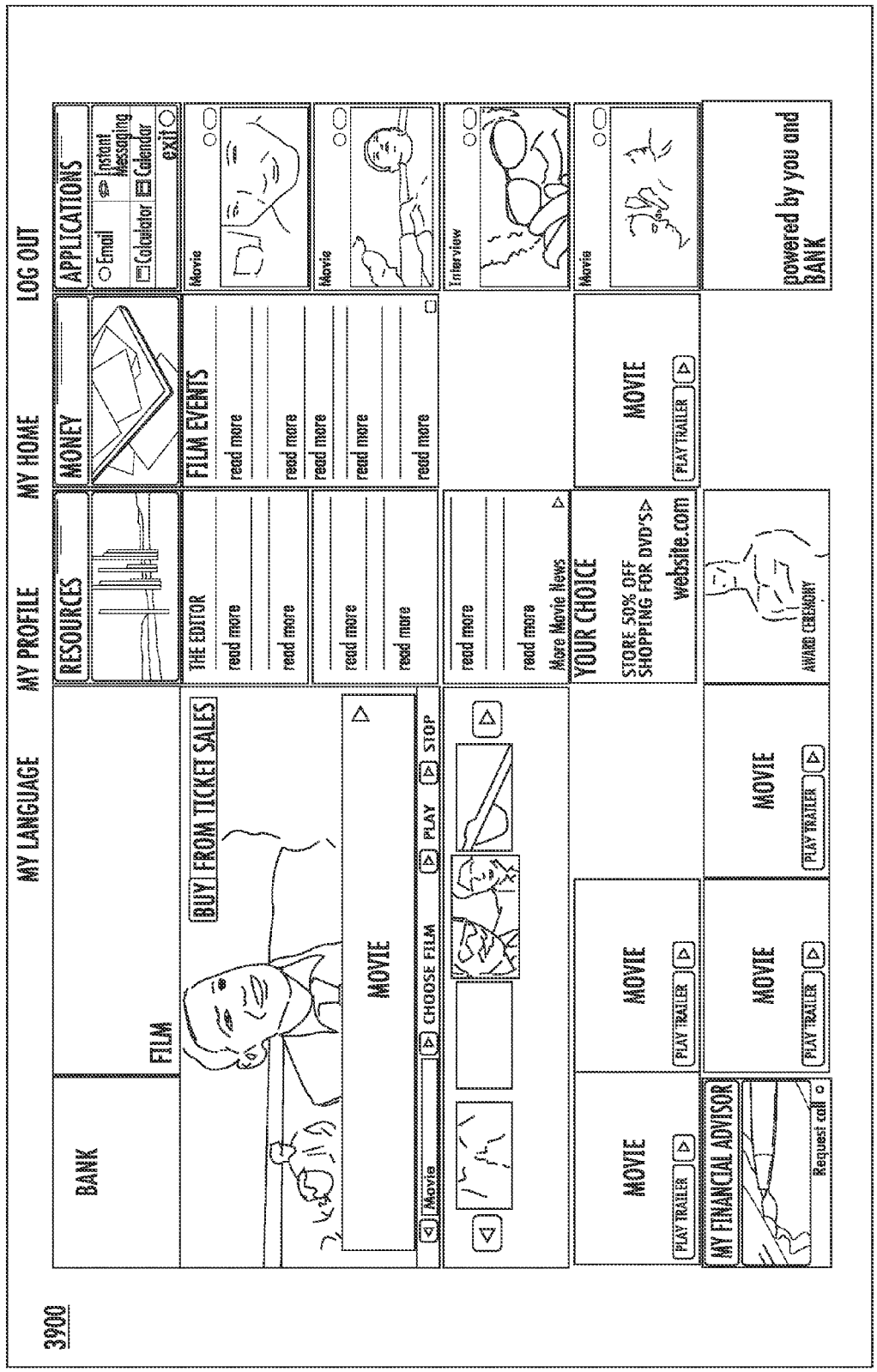
Figure 39:
Figure 40:
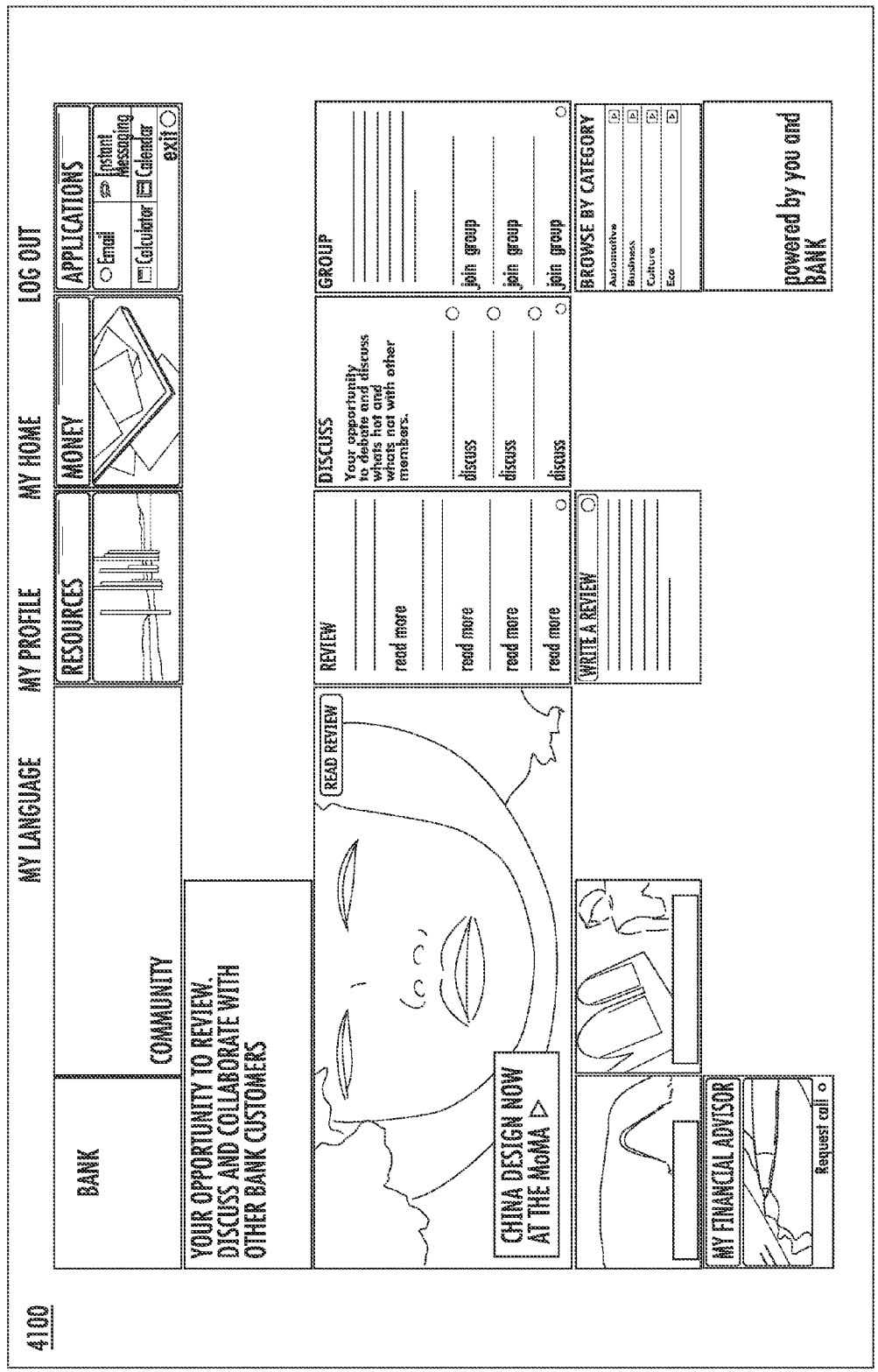
Figure 42:
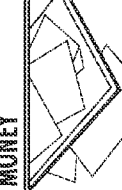
Figure 43:
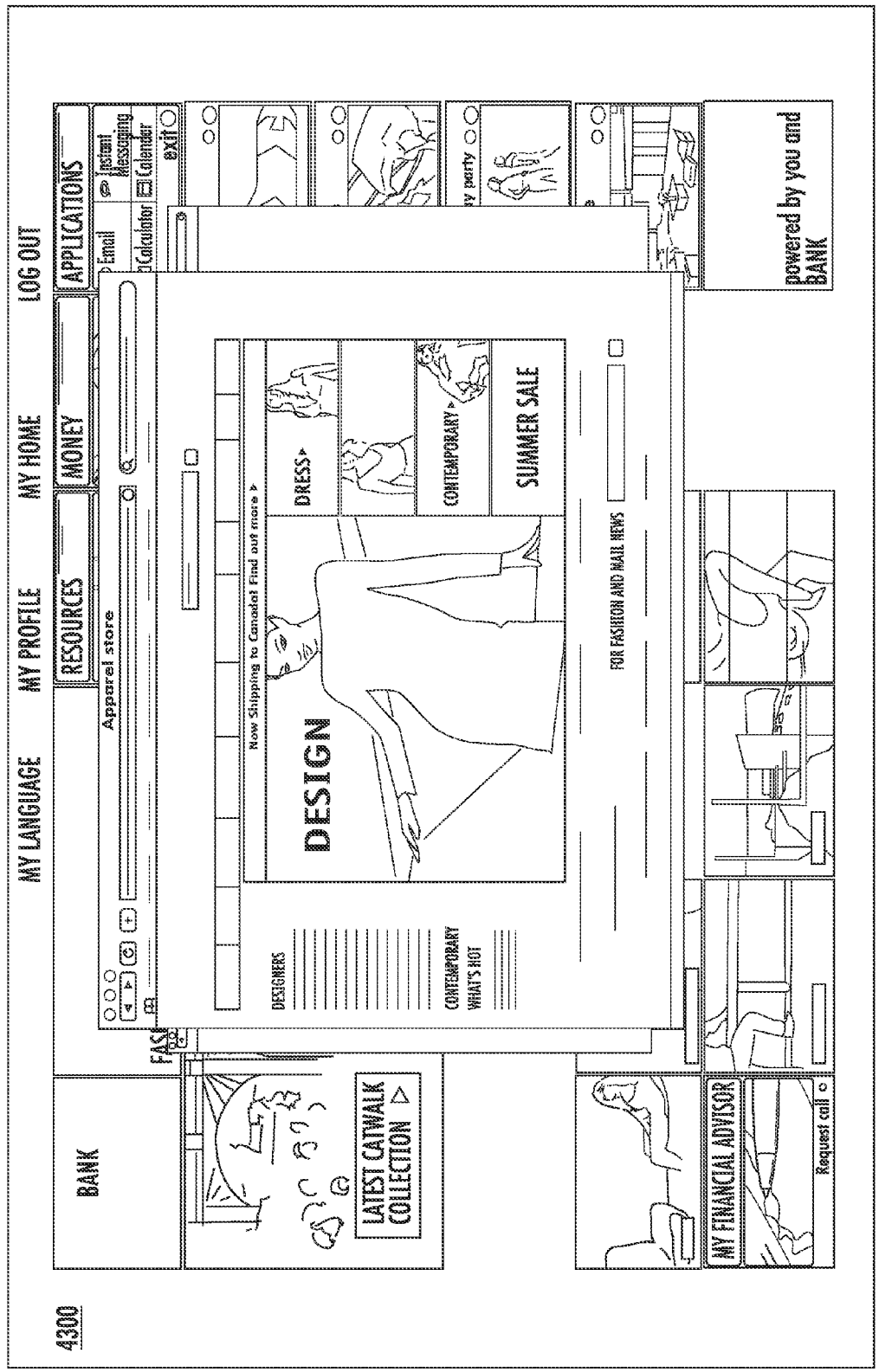
Figure 44:
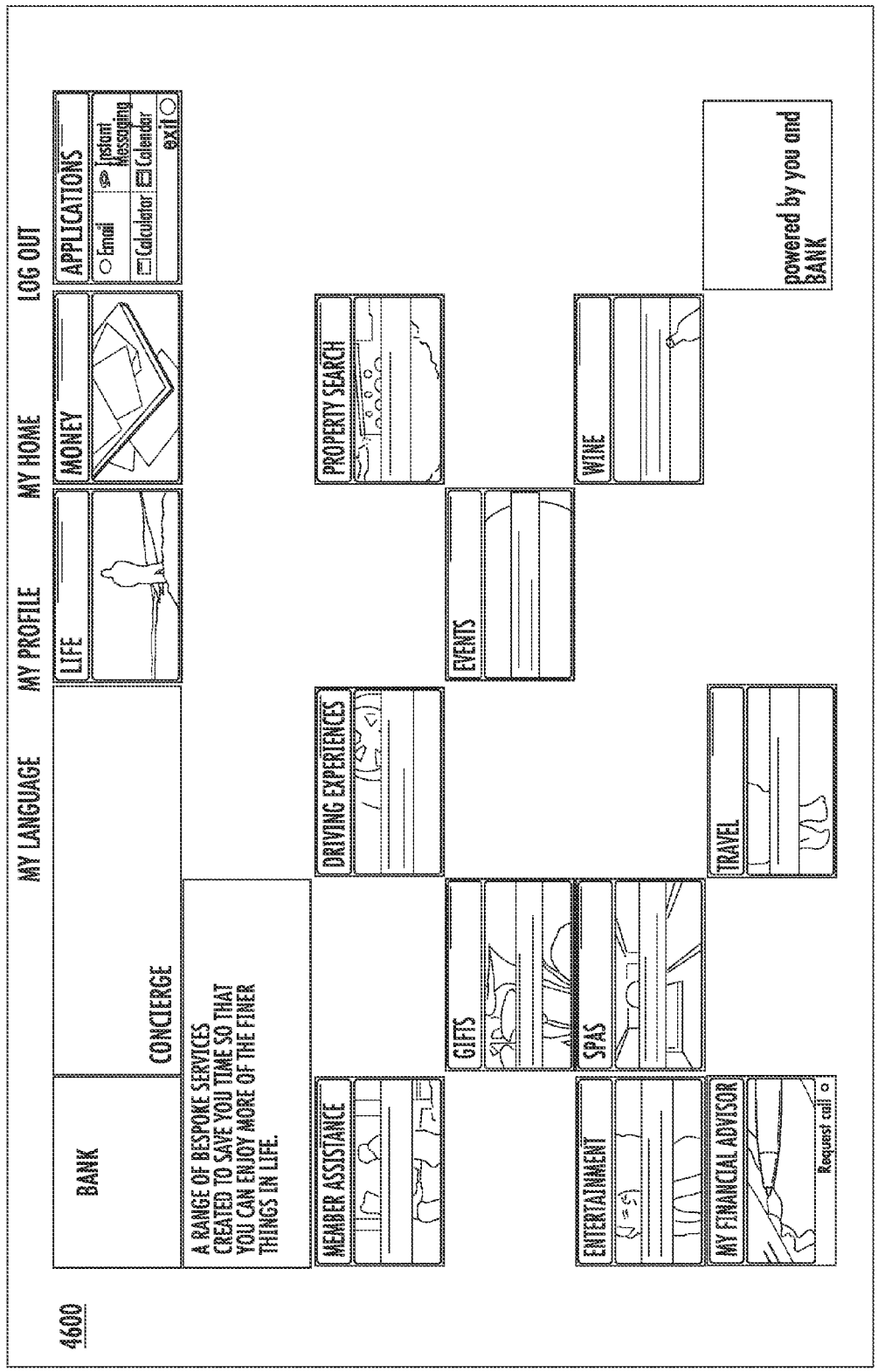
Figure 45:
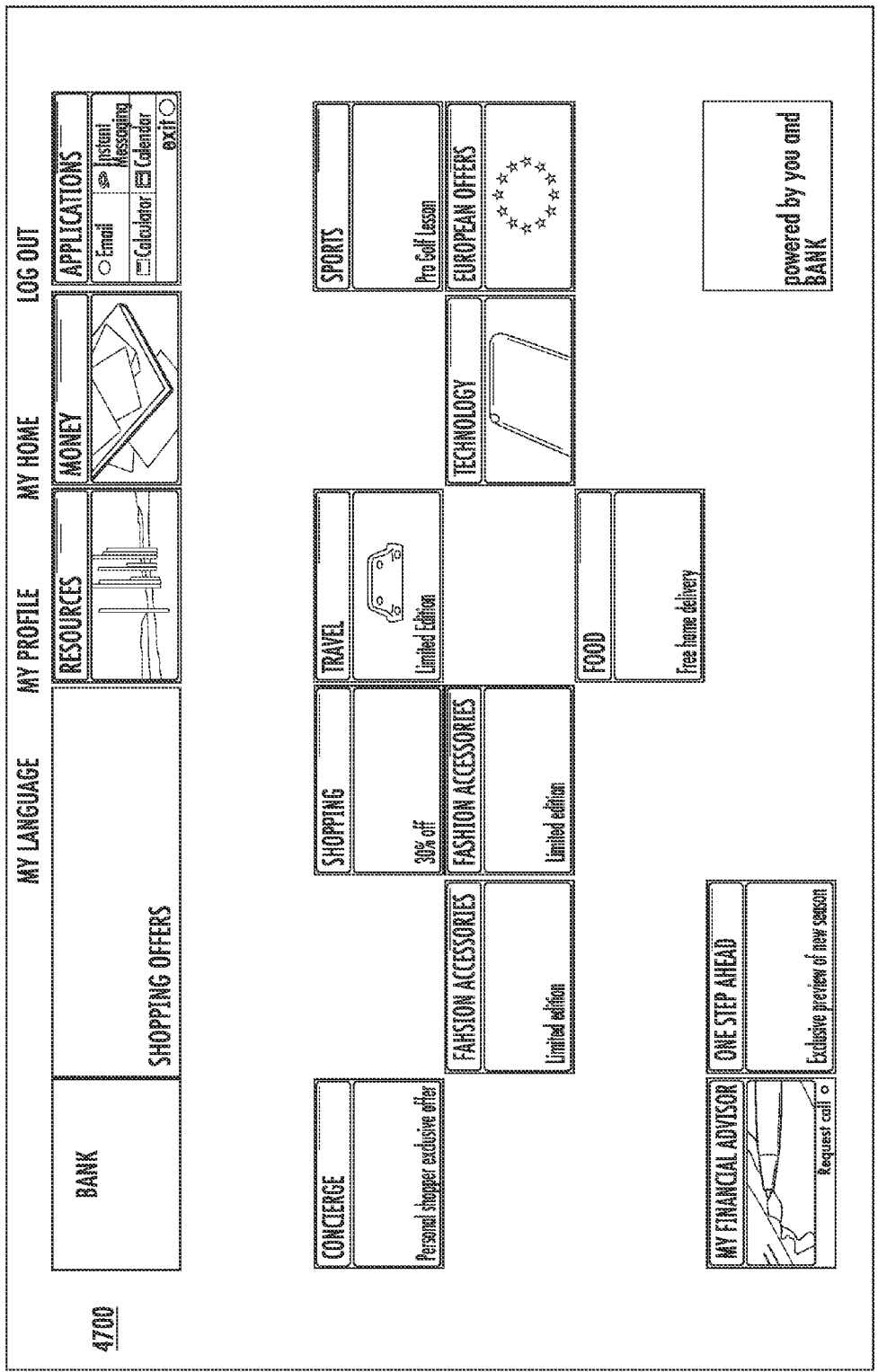
Figure 46:
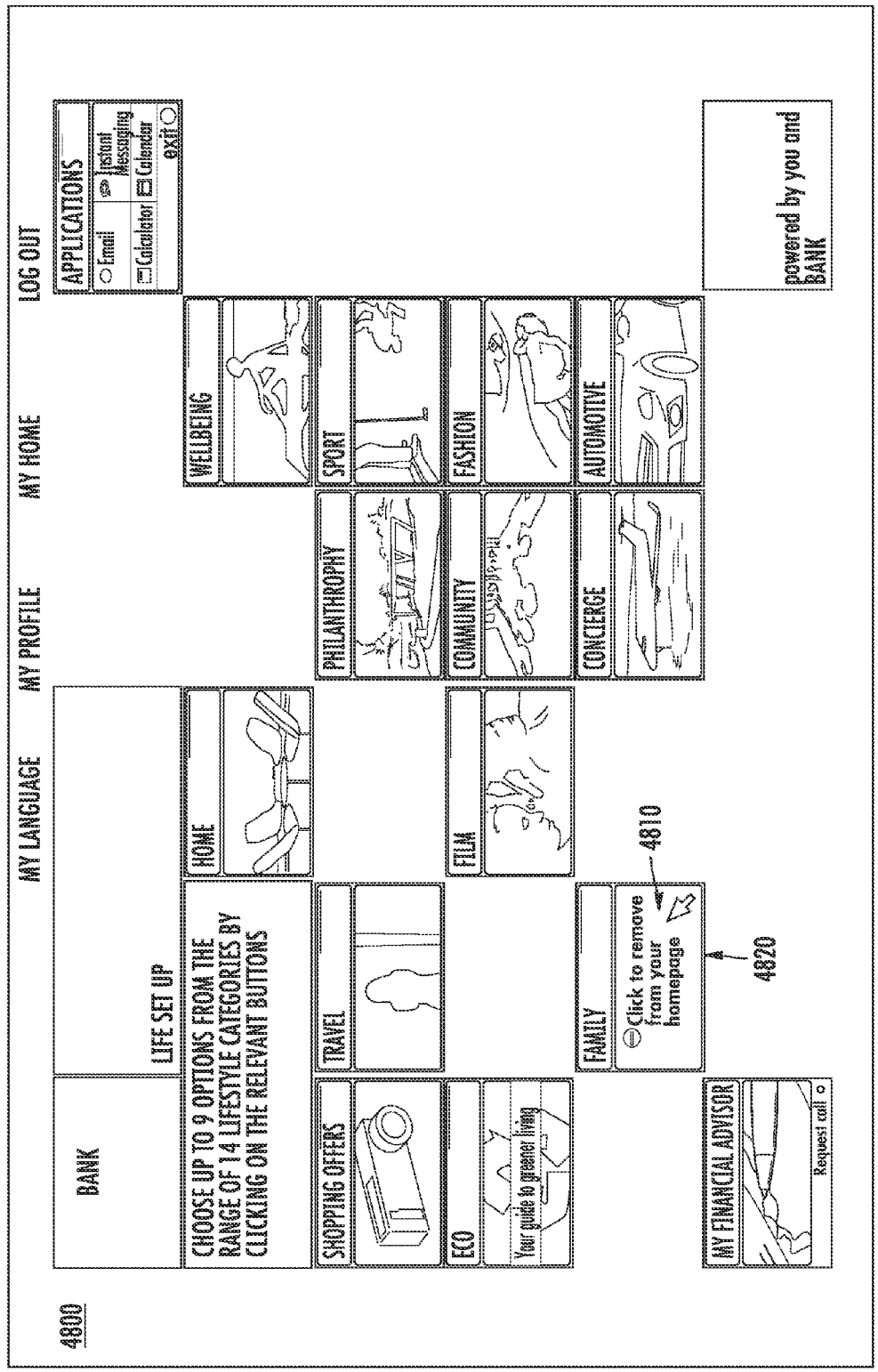
Figure 47:
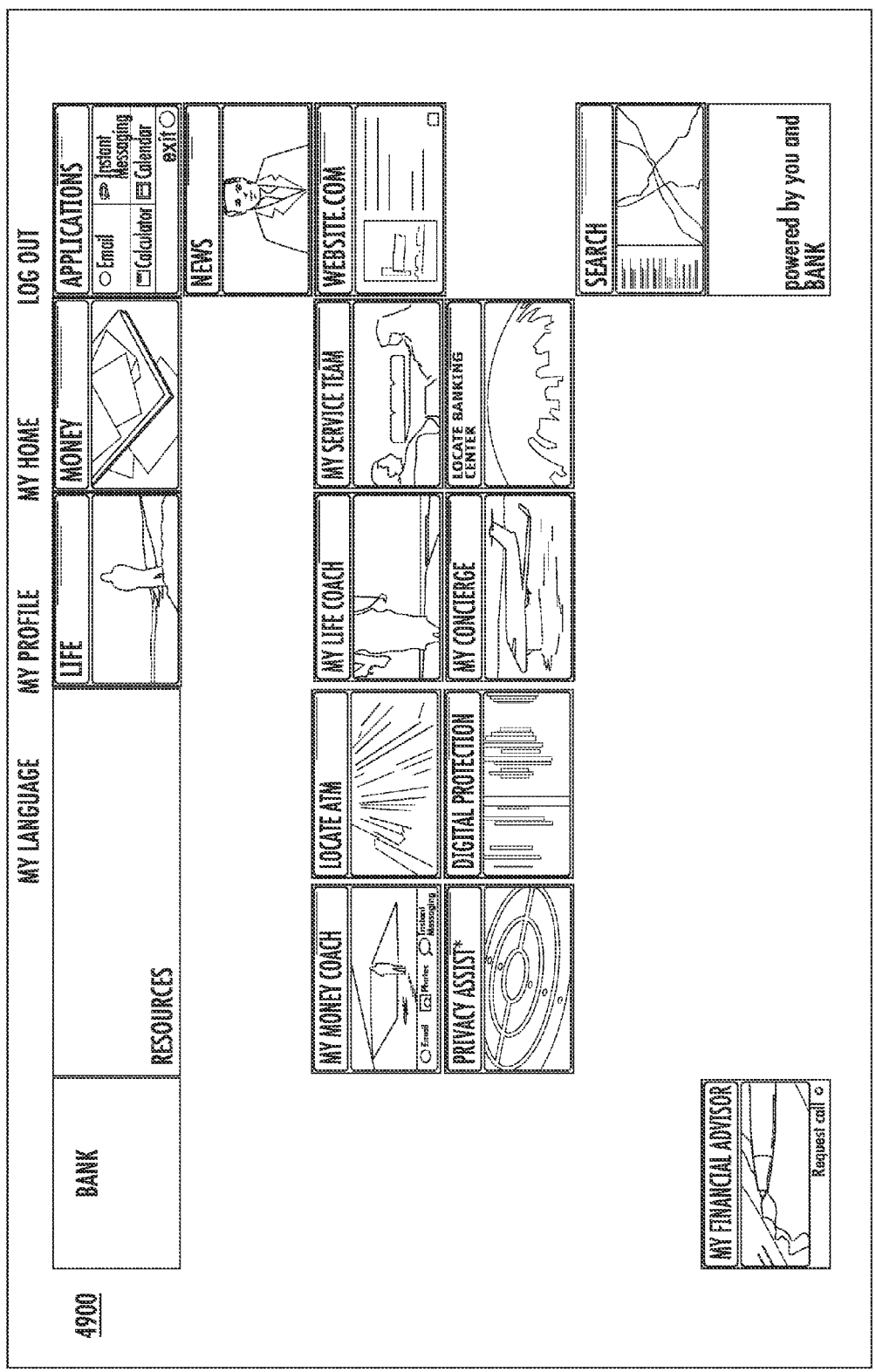
Figure 48:
Figure 49:
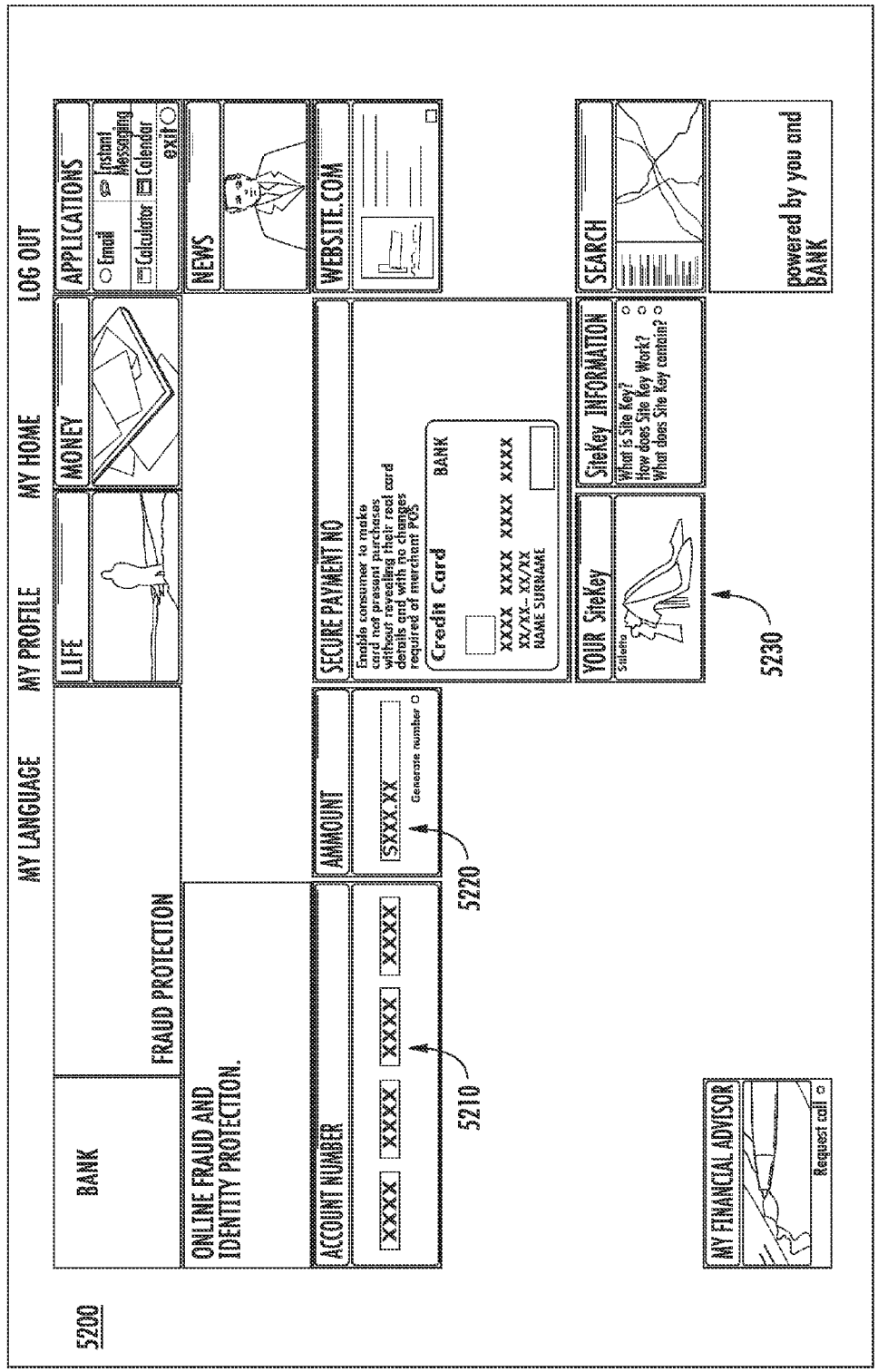

Having thus described aspects of the invention in general terms, reference will now be made to the accompanying drawings, which are not necessarily drawn to scale, and wherein:

FIG. 1 is a block diagram of a finance and lifestyle integration system, in accordance with an embodiment of the invention;

FIG. 2 is a flow chart illustrating a process of integrating a user's financial and non-financial interests, in accordance with an embodiment of the invention;

FIG. 3 is a block diagram providing a more detailed illustration of a finance and lifestyle integration system, in accordance with an embodiment of the invention;

FIG. 4 provides an illustration of a process of gathering a person's financial data, in accordance with one embodiment of the invention;

FIG. 5 illustrates a process of identifying user preferences from a user's financial data as performed by the finance and lifestyle integration system of FIG. 3, in accordance with one embodiment of the invention;

FIG. 6 is a flow chart providing a process performed by the finance and lifestyle integration system of FIG. 3, in accordance with an embodiment of the invention;

FIG. 7 is an illustration of a graphical user interface "homepage," in accordance with an embodiment of the invention;

FIG. 8 is an illustration of a set-up tool used to select links for the user's customized account homepage, in accordance with an embodiment of the invention;

FIG. 9 illustrates another process performed by the finance and lifestyle integration system of FIG. 3, in accordance with an embodiment of the invention;

FIG. 10 is an illustration of a money dashboard of the graphical user interface, in accordance with an embodiment of the invention;

FIG. 11 is an illustration of a bank account dashboard of the graphical user interface, in accordance with an embodiment of the invention;

FIG. 12 is an illustration of a bill pay dashboard of the graphical user interface, in accordance with an embodiment of the invention;

FIG. 13A is an illustration of a cash flow tracking tool, in accordance with an embodiment of the invention;

FIG. 13B illustrates a future finances projection process performed by the finance and lifestyle integration system of FIG. 3, in accordance with an embodiment of the invention;

FIG. 14 is an illustration of a transactions dashboard of the graphical user interface, in accordance with an embodiment of the invention;

FIG. 15 is an illustration of a rewards tracking dashboard of the graphical user interface, in accordance with an embodiment of the invention;

FIG. 16 is an illustration of a loan management dashboard of the graphical user interface, in accordance with an embodiment of the invention;

FIG. 17 is an illustration of a financial advising tool, in accordance with an embodiment of the invention;

FIG. 18 is an illustration of a personal investments tool, in accordance with an embodiment of the invention;

Figure 19:
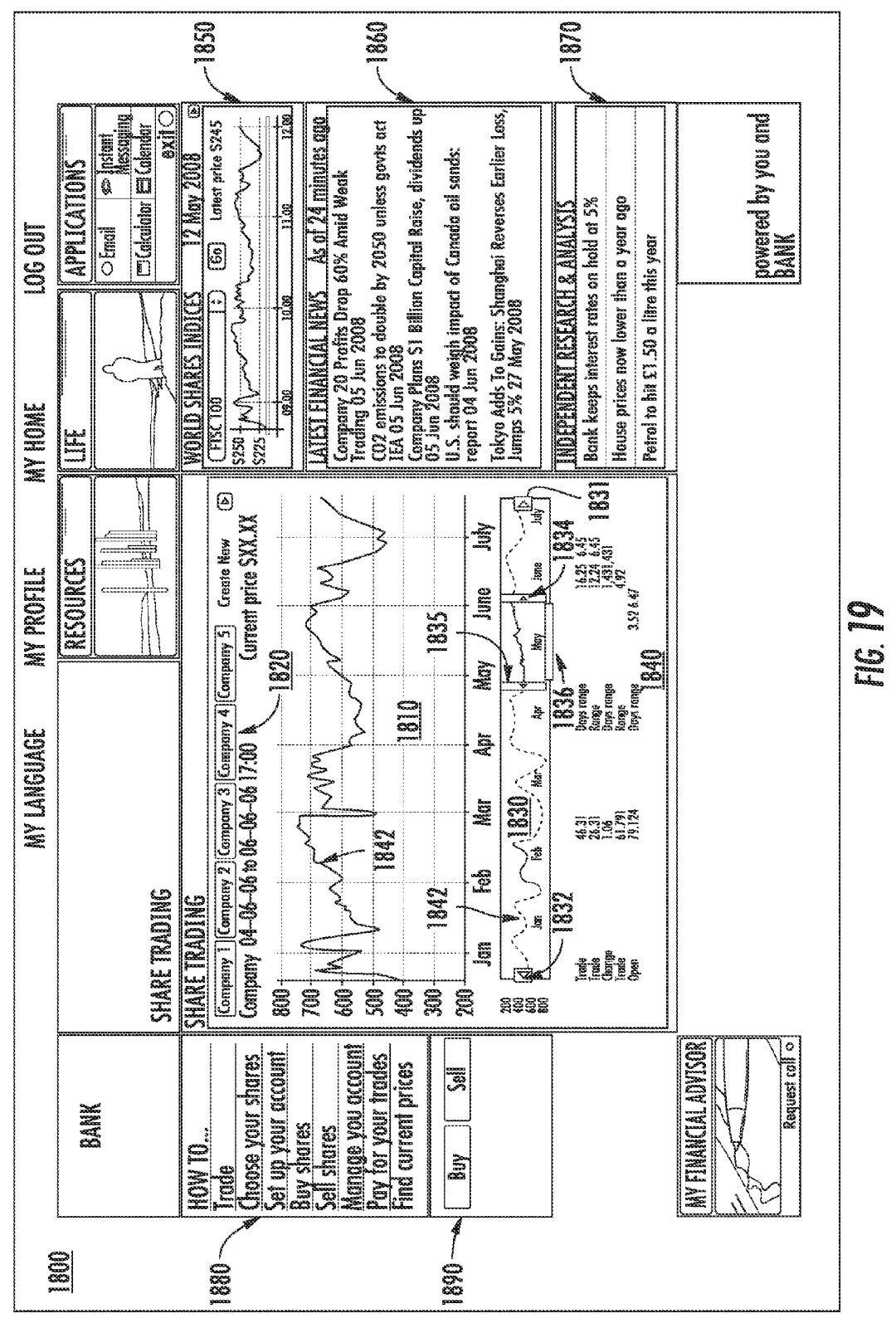

FIG. 19 is an illustration of a share trading dashboard, in accordance with an embodiment of the invention;

Figure 20:
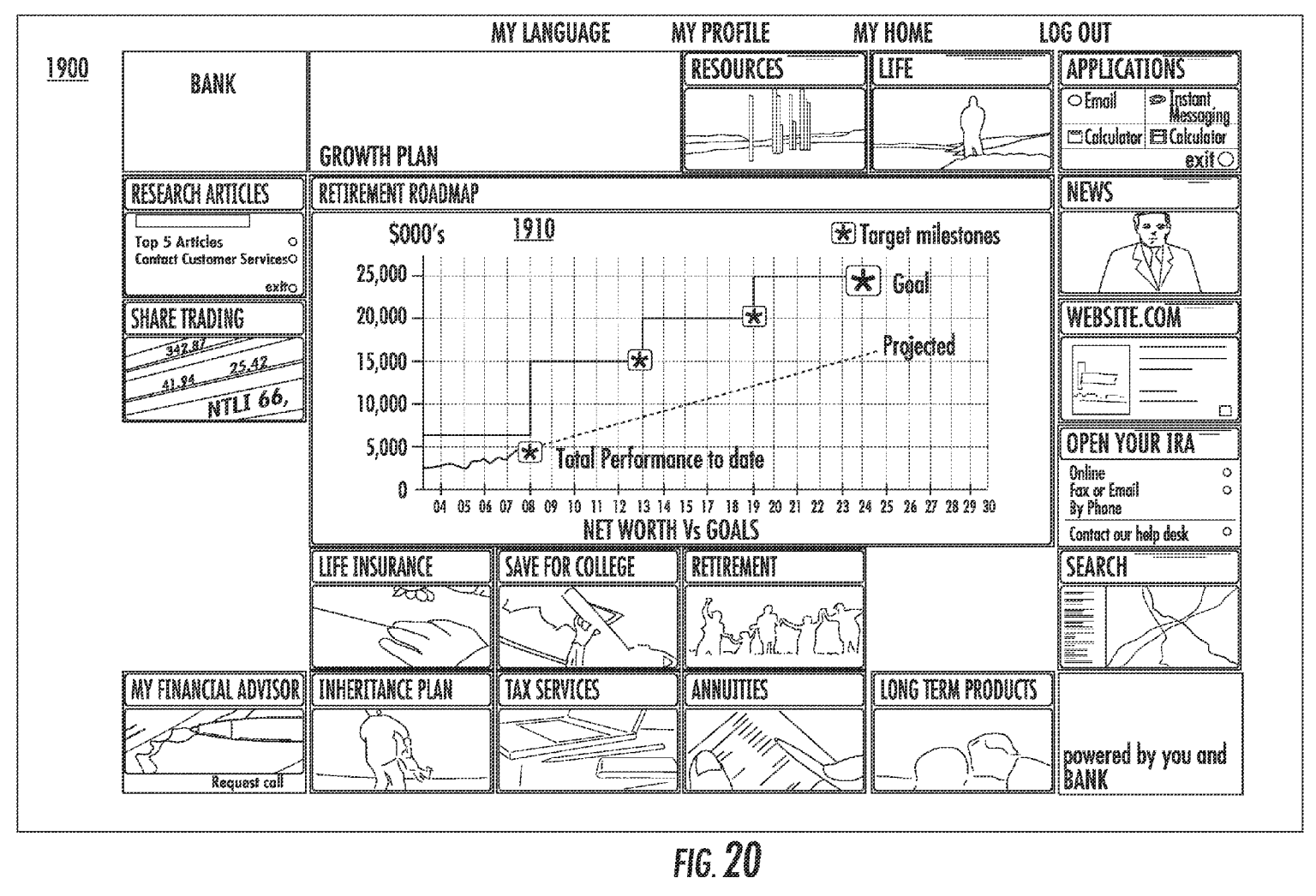

FIG. 20 is an illustration of a growth planning tool, in accordance with an embodiment of the invention;

FIG. 21 is an illustration of a retirement planning tool, in accordance with an embodiment of the invention;

FIG. 22 is an illustration of an investment research tool, in accordance with an embodiment of the invention;

FIG. 23 is an illustration of an individual retirement accounts tool, in accordance with an embodiment of the invention;

FIG. 24 is an illustration of a set-up tool for establishing user-specific goals in the growth planning tool, in accordance with an embodiment of the invention;

Figure 25:
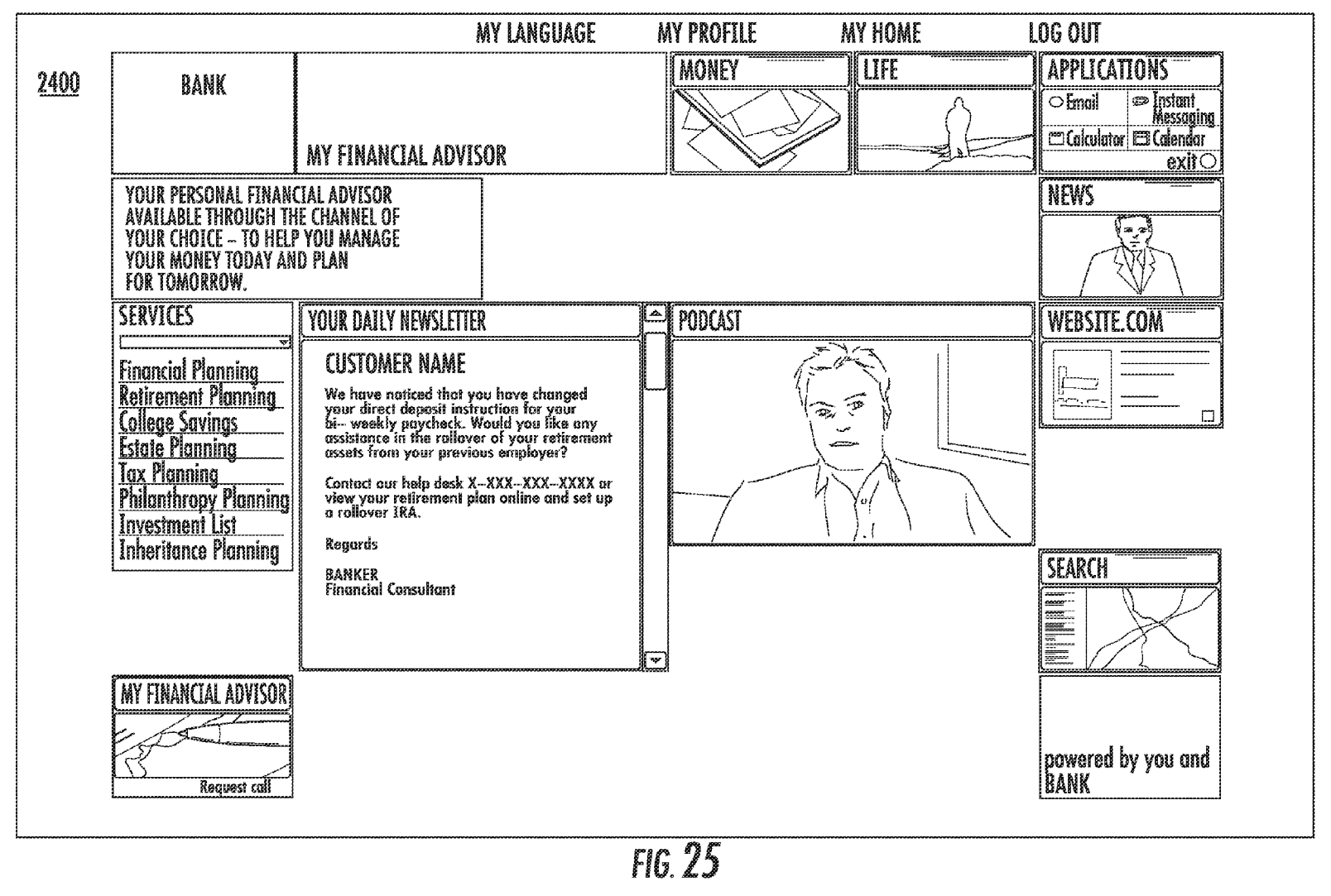

FIG. 25 is an illustration of a financial advisor tool, in accordance with an embodiment of the invention;

FIG. 26A is an illustration of a "what if" financial advising tool, in accordance with an embodiment of the invention;

FIG. 26B illustrates a process for making savings recommendations to a user, the process performed by the finance and lifestyle integration system of FIG. 3, in accordance with an embodiment of the invention;

FIG. 26C illustrates another process for making savings recommendations to a user, the process performed by the finance and lifestyle integration system of FIG. 3, in accordance with an embodiment of the invention;

FIG. 27 is an illustration of a small business dashboard of the graphical user interface, in accordance with an embodiment of the invention;

FIG. 28 is an illustration of a set-up tool for customizing the small business dashboard, in accordance with an embodiment of the invention;

FIG. 29A is a flow chart illustrating a financial information comparison procedure, in accordance with an embodiment of the invention;

FIG. 29B is an illustration of a spending comparison tool, in accordance with an embodiment of the invention;

Figure 30:
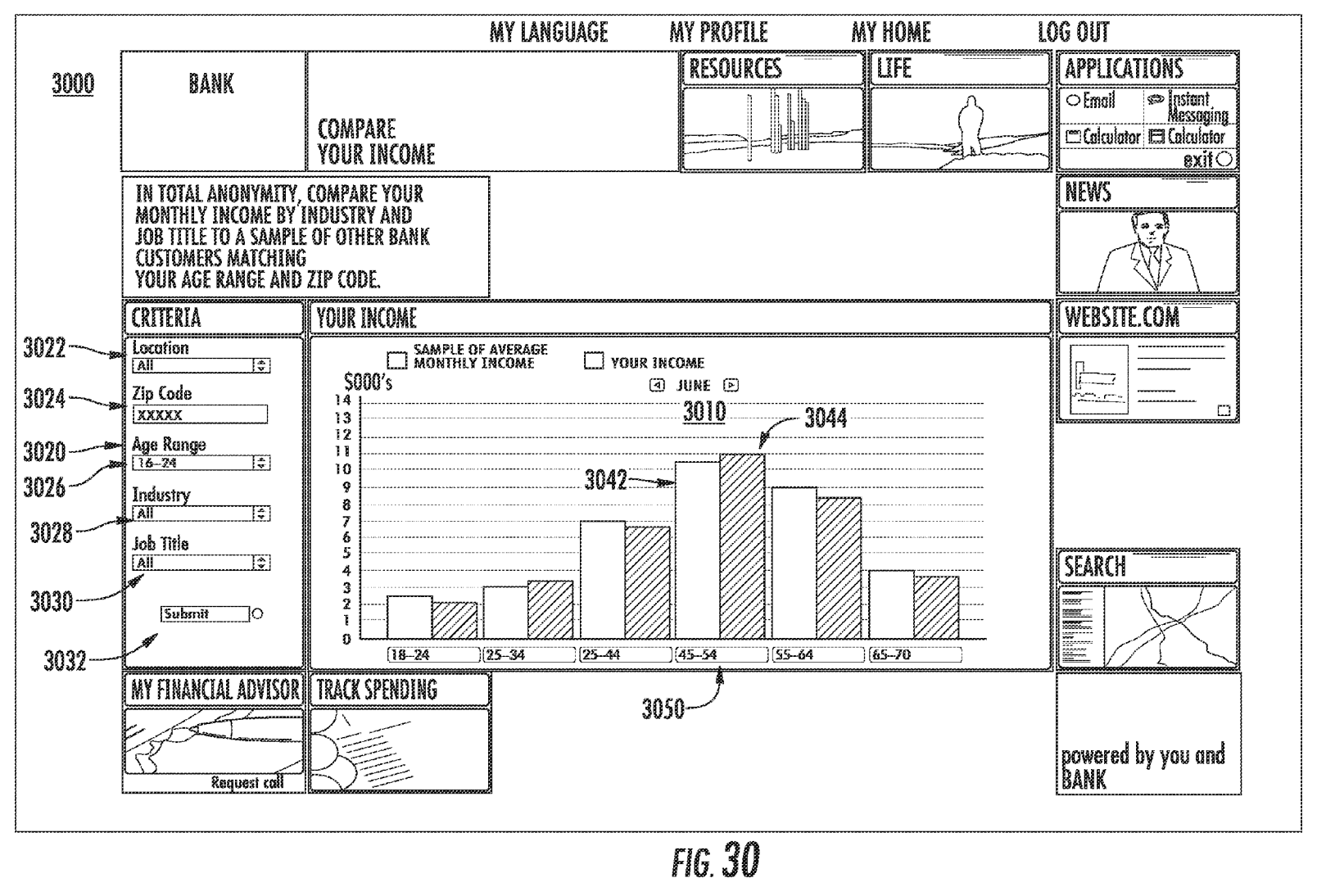

FIG. 30 is an illustration of an income comparison tool, in accordance with an embodiment of the invention;

FIG. 31 is an illustration of a set-up tool for customizing the financial tools offered on the money dashboard, in accordance with an embodiment of the invention;

FIG. 32A is an illustration of a card customization tool for creating a customized bank card, in accordance with an embodiment of the invention;

FIG. 32B is a flow chart illustrating a card customization process performed by the finance and lifestyle integration system of FIG. 3, in accordance with an embodiment of the invention;

FIG. 33 provides a flow chart illustrating a portal customization process performed by the finance and lifestyle integration system of FIG. 3, in accordance with an embodiment of the invention;

FIG. 34 is an illustration of a life dashboard of the graphical user interface, in accordance with an embodiment of the invention;

Figure 35:
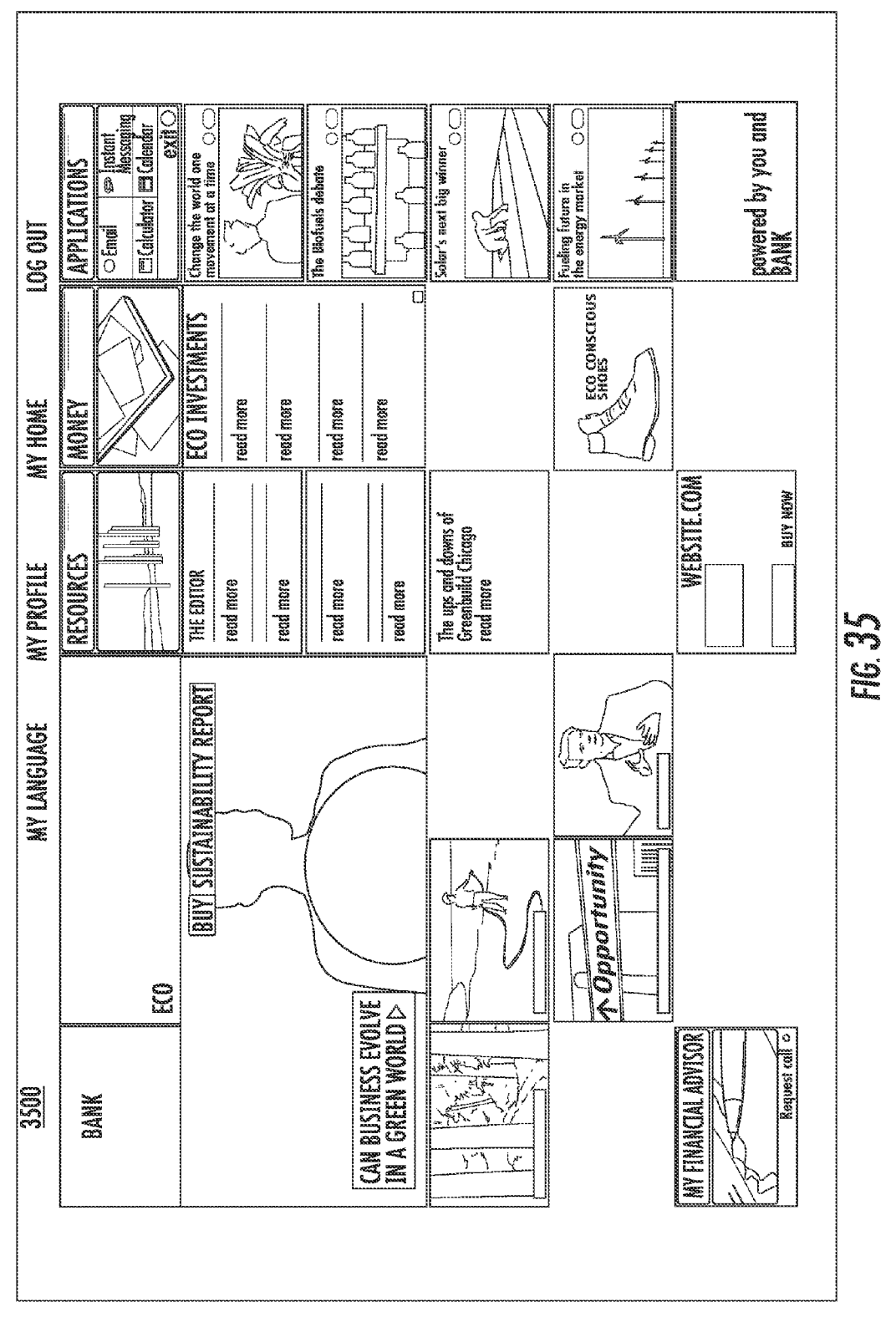

FIG. 35 is an illustration of an environment and eco-friendly dashboard, in accordance with an embodiment of the invention;

Figure 36:
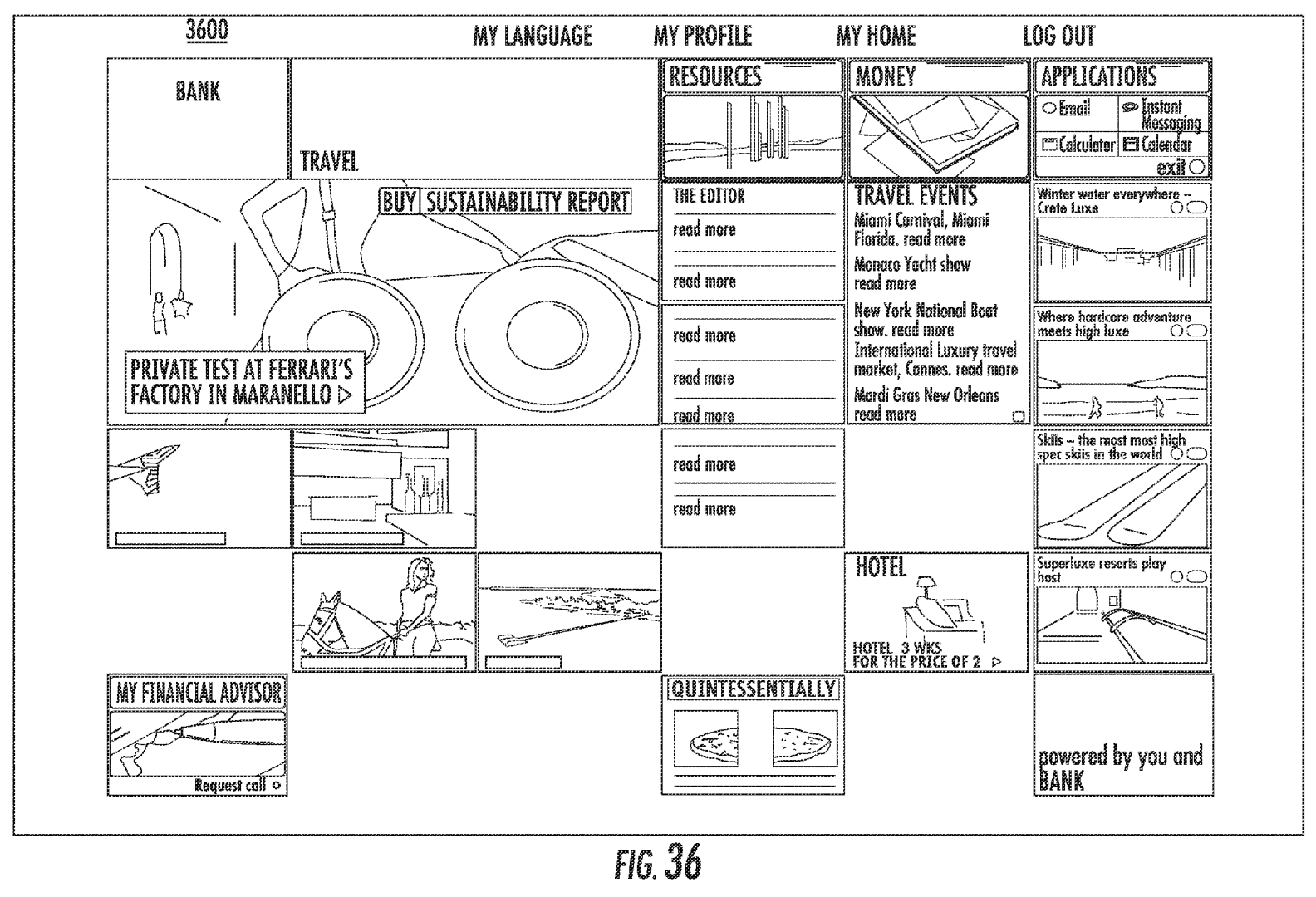

FIG. 36 is an illustration of a travel dashboard, in accordance with an embodiment of the invention;

FIG. 37 is an illustration of a family-friendly dashboard, in accordance with an embodiment of the invention;

FIG. 38 is an illustration of a film dashboard, in accordance with an embodiment of the invention;

FIG. 39 is an illustration of a philanthropy-related dashboard, in accordance with an embodiment of the invention;

FIG. 40 is an illustration of a community-related dashboard, in accordance with an embodiment of the invention;

Figure 41:
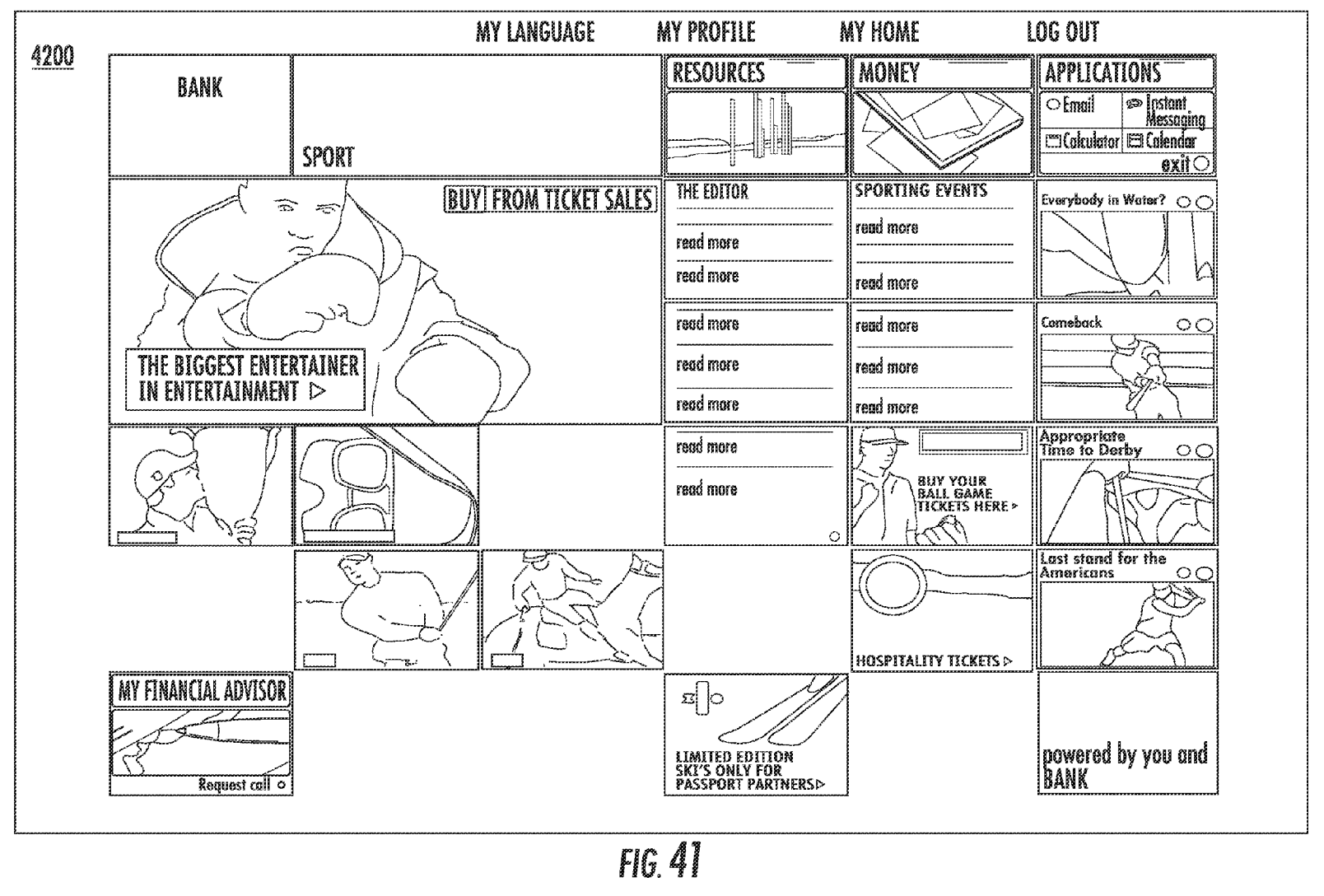

FIG. 41 is an illustration of a sports-related dashboard, in accordance with an embodiment of the invention;

FIG. 42 is an illustration of a fashion-related dashboard, in accordance with an embodiment of the invention;

FIG. 43 is another illustration of the fashion-related dashboard, in accordance with an embodiment of the invention;

FIG. 44 is an illustration of a concierge tool, in accordance with an embodiment of the invention;

FIG. 45 is an illustration of a shopping offers tool, in accordance with an embodiment of the invention;

FIG. 46 is an illustration of a set-up tool for customizing the portal's life dashboard, in accordance with an embodiment of the invention;

FIG. 47 is an illustration of a resources dashboard of the graphical user interface, in accordance with an embodiment of the invention;

FIG. 48 is an illustration of a digital vault tool, in accordance with an embodiment of the invention; and FIG. 49 is an illustration of a fraud and identity protection tool, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention address a financial institution's needs for improved customer service by providing a personalized online portal that integrates a customer's financial interests with the customer's other lifestyle interests in an attempt to provide the customer with a "one-stop" shop for accessing the internet and a customized online experience tailored particularly to the customer. In this regard, embodiments of the online portal described herein provide, amongst other features, improved financial planning tools, an attractive and customizable user interface, personalized merchant offers and product advertisements based specifically on the customer's financial information, tools to help integrate a customer's finances with other aspects of the customer's life, and other user-friendly and novel financial and non-financial tools.

More particularly, embodiments of the present invention attract customers to the financial institution with a number of unique financial tools that help a customer analyze his or her finances and plan for the future. For example, one aspect of the invention provides a computer-based system that aggregates a customer's financial information across a plurality of different financial products so as to provide the customer with an overall view of his or her current financial situation and financial net worth. In one embodiment, the aggregation of different financial products includes the aggregation of information from a plurality of different financial institutions.

Another aspect of the invention provides a comparison of the customer's financial history, current situation, and/or future financial plan(s) to an average customer of the financial institution. In one embodiment, the average is calculated over a certain user-selected peer group of customers who share a common characteristic with the customer to which the average is being compared. For example, in one embodiment the customer's finances are compared to the average finances for a person who lives in the same geographic region as the customer, is approximately the same age as the customer, and/or has an occupation similar to that of the customer.

Another aspect of the invention provides a "what if" tool that automatically provides personalized recommendations about how the customer can save money and how the customer should invest. For example, in one embodiment, a savings recommendations tool analyzes the customer's spending habits and cash flow, makes determinations regarding which debits and receipts are regular, which are ad hoc, which are necessary, and which may be discretionary, compares the data and determinations to the average debits and receipts of a peer group of people and/or one or more rules, and makes recommendations based on these comparisons about areas where the customer may be able to save money. The portal also includes a number of scenario calculators that can predict cash flow and then project certain savings, spending, and investing plans into the future so that the customer can more accurately analyze and compare different savings, spending, and/or investing plans.

For example, in one embodiment of the invention, a tool is provided that takes a person's financial data (accumulated from one or multiple sources and financial institutions) and determines which transactions are regular and which are ad hoc and then projects future cash flow. Furthermore, in one embodiment, the tool is configured to use this projected cash flow data to make automatic recommendations on how the user can save more money in the future based on known offers and/or transactions made by others. For example, in one embodiment, the system can see from the user's past debit card purchases that a user buys product "A" about once per month. The tool may know of an offer for a competing product "B" that would save the user money in the future and could recommend this to the user and project the user's savings in the user's budget projections. In another example, the tool may know based on transactions made by other users that product "A" can be purchased for less at another merchant (such as at an online merchant instead of the brick-and-mortar merchant from which the user purchased product "A") and then recommend this option to the user and project the user's savings.

Another aspect of the invention is directed to a unique grid-like user interface where the web page has a fixed grid and each icon, advertisement, header, tool, or other content field/window is a certain minimum rectangular shape or a multiple thereof and aligned with the grid, the grid having cells the same size as the certain minimum rectangular shape. This design makes the user interface highly customizable for the user and consistent from one page to the next.

Yet another aspect of the invention provides a tool that allows a user to build his or her own customized bank card by selecting everything from the image(s) on the card itself to the card shape and the financial terms and rewards, etc. As the user builds the card, the card is displayed for the user with the user's name, selected image, selected card shape, etc. As used herein, a "bank card" includes any payment instrument associated with an account, including, for example, a credit card, a debit card, an ATM card, RFID-type card or device tied to a credit or debit account, a smart card, and/or the like. The bank card need not be associated with a bank and may be associated with other types of financial institutions.

Still another aspect of the invention provides a user interface that allows a user to view data in a line graph and portions of the graph in an intuitive, user-friendly, effective, and appealing manner. Specifically, in one embodiment, a graphical user interface is provided that displays a first graph of a first portion of some data, and a second graph of a second portion of the data, where the second portion of the data includes the first portion of the data. The graphical user interface further includes a first sliding bar and a second sliding bar displayed on the second graph and configured such that a user can move the first and second sliding bars relative to each other and relative to the second graph to increase or decrease the amount of the data displayed by the first graph. Such a user interface may be particularly useful to a user when reviewing stock price histories, financial account histories, and financial projections.

Since a person's finances are often intertwined with the decisions that a person makes on a day-to-day basis, and since many people view their finances online almost daily, embodiments of the present invention attempt to integrate a person's online financial portal with other non-financial information, links, and tools in order to provide a portal that can be used to examine a person's finances and, at the same time, used to examine other non-financial interests. Furthermore, a person's financial information provides significant information about a person and the person's lifestyle and interests. As such, embodiments of the present invention use a customer's financial information to automatically customize the online portal for the customer by, for example, offering product offers, advertisements, web content, and other information based on the customer's financial information, such as the customer's spending history, investment strategies, financial goals, cash-on-hand, income streams, and/or the like. This aspect of the portal also helps customers to save money on everyday, as well as discretionary purchases by presenting them with discount offers in the context of managing their money and connecting with their lifestyle interests. Embodiments of the present invention also provide novel ways of displaying information to a user in unique, customizable, appealing, and effective ways.

Various embodiments or features of the invention will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Various embodiments of the invention will also be presented herein using flow charts and illustrations of screenshots from a graphical user interface. It will be understood to one of ordinary skill in the art in view of this disclosure that some of the steps or actions described in a flow chart or in relation to a screenshot as taking place in a certain order may, in other embodiments, take place in a different order. Likewise, some of the steps or actions described in the flow charts may, in other embodiments, be performed simultaneously or combined into a single step or action.

As will be appreciated by one of skill in the art, the present invention may be embodied as a method (including, for example, a computer-implemented process, business process, etc.), an apparatus (including, for example, a system, device, computer program product, etc.), or a combination of the foregoing. Accordingly, embodiments of the present invention may take the form of an entirely software embodiment (including firmware, resident software, micro-code, etc.), an entirely hardware embodiment (e.g., an application-specific integrated circuit), or an embodiment combining software and hardware aspects that may generally be referred to herein as a "system." Furthermore, embodiments of the present invention may take the form of a computer program product on a computer-readable medium having computer-executable program code embodied in the medium. As used herein, a processor may be "configured to" perform a certain function in a variety of ways, including, for example, by having one or more general-purpose circuits perform the function by executing particular computer-executable program code, and/or by having one or more application-specific circuits perform the function.

Any suitable computer-readable medium may be utilized. The computer-readable medium may be, for example but not limited to, an electronic, magnetic, optical, electromagnetic, infrared, or semiconductor system, apparatus, device, or medium. More specific examples of the computer-readable medium include, but are not limited to, the following: an electrical connection having one or more wires; or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in an object-oriented, scripted or unscripted programming language such as Java, Perl, Smalltalk, C++, or the like. However, the computer-executable program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that blocks of the flowchart illustrations and/or block diagrams, and/or combinations of blocks in the flowchart illustrations and/or block diagrams, can be implemented by computer program instructions embodied in computer-executable program code. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Portal for Relating Financial and Lifestyle Interests

As described briefly above, embodiments of the invention generally relate to methods and apparatus for providing a personalized online portal that integrates a person's financial interests with the person's other non-financial "lifestyle" interests. FIG. 1 provides a block diagram illustrating a finance and lifestyle integration system 1, in accordance with an embodiment of the invention. The system 1 generally includes a user interface 10, a finance and lifestyle integration module 20, and one or more financial and non-financial data sources 80. The finance and lifestyle integration module 20 generally includes a finance module 30, a lifestyle module 50, and a user preferences module 70. As used herein, a module generally includes the mechanisms necessary to perform the functions of the module, such as, for example, the computer mechanisms described below with respect to the exemplary system illustrated in FIG. 3.

FIG. 2 provides a flow chart illustrating a process 90 for integrating a user's financial and non-financial interests, in accordance with an embodiment of the invention. As represented by block 92, a user uses the user interface 10 to access the finance and lifestyle integration module 20. As represented by block 94, the finance module 30 accesses one or more financial data sources 80 to obtain financial data about the user. The finance module 30 uses the user interface 10 to present the financial data to the user. The finance module 30 may also provide one or more tools for helping the user to analyze and manage the user's finances. In this regard, the finance module 30 may include a plurality of modules that provide such financial tools to the user. For example, FIG. 1 illustrates an embodiment in which the finance module 30 includes a "today's money" module 32, a "tomorrow's money" module 34, a peer comparison module 36, a "what if" module 38, a bill pay module 40, a transaction module 42, an advisor module 44, a business module 46, and a card customization module 48. These modules and the functions performed thereby are described in greater detail below.

As represented by block 96, the user preferences module 70 determines user lifestyle preferences based at least partially on the user's financial data. As represented by block 98, the lifestyle module 50 accesses one or more non-financial data sources 80 and then presents non-financial data, such as product offers, advertisements, and online content, to the user based on the user's lifestyle preferences or otherwise based at least partially on the user's financial data. For example, in one embodiment, the user preferences module 70 presents a certain product offer to the user after determining that a user may be interested in the particular product based on the user's history of purchasing a similar or competing product, where this purchase history is determined automatically from the user's debit and/or credit card purchases.

The lifestyle module 50 may also provide one or more tools for helping the user to plan for and/or manage certain financial and non-financial aspects of the user's life. In this regard, the lifestyle module 50 may include a plurality of modules that provide such tools to the user. For example, FIG. 1 illustrates an embodiment in which the lifestyle module 50 includes a resources module 52, an offers module 54, a digital vault module 56, a fraud protection module 58, a goals module 60, an email/calendar module 62, and a rewards module 64. These modules and the functions performed thereby are described in greater detail herein below.

FIG. 3 is a block diagram providing a more detailed illustration of a finance and lifestyle integration system 100, in accordance with an embodiment of the invention. As illustrated in FIG. 3, the finance and lifestyle integration system 100 generally includes a user terminal 120 communicably coupled to a finance and life ("F&L") portal server 140 via a network 110. The F&L portal server 140 is communicably coupled to a user's financial institution 150 and, in some embodiments, one or more other financial institutions 160. The F&L portal server 140 is also communicably coupled to one or more product marketers 170.

The user terminal 120 allows a user 130 to access the F&L portal server 140 over the network 110. For example, in one embodiment, the user terminal 120 includes a personal desktop computer, a laptop computer, a personal data assistant (PDA), a mobile telephone, a smart phone, a kiosk, an automated teller machine (ATM), or other device capable of communicating information between a user and one or more other devices on the network 110. The network 110 may include a local area network (LAN), a wide area network (WAN), and/or a Global Area Network (GAN). In one embodiment, the network 110 includes the Internet.

As illustrated in FIG. 3, the user terminal 120 generally includes a network communication interface 122 for interfacing with the network 110, a user interface for interfacing with a user 130, and a processor 121 for operating the communication interface 122 and the user interface. The user terminal 120 further includes a memory 126 for storing data and computer-executable program code. The computer-executable program code is executed by the processor 121 to implement the functions performed by the user terminal 120.

In one embodiment, the network communication interface 122 includes a modem, server, or other electronic device that communicatively couples the user terminal 120 to another electronic device or a network of devices, such as a LAN, WAN, and/or GAN, such as the Internet. The network communication interface 122 may be configured for wireless or wireline communication. In one embodiment, the communication interface 122 further includes an antenna communicatively coupled to the processor 121 via a transmitter and/or a receiver.

The user interface includes one or more user output devices, such as a display device 124 and a speaker 125 or other audio device (e.g., a ringer, buzzer, or bell). The user interface further includes one or more user input devices 123, such as one or more keys or dials, a touch pad, touch screen, mouse, microphone, and/or the like.

It is understood that the processor 121 includes circuitry required for implementing audio, visual, and/or logic functions of the user terminal 120. For example, the processor 121 may include a digital signal processor device, a microprocessor device, and/or various analog-to-digital converters, digital-to-analog converters, and other support circuits. Control and signal processing functions of the user terminal 120 are allocated between these devices according to their respective capabilities. The processor 121 may include functionality to operate one or more software programs based on computer-executable program code thereof, which may be stored in the memory 126.

In one embodiment of the invention where the user terminal 120 communicates with the F&L portal server 140 over the Internet and/or using web-based communication protocols, the memory 126 includes one or more web browsing applications 127 stored therein for assisting with communication of information between the user 130 and one or more devices on the Internet and/or using web-based communication protocols. In this regard, the web browsing applications 127 may allow the user terminal 120 to transmit and receive web content, such as location-based content, according to, for example, Hypertext Transfer Protocol (HTTP) and/or a Wireless Application Protocol (WAP).

In general, the memory 126 is communicatively coupled to the processor 121. The memory 121 may include volatile memory, such as volatile Random Access Memory (RAM) including a cache area for the temporary storage of data. The memory 121 may also include non-volatile memory, which can be embedded and/or may be removable. The non-volatile memory can additionally or alternatively comprise an EEPROM, flash memory, or the like. The memory 121 can store any of a number of pieces of information and data used by the user terminal 120 to implement the functions of the user terminal 120. For example, the memory 121 can include an identifier, such as a serial number, capable of uniquely identifying the user terminal 120 and/or the type of user terminal 120.

As further illustrated in FIG. 3, the F&L portal server 140 generally includes a network communication interface 144 communicably coupled to a memory 146 via a processor 142. The network communication interface 144 is configured to permit communication between the F&L portal server 140 and the user terminal 120 via the network 110, such as the Internet. The network communication interface 144 is also configured to permit communication between the F&L portal server 140 and the user's financial institution 150, one or more other financial institutions 160, and one or more product marketers 170. The finance and life portal server 140 communicates with these other entities through the network 110, which, as described above, may include a LAN, WAN, or GAN, such as the Internet.

The memory 146 of the F&L portal server 140 may include both volatile and non-volatile memories and is configured to store data and computer-executable program code. As illustrated in FIG. 3, in one embodiment, the memory 146 includes a data store of user preferences 148, a data store of an aggregation of the user's financial information 149, and an F&L portal application 147. The F&L portal application 147 includes computer-executable program code that can be executed by the processor 142 to perform the logic functions of the F&L portal server 140.

As used herein, the term "financial institution" generally refers to an institution that acts as an agent to provide financial services for its clients or members. Financial institutions include, but are not limited to, banks, building societies, credit unions, stock brokerages, asset management firms, savings and loans, money lending companies, insurance brokerages, insurance underwriters, dealers in securities, credit card companies, and similar businesses.

The user's financial institution 150 is a financial institution, such as a bank, that maintains a financial account, such as a credit account or a deposit account, for the user 130. In this regard, the user's financial institution 150 maintains data stores of the user's account information 152, other customer account information 154, and product information 156. The other financial institutions 160 are other financial institutions, such as other banks or lending companies, that maintain other accounts, such as other deposit accounts, credit accounts, and investment accounts, for the user 130. In this regard, the other financial institutions 160 maintain data stores of the user's account information 162, other customer account information 164, and product information 166.

The product marketers 170 are institutions that advertise and/or offer products. As used herein, the term "products" refers to goods, services, events, information, and the like. The product marketer 170 may include retailers, manufacturers, service providers, advertising and marketing agencies, charitable organizations, governing agencies, information providers, and/or the like. The product marketers 170 maintain data stores of product offers 172 and advertisements 174. In one embodiment, the data stores of product offers 172 and advertisements 174 include information about a target demographic for the product offer or advertisement. A product offer may include a discount, promotion, sale, rebate, etc.

Although FIG. 3 illustrates the F&L portal server 140 as being separate from the user's financial institution 150, in one embodiment, the user's financial institution maintains the F&L portal server 140 or is otherwise directly associated with the F&L portal server 140. For example, in an exemplary embodiment, the user 130 accesses the F&L portal server 140 via the financial institution's website. Furthermore, although only one user 130 and one user terminal 120 are illustrated in FIG. 3, it is understood that embodiments of the invention are configured to serve the financial and lifestyle planning needs of numerous users operating numerous user terminals. Further still, although embodiments of the invention described herein primarily disclose a system in which the finance and life portal application 147 is located on a server, in other embodiments of the invention, at least a portion of the finance and life portal application 147 is located on the user terminal 120 and, in some instances, includes web browsing functionality so that a separate web browser application is not needed.

In one embodiment of the invention, the process illustrated in FIG. 2 is performed by the system illustrated in FIG. 3. For example, in one embodiment, a user 130 uses the user input devices 123 to access the F&L portal server 140. The F&L portal server 140 accesses the user's financial institution 150 and/or one or more other financial institutions 160 to obtain financial data about the user 130. The F&L portal server 140 uses the display device 124 to present the financial data 149 to the user 130. The F&L portal server 140 may also provide one or more tools for helping the user 130 to analyze and manage the user's finances. In one embodiment, the F&L portal application 147 determines user lifestyle preferences 148 based at least partially on the user's financial data 149. The F&L portal server 140 may access one or more product marketers 170 and present non-financial data, such as product offers, advertisements, and online content, to the user 130 based at least partially on the user's lifestyle preferences 148 or otherwise based at least partially on the user's financial data 149.

FIG. 4 provides a more detailed illustration of a process 200 of gathering a person's financial data, in accordance with one embodiment of the invention. As illustrated by block 202, in the illustrated embodiment, the F&L portal server 140 may directly access the records of a financial institution 150 involved with a user 130 and gather financial data about the user's account with the financial institution 150. For example, in one embodiment, the F&L portal server 140 is provided by a particular bank. In an embodiment where the user 130 has an account with that same bank, the F&L portal server 140 may have direct access to the bank's records about the user.

However, in some embodiments of the invention, the user 130 may have accounts with one or more other financial institution's 160, such as other banks, credit card companies, credit reporting agencies, lenders, mortgage servicers, etc., and the F&L portal server 140 may not have direct access to the records of some of these other financial institutions 160. As illustrated by block 204, in such situations some embodiments of the F&L portal server 140 are configured to use, with the user's approval, screen scraping techniques to access the user's account information 162 held by the other financial institutions 160.

Screen scraping is a technique in which a computer system extracts data from the display-type output of another program. The system doing the scraping is called a screen scraper. In the illustrated embodiment, the F&L portal server 140 is the screen scraper. In screen scraping, the output being captured by the screen scraper is typically intended for display to an end-user, rather than as input to another program, and is therefore usually in a human-readable format or in a standard format used by a user's application, such as a web browser, for displaying information to the user. The screen scraper, however, is configured to access the display-type output and extract data from this output and use it as input to another program. For example, in one embodiment of the invention, the user 130 has a credit card with another financial institution 160 that does not provide the F&L portal server 140 with direct access to the user's account information, even with the user's permission. In such a scenario, the F&L portal server 140 is, in one embodiment, configured to receive the user's login information (e.g., user ID and password), or other authorization tools, and use the login information to access the user's account online through the other financial institution's customer website. Once the F&L portal server 140 has access to the user's account online, the F&L portal server 140 can extract financial information associated with the user's account from data displayed through the website and/or from HTML code output by the other financial institution's server.

Once the F&L portal server 140 gathers the user's financial data 149 available to the F&L portal server 140, the F&L portal 140 analyzes the user's financial data 149 to determine user preferences 148, as represented by block 206 in FIG. 4. For example, in one embodiment, the F&L portal server 140 bases user preferences 148 based at least partially on trends identified in the user's financial data 149. As such, in one embodiment, the F&L portal server 140 determines which financial transactions and/or financial transaction parameters are regular and which are ad hoc. As used herein, a financial transaction may include any type of financial transaction such as, for example, a product purchase, product return, deposit, withdrawal, cash back transaction, transfer, account inquiry, and/or the like. As used herein, a transaction parameter may be any characteristic of a financial transaction, such as the geographic location of the transaction, the store in which the transaction took place, the company with which the transaction was made, the bank involved in the transaction, the type of financial transaction, the type of financial instrument used in the transaction, the amount of the transaction, a product involved in the transaction, the date of the transaction, the day of the week/month/year of the transaction, the time of day of the transaction, and/or the like.

As represented by block 208, the F&L portal server 140 uses the financial data and, in some instances the trends and other user preferences identified therefrom, to provide financial data and analysis of said data to the user using a plurality of financial tools described in greater detail below. With the ability of the F&L portal server 140 to, in some embodiments, accumulate financial data across a number of different financial institutions and identify trends and regular versus ad hoc transactions, the F&L portal server 140 can, in some embodiments, present the data to the user 130 in unique ways. In some embodiments, the F&L portal server 140 also provides financial advice, such as suggestions for saving money, and/or projects a user's cash flow and predicts upcoming financial transactions and hardships, and/or approximates the attainability of the user's financial goals.

As illustrated by block 210, in addition to providing financial data and services to the user 130, embodiments of the F&L portal server 140 further provide non-financial, or "lifestyle," content based at least partially on the trends and other user preferences gathered from the user's financial data 149 and one or more rules associated with the lifestyle content. As used herein, non-financial content and lifestyle content include content not directly related to the user's financial data, such as articles on various topics, websites and other online content, images, news, headlines, tips, advertisements, promotions, product information, information about events, and/or the like. For example, as described in greater detail in several examples below, in some embodiments the F&L portal server 140 provides the user with links to other web-based content based on the user's interests identified from the user's financial transactions. In some embodiments, the F&L portal server 140 may provide targeted product offers and advertisements based on the user's preferences 148 gathered from the financial transactions 149. In one embodiment, the financial data and the lifestyle data are combined into a single online experience customized for the user 130, in which financial data, non-financial content, and even the layout of the user interface, are uniquely targeted to the specific user based at least partially on user preferences 148 generated based on the user's financial data 149.

As illustrated by block 212, in one embodiment the F&L portal server 140 allows the user 130 to adjust the user's preferences 148 and customize the content of the user's unique portal and its graphical user interface. The graphical user interface and its ability to be customized for and by a user 130 is described in greater detail below with reference to numerous figures illustrating the graphical user interface and functions performed thereby.

FIG. 5 illustrates a process 220 of identifying user preferences 148 from a user's financial data 149 as performed by the F&L portal server 140 in accordance with one embodiment of the invention. As illustrated by block 222, the F&L portal server 140 analyzes the user's history of financial transactions. As represented by block 224, the F&L portal server 140 then identifies and groups similar transactions together. For example, the F&L portal server 140 may identify one or more groups of transactions by identifying transactions that share a particular one or more transaction parameters, such as, for example, the destination of money or a product, source of money or a product, transaction amount, transaction type, product type, product brand, transaction date, and/or the like. In one embodiment, a single financial transaction may be placed in a plurality of different groups.

As illustrated by block 226, the F&L portal server 140 then analyzes the transaction groupings and determines trends within each grouping. For example, in one embodiment, the F&L portal server 140 looks within a group of transactions and determines how often or regularly a particular transaction or transaction parameter occurs.

As illustrated by block 228, the F&L portal server 140 then analyzes the identified trends in the transactions and transaction parameters to determine user preferences, such as which transactions and/or transaction parameters are regular and which are ad hoc. The user preferences 148 are stored in the memory 146 of the F&L portal server 140 so that they can be used by the F&L portal server 140 and the tools supported thereby to provide a customized experience for the user 130 through the F&L portal. In one embodiment, the F&L portal server 140 repeats this process 220 periodically for each user 130 in order to capture changes or inaccuracies in previously-determined user preferences 148.

For example, in one embodiment, the network communication interface 144 contacts the user's bank and gathers information about the financial transactions made by a user using the user's debit card. The network communication interface 144 also contacts another bank with whom the user has a credit card and uses screen scraping from the other bank's online banking website to obtain information about the financial transactions made by the user via the user's credit card. The user's credit and debit transactions are then stored in the memory 146 and associated with the user 130. The processor 142 then executes the instructions of the F&L portal application 147 and analyzes the user's credit and debit transactions to identify any trends. For example, supposing that, over the course of the previous year, the user 130 made numerous purchases at several different home improvement and hardware stores and the F&L portal server 140 can identify this fact using, for example, vendor codes that were sent with the authorization requests when the purchases were made. In one embodiment, the F&L portal server 140 groups all of these purchases together since they all were made at home improvement/hardware stores, albeit different home improvement/hardware stores. From this grouping, the F&L portal server 140 may determine certain user preferences 148 based on one or more rules. For example, the F&L portal server 140 may total-up the number of transactions and/or the amount of money spent by the user in this home improvement grouping and compare the total to a predefined number of transactions, amount of money spent, percentage of total transactions or money spent, and/or the like. Based on this comparison, the F&L portal server 140 may determine that the user 130 is a homeowner, has interests in tools, gardening, and/or other home improvement-type subjects and/or the like. This information may be stored in the memory 146 as user preferences 148. These user preferences 148 may then be used to target certain promotions, advertisements, and online content to the user. For example, when the user enters the F&L portal through the user's terminal, the user's homepage may automatically display a higher percentage of advertisements by home improvement stores and tool manufacturers and/or the homepage may automatically have one or more links to recent articles or websites on do-it-yourself projects, gardening, landscaping, and the like.

In another example, the F&L portal server 140 determines that the user's financial data 149 indicates that the user 130 makes $400 worth of ad hoc purchases per month. The F&L portal server 140 may also determine that of these ad hoc purchases, 60% are purchases for electronics or electronic accessories and 80% those purchases are made online. In response to these preferences, the F&L portal server 140 may include a number of promotional offers and advertisements on this user's F&L portal from online electronics retailers. Furthermore, any promotional offers may be for products in the $400 range since this is a range that the user's preferences 148 indicate the user is willing to spend per month on ad hoc (i.e., impromptu, discretionary, and/or non-essential) purchases.

In still another example, the financial data 149 includes at least some product level data about the products purchased by a user 130, such as UPCs, SKUs, or other product identifying information. In such embodiments, the F&L portal server may determine user preferences 149 based at least partially on the specific products purchased. For example, the F&L portal server 140 may determine that a particular user 130 only purchases name brand products from name brand retailers and, thus, will avoid providing promotions to the user 130 on the user's F&L portal for discount stores and generic brands. From this type of preference, other preferences may also be assumed by the F&L portal server 140, such as, for example, the user's preference for high-end fashion. As a result of this assumed preference, the F&L portal server 140 may provide a link or page on the user's F&L portal directed to articles and other content about the latest fashion trends. In another example, the F&L portal server 140 may identify that the user purchases many products marketed specifically as being eco-friendly and, as a result, the F&L portal server 140 may include content on the user's F&L portal about the environment, links to other sites with content on the environment, and advertisements for other environmentally friendly products, such as alternatively-fueled automobiles.

In still another example, a user's recent purchases may indicate that the user is a mother of a recently-born child. For example, the F&L portal server 140 may make such a determination based on such factors as recent financial transactions made at a hospital, recent purchases made at a popular retailer of baby products, and the fact that the user is a female. In response, the F&L portal server 140 may add a page on the user's F&L portal having information about newborns, mommy groups, baby products, and/or other resources for a new mother. These preferences may also change other content on this user's F&L portal. For example, on an entertainment page of the F&L portal, more children's movies may be advertised in addition to movies targeted to an adult female. Likewise, on a travel page of the F&L portal, articles and advertisements about trips to Disneyworld® or other child-friendly destinations may suddenly appear along with discussions and advertisements about other trips targeted to young families.

In one embodiment, the confidentiality of the user's financial data 149 and user preferences 148 is strictly maintained throughout the process. For example, in one embodiment, content providers that provide content for the F&L portal may provide specific information or rules regarding their product and the target demographic. For example, the product marketers 170 may provide product offers 172 and product advertisements 174 that identify information about the product being marketed, such as price and function, and information about a target demographic. The F&L portal 140 may then display the product offers 172 and advertisements 174 only in the F&L portals of those users whose preferences 148 are in line with the target demographic for that offer or advertisement and/or who otherwise show a propensity to purchase the offered or advertised product. In this way, in one embodiment, an individual user's specific preferences and financial data are consistently maintained by F&L portal server (which may be maintained by one of the user's financial institutions) and are not provided to third parties.

In one embodiment, the product marketer 170 may compensate the owner of the F&L portal server 140 based on the number of times the marketer's offers or ads are displayed on different users' F&L portals. In this regard, in one embodiment, the F&L portal server 140 is configured to track information about use of the F&L portal, such as the number of times a particular advertisement or other content is displayed, the number of users the content is displayed to, the number of times users click or view particular content, and/or the like.

From these examples, it should be clear that embodiments of the present invention may provide a powerful resource to users by automatically identifying their interests based on their financial transactions and then providing the user with an online tool that allows the user to view his or her financial information while at the same time exploring online articles, product offers, and other content directed specifically to the particular user's interests. This tool can also be powerful for product marketers 170 by helping them to target their promotions and advertisements more specifically to the particular user's that want to see these offers and advertisements and are more likely to pursue such offers and advertised products. The following figures describe one embodiment of the F&L portal in more detail and show examples of how the F&L portal can combine a user's financial interests with the user's non-financial interests in a customized and user-friendly manner.

FIG. 6 provides a flow chart illustrating a process 240 performed using the finance and lifestyle integration system 100, in accordance with an embodiment of the invention. As represented by block 242 in the flow chart, the user 130 utilizes the user terminal 120 to access the F&L portal server 140. For example, in one embodiment, the user 130 accesses the F&L portal server 140 by entering a uniform resource locator (URL) or other network location identifier into a web browsing application 127 of the user terminal 120. In another embodiment, however, a portion of the F&L portal application 147 resides in the memory 126 of the user terminal 120, in which case the user 130 would instruct the processor 121 to execute the F&L portal application 147, which would then use the network communication interface 122 to contact the F&L portal server 140.

As represented by block 244 of FIG. 6, in the embodiment where the user 130 access the F&L portal server using a web browser application 127, the F&L portal server 140 responds to the user 130 by providing a web page that requests that the user log-in to the user's account on the F&L portal server 140. For example, in one embodiment, a graphical user interface is provided to the user 130 by the F&L portal server 140 when the user 130 attempts to contact the F&L portal server 140 over the network 110. In one such embodiment, the F&L portal server 140 requests that the user 130 enter a username and a password in order to log-in to the F&L portal server 140. If the user 130 does not have an account on the F&L portal server 140, which, in one embodiment, may mean that the user does not have an account with the financial institution 150, the user 130 can select one or more links that allow the user 130 to: (i) learn more about the F&L portal and the financial institution associated with the portal, (ii) take a tour of some of the features of the F&L portal, and (iii) apply for an account on the F&L portal and/or with the financial institution. In one embodiment, the F&L portal is offered to all customers of the financial institution 150, while in other embodiments, the F&L portal is a product offered by the financial institution at an additional cost to the user or as a feature associated only with certain types of accounts.

As represented by block 246 of FIG. 6, after the user 130 logs into the user's account on the F&L portal server 140, the F&L portal server 140 provides the user 130 with the user's financial information, links, and/or tools, as well as non-financial information, links, and/or tools. As described in greater detail below, at least some of the non-financial information, links, and/or tools are provided based on the user's financial information obtained from one or more financial institutions.

FIG. 7 illustrates an exemplary graphical user interface "homepage" 600 that provides the user 130 with links to both financial information and personalized non-financial "lifestyle" information, in accordance with one embodiment of the invention. The exemplary graphical user interface illustrated in the following figures is, in one embodiment, generated by the F&L portal application 147 and transmitted by the F&L portal server 140 to the user terminal 120, where the graphical user interface is displayed on the display device 124. The user 130 interacts with the F&L portal server 140 by actuating one or more input devices 123 based on what the graphical user interface and the user terminal are displaying on the display device 124. In other embodiments however, the graphical user interface may be generated by an application stored on the user terminal 120 that is configured to access the F&L portal server 140 to obtain information to display in the graphical user interface.

As illustrated in FIG. 7, the embodiment of the graphical user interface described herein is configured to be substantially icon-based as opposed to text-based, with attractive and unique icons and tools arranged in a generally grid-like pattern. In one embodiment, the user 130 can customize one or more aspects of the graphical user interface, such as the background image (not shown in the figures for clarity purposes), icon images, icon text, icon size, and icon locations.

In the illustrated embodiment, the graphical user interface has a grid 602, shown in FIG. 7 as a dotted line since the lines of the grid 602 may or may not be displayed to the user 130. In some embodiments, the grid 602 is present, but hidden from the user's view. The cells of the grid 602 are rectangular in shape and sized so that they are the same size as a base icon. The base icon, such as icons 610-670 are icons used to portray information to the user 130 and/or to serve as links to one or more other pages/tools in the user's F&L portal. The base icons are the same size of the cells of the grid 602 so that a user 130 can easily click on the base icons and arrange them in different locations and configurations on the grid 602 or replace them with other available icons of the same size that the user may prefer to have on his or her customized F&L portal. Some of the grid cells may also be filled with other content, such as logos 608 associated with the F&L portal server 140 and/or other tools, such as the applications tool 690 which provides links to other applications such as the user's email, instant messaging, calculator, and calendar applications. FIG. 7 also shows two advertisements 604 and 606 that may either be the size of the base icon, such as with advertisement 606, or some multiple of the base icon, such as with advertisement 604.

As will be shown in numerous figures described herein, other tools, advertisements, promotions, windows, displays, and/or the like that are presented to the user 130 in the F&L portal are generally presented within a field/window that is at least the size of a cell of the grid 602 and, if larger than one cell, are precisely the size of multiple cells. In other words, each tool, window, icon, advertisement, etc., shown on the F&L portal will be sized such that it is a multiple of the basic cell of the grid 602 (i.e., a multiple of the basic icon size). It should be appreciated that this unique configuration, where everything is rectangular in shape, multiples of a base icon size, and placed on a grid 602 having cells of the base icon size, results in a graphical user interface that is highly customizable, flexible, and changeable by the user and/or by the system providing the user interface. It also allows for little wasted space, since, for example, any open space in the graphical user interface not filled by a user's selection of certain links or tools may be easily filled by the F&L portal server 140 with advertisements, tools, promotions, or other content based on user preferences 148. Furthermore, this user interface provides clear guidance to product marketers 170, tool developers, and other providers of content for the F&L portal about specifically how much space may be available and the dimensions of that space.

In the exemplary user interface illustrated in FIG. 7 and the other figures described herein, the grid 602 is six-by-six. In other words, the grid 602 is six cells wide by six cells high. In other embodiments, the grid 602 is 5×5, 7×7, 8×8, 5×6, 6×5, 6×7, 7×6, 6×8, 8×6, 7×8, 8×7, or any other size. In some embodiments, the grid size is chosen by the user from a plurality of possible grid sizes or is dependent upon the size of the screen. In other embodiments, the grid size is fixed and the same for all users.

In the exemplary embodiment illustrated in FIG. 7, the graphical user interface homepage 600 generally provides the user 130 with a "money" link 610, a "life" link 620, and a "resources" link 630. Other links may also be added to the homepage 600 by the user 130. For example, the user 130 may choose to add one or more links to the user's favorite websites on the Internet, such as a link to a particular news site 640, a link to a particular retailer 650, and a link to a particular search engine 660. In another embodiment, these additional links are provided automatically by the F&L portal server 140 based on the user's Internet browsing history and/or on the user's preferences 148 obtained from the user's financial data 149. For example, the F&L portal server 140 may determine, based on a significant number of credit and/or debit card purchases made from sports-related retailers, that the user 130 is interested in sports. In such an example, the F&L portal server 140 may then automatically include a link to a popular sports news website on the user's homepage 600. In still other embodiments, one or more links on the user's homepage 600 are provided based on relationships that the financial institution 150 has with certain website providers. For example, where the financial institution 150 maintains the F&L portal server 140, the financial institution 150 may sell link space on the user's homepage 600 to marketers and other businesses.

FIG. 8 illustrates a set-up tool 700 that allows the user to select and/or create the user's favorite links to include on the user's homepage 600, in accordance with an embodiment of the invention. As described above, some of the links that are made available to the user 130 may be links with which the financial institution 150 has a relationship, and/or that the F&L portal server 140 has determined are popular and may be of interest to the user 130 based on the user's preferences, browsing history, and/or financial information. The user may create new links and customized icons using, for example, the "create new link" tool 710. As illustrated in FIG. 8, the user can toggle between including a link on the user's homepage 600 and not including the link on the homepage 600 by clicking on the link's icon in the set-up tool 700. In the illustrated embodiment, links that are not selected for the user's homepage 600, such as links 720, 745, and 750, are "grayed-out" or made semi-transparent (shown in FIG. 8 as having dashed lines) to distinguish these links from links that are selected for the user's homepage 600, such as link 730 and 740, which are displayed in full color and/or are not transparent or at least less transparent (shown in FIG. 8 as having solid lines). FIG. 8 also illustrates how banners, like banner 705, or other headers or instructions to the user 130 are also sized to be multiples of the base icon and aligned with cells of the grid 602.

In some embodiments, the icons provided in the user interface are not entirely static. For example, in one embodiment, the icon for the news site 640 actually plays the live news or a clip of the news in a window in the news site icon 640. In such an embodiment, clicking on the icon 640, or a button displayed on the icon, may toggle the volume on and off or toggle between a playing state and a paused or stopped state. Similarly, the icon for the retailer 650 may periodically change to display a different product advertisement or offer, which is, in some embodiments, based automatically on the user's preferences and/or financial information. In another example, the money icon 610 could display the user's current balance in the user's checking account, or some other significant and/or user-selected item of financial information.

As described above, the user's interface homepage 600 may also include one or more links to other applications 690, such as an email application, a calendar application, a calculator application, and an instant messaging application. In one embodiment, these other applications 690 are user-defined applications that exist on the user terminal 120 or on the network 110 outside of the F&L portal application 147. In other embodiments, however, one or more of these other applications 690 are part of the F&L portal application 147. In the embodiment of the F&L portal illustrated herein, these applications 690 and the F&L portal logos 608 remain consistently in the same place on most or all of the pages of the graphical user interface.

As further illustrated by FIG. 7, moving the user's cursor over or otherwise selecting the "My Profile" link causes a drop-down menu 680 that provides links to tools that allow the user 130 to set up or edit various aspects of the user's profile. The user's interface homepage 600 also provides the user 130 with a "My Financial Advisor" link 670 that provides the user with a link to a financial advisor. These tools and other tools are described in greater detail below.

Financial Tools

FIG. 9 illustrates another process 800 performed by the F&L portal server 140 of FIG. 3, in accordance with an embodiment of the present invention. As represented by block 810, the F&L portal server 140 obtains a user's financial information from one or more financial institutions across a plurality of different financial products. For example, in one embodiment, the F&L portal server 140 receives information from the user's financial institution 150 about a plurality of different financial products that the user is taking advantage of at that institution. For example, the user 130 may have a checking account, savings account, investment account, mortgage, education loan, car loan, personal loan, credit card account, and/or the like maintained by the financial institution 150. In some embodiments, the F&L portal server 140 also receives financial information about the user from one or more other financial institutions 160 with which the user 130 does business. Where a financial institution maintains or is affiliated with the F&L portal server 140, the F&L portal server 140 may be able to receive a user's financial information from such a financial institution automatically, without user input. However, where a financial institution is not affiliated with the F&L portal server 140, the user 130 may need to initially provide the F&L portal server 140 with account identifying information and one or more pass codes associated with each account.

In one embodiment of the invention, the F&L portal server 140 receives, along with financial information received about a user's credit, debit, and loan accounts, information about products that were purchased by the user with money from the user's accounts. In some embodiments, the only product information that may be collected by the financial institution is information about the type of vendor that sold the goods or services to the user. For example, the financial institution 150 may be able to provide the F&L portal server 140 with such product information as the fact that a certain debit card purchase was made at a grocery store. In other embodiments, however, the financial institution 150 may also be able to obtain and provide the F&L portal server 140 with such product information as uniform purchase codes (UPCs) or other identifying information about the specific products or types of products purchased by the user. This level of detail about a user's purchases can be useful to the F&L portal server 140 when the F&L portal server 140 is selecting content, product offers, and advertisements to display on the user's customized portal, as described in greater detail below.

Referring again to FIG. 9, as represented by block 820, after the F&L portal server 140 receives the user's financial information across a plurality of financial products and/or institutions, the F&L portal server 140 then aggregates the user's financial information to determine a substantially complete financial picture for the user. In some embodiments, the user's financial information may be supplemented with user-specified financial information since it may not be possible for the F&L portal server 140 to access certain accounts or types of financial information, such as information about cash-based transactions.

As represented by block 830, once the F&L portal server 140 has aggregated the user's financial information and stored the information in the memory 146 of the F&L portal server 140, the F&L portal server 140 computes the user's total net worth and/or provides financial graphs and tools that are customized for the user based on the user's financial information. Several exemplary financial tools are described below. It should be appreciated that, in some embodiments of the invention, the F&L portal server 140 receives updates regarding the user's financial information from the one or more financial institutions in real-time or near-real-time. As such, in some such embodiments, the graphs, charts, and information provided to the user 130 by the F&L portal server 140 are also updated in real-time or near-real-time. Similarly, user-preferences may, in some embodiments, be updated in real-time or near real-time.

Referring again to the graphical user interface illustrated in FIG. 7, if the user 130 selects the money link 610 on the homepage 600, the F&L portal server 140 displays a "money" dashboard. FIG. 10 illustrates an exemplary embodiment of a money dashboard 900, in accordance with one embodiment of the invention. The money dashboard 900 provides an overview of the user's financial situation and provides the user 130 with links to one or more tools that are configured to help the user to manage the user's finances. In this regard, the money dashboard 900 includes a today's money content field 910, a tomorrow's money content field 920, an alerts tool 930, a total net worth tool 940, a compare tool 950, a share watch tool 960, a rewards tool 970, a "what if" tool 980, and a small business tool 990. FIG. 10 also clearly shows how, in one embodiment of the invention, the graphical user interface is configured so that all of the icons, advertisements, banners, logos, tools windows, input fields, output fields, and other content fields are multiples of the base icon size and aligned with the grid. As such, the user can, in some embodiments, click on a content field and slide it to another location on the grid to rearrange the dashboard 900 however the user wants. This way, the user's personalized dashboard will have the tools the user desires and have a layout the presents the user's information in a way suitable for the user's particular tastes. For example, some users may be very visual and prefer to see large charts and graphs in the center of the dashboard showing information about their main financial accounts. Other users may have a preference for large text-based displays of financial information at the center of the dashboard with several small graphs placed in the periphery.

In FIG. 10, the today's money content field 910 includes links to information about the user's current financial situation. The today's money content field 910 also includes links to tools that allow the user 130 to analyze the user's current financial situation and make financial transactions. For example, as illustrated in FIG. 10, the today's money content field 910 includes links to the user's bank account(s), credit card account(s), mortgage(s), personal loan(s), and savings account(s). The today's money content field 910 also includes links to a bill pay tool, a transaction tool, a rewards tracking tool, a spending tracking tool, and a money coach tool.

Clicking on the "bank accounts" or the "card accounts" links in the today's money content field 910 brings up the one or more bank/credit accounts that the user 130 has with one or more financial institutions. In one embodiment, a link is provided for each bank/credit account and can be used by the user 130 to bring up a page showing information about the selected bank/credit account, such as the page 1000 illustrated in FIG. 11. In one embodiment, the F&L portal server 140 receives the information about the user's bank/credit accounts from the financial institutions, stores this information in memory 146, and displays the information to the user 130 in the server's own format. In another embodiment, however, the F&L portal server 140 instead links directly to the financial institution that maintains the account and displays the financial institution's own graphical user interface. For example, FIG. 11 illustrates a graphical user interface 1000 where a window is opened within the graphical user interface 1000 to display the user's account information for a credit card account using the user interface of the issuing bank. From the interface illustrated in FIG. 11, the user 130 can then view account information and manage the account in the same way that the user 130 would have if the user 130 had directly accessed the financial institution. In one embodiment of the invention, during a set-up phase, the user provides the F&L portal server 140 with account and log-in information that permits the F&L portal server 140 to access, log-in to, and receive information from the one or more financial institutions with which the user does business. For example, as described above, in one embodiment the F&L portal server 140, with the user's permission, uses the log-in information to conduct screen scraping from another financial institution's user interface to obtain information about the user 130 therefrom.

Referring again to FIG. 10, if the user selects the "bill pay" link of the today's money content field 910, the F&L portal server 140 presents a bill pay dashboard to the user 130. For example, FIG. 12 illustrates a bill pay dashboard 1100 in accordance with an embodiment of the invention. The bill pay dashboard 1100 allows the user to receive and pay bills online, all in one place. As illustrated in FIG. 12, the bill pay dashboard 1100 allows the user 130 to provide the F&L portal server 140 with payee information and account information for each payee. This information allows the F&L portal server 140 to receive electronic versions of the user's bills from multiple payees and to display the bills together on this dashboard, along with payment information. The user 130 can then make payments to one or more of the payees using this bill pay dashboard 1100. Since the user is making payments through the F&L portal, in one embodiment, payment information is gathered through the bill pay tool and stored as user financial data 149, from which trends and user preferences may be identified.

Referring again to FIG. 10, if the user 130 selects the "track spending" tool in the today's money content field 910 of the dashboard 900, the F&L portal server 140 presents the user with a tool that allows the user to track the user's cash flow by tracking money received and spent by the user 130 through a plurality of different monetary sources. For example, FIG. 13A illustrates a cash flow tracking tool 1200, in accordance with one embodiment of the invention. As used herein, the "cash flow" refers to a changes in a user's assets and/or liabilities and need to concern actual cash. As illustrated in FIG. 13A, the cash flow tracking tool 1200 includes a graph 1210 of the selected user's balances/expenditures versus time. In the illustrated embodiment, the cash flow tracking tool 1200 includes a number of buttons 1208 that each relate to one or more specific monetary sources from which money may have been used to make purchases or pay bills. For example, there may be a link for each of the user's credit cards/accounts, each of the user's debit cards/accounts, the user's bill pay system, cash withdrawals, etc., and a link for the user's total expenditures/cash flow across all accounts. Clicking on these buttons 1208 toggles between displaying and not displaying a corresponding expenditure/balance line, such as line 1230, in the graph 1210. For example, in the illustrated embodiment, line 1230 may be an illustration of the expenditures made using the user's checking account and line 1220 may be an illustration of the expenditures made using the user's credit card account. In some embodiments, the cash flow tracking tool 1200 shows balance history for one or more accounts rather than or in addition to a spending history. Balance histories would be shown in the same or a similar manner as described above and in FIG. 13A with respect to the expenditure history.

In one embodiment, the cash flow tracking tool 1200 also projects the user's future expenditures (or, in the case of balances, the user's future balance fluctuations). For example, in the embodiment illustrated in FIG. 13A, the graph 1210 includes an indicator 1215 that marks the current date on the graph 1210. Beyond the current date, the expenditure lines 1235 and 1225 become dashed and represent future expenditure projections (or balance projections). In one embodiment, the expenditure tracking tool 1200 makes expenditure projections based on payments that are already scheduled, such as through bill pay. In other embodiments, however, the cash flow tracking tool 1200 estimates future expenditures in each account based on an analysis of the past accounts over some predetermined period of time. For example, in one embodiment, the expenditure tracking tool 1200 is configured to analyze the past year's expenditures made from a certain account and recognizes payment cycles, averages, and trends in this data. The expenditure tracking tool 1200 then projects these cycles, averages, and/or trends for some predetermined length of time beyond the current date.

For example, FIG. 13B illustrates a future finances projection process 1290 performed by the finance and lifestyle integration system of FIG. 3, in accordance with an embodiment of the invention. As illustrated by block 1292, the F&L portal server 140 analyzes the user's financial data to determine which financial transactions are regular and which financial transactions are ad hoc. In one embodiment, this process of distinguishing regular transactions from ad hoc transactions involves the process described above in FIG. 5. For example, the F&L portal server 140 may identify that a check is written every month around the same time each month to a local power company and, therefore, determine that this is a regular expense. In contrast, the F&L portal server 140 may identify a large debit card purchase at a jewelry store as an ad hoc purchase. The financial transactions analyzed may be expenditures, returns, income, deposits, withdrawals, and/or any combination of these and/or other transactions. For example, the F&L portal server 140 may identify that a deposit is made roughly every two weeks for approximately the same amount of money each time. The F&L portal server 104 may determine that this is a paycheck and, thus, a regular deposit. However, a personal check deposited by the user may be determined by the F&L portal server 140 to be a gift or some other ad hoc deposit, or if several personal checks are deposited around the user's birthday, one embodiment of the F&L portal server 140 may determine that the checks represent a possible annual deposit.

As illustrated by block 1294, the F&L portal server 140 determines trends in regular transactions and trends in ad hoc transactions. For example, when the F&L portal server 140 recognizes a regular transaction, the F&L portal server 140 may look at the transaction over some period of time and determine when (e.g., which day of the week/month/year) the transaction takes place and an average amount of the transaction or some other trend in the transaction amount. The F&L portal server 140 may even be able to recognize trends in the ad hoc transactions when viewed together. For example, although each ad hoc transaction is seemingly impromptu and not regular when viewed by itself, the F&L portal server 140 may discover, by looking at all or a group of the ad hoc transactions together, trends in the user's ad hoc transactions, such as a similar amount of total ad hoc spending each month or a typical day of the month when the user makes an ad hoc expenditure generally.

As illustrated by block 1296, the F&L portal server 140 then projects future transactions based on certain rules, the trends, and whether the transactions are regular or ad hoc. For example, for some transactions, the F&L portal may average the transaction amounts over a past period of time and then assume that the next transaction of that type will be the same as the average amount or the average amount times some small percentage increase. The date of the next transaction may also be projected based on the dates of prior similar transactions, the amount of time between past transactions, the timing of a different type of transaction, and/or other identified trends in past transactions.

As illustrated by block 1298, the F&L portal server 140 then displays cash flow projections for the user and uses projections for other financial planning tools. For example, as illustrated in FIG. 13A, the F&L portal server 140 uses the trends that it discovers to project future expenditures and/or fluctuations in account balances. As will be described in greater detail below with respect to other figures, the trends and projections may also be used as input to other tools, such as tools for assessing retirement or other savings plans, tools for comparing the user to peer users, tools for suggesting ways to save, and/or the like.

As further illustrated in FIG. 13A, in one embodiment the graph 1210 of the expenditure tracking tool 1200 also includes a control tool 1240 that allows the user to select the period of time displayed in the graph 1210. In this regard, the control tool 1240 includes a scrolling tool 1250 and 1255 that allows the user to scroll forward and backward in time, and a time period selection tool 1260 and 1265 that allows the user to select a particular time period for the horizontal axis of the graph 1210. In the illustrated embodiment, the time period selection tool 1260 and 1265 includes a first bar 1260 and a second bar 1265 that the user 130 can select and drag across the control tool 1240 to select a first date and a second date, respectively, that mark the beginning and ending of a selected time period. As the user 130 moves the first or second bars of the time period selection tool 1260, the graph 1210 changes to reflect the new time period along the horizontal axis. Embodiments of this unique graph-viewing tool are described in greater detail below.

Some embodiments of the expenditure tracking tool 1200 further include a pie chart 1270 or other chart that illustrates how the total expenditures are broken down by expenditure type. For example, in the illustrated embodiment, the pie chart 1270 divides the expenditures into mortgage, utilities, cash, and cards, and shows the relative amounts of each expenditure. In one embodiment, some expenditures are classified as belonging to a certain category of expenditure automatically, based on other data accessible to the F&L portal server 140. For example, payments made on a home loan tracked by the F&L portal server 140 may automatically be classified as a mortgage payment. In some embodiments, expenditures are further classified by the category of products on which the money was spent. For example, a chart may distinguish between expenditures spent on food, gas, entertainment, clothes, health care, etc. These distinctions may be made by the F&L portal server 140 automatically based, for example, on vendor codes or product codes sent to the financial institution when a purchase is made or by the user assigning tags to expenditures, each tag representing a certain category of expenditure.

FIG. 13A also illustrates an advertisement 1280 directed to a particular product, such as a brand of wine. It should be appreciated that, in the illustrated embodiment of the graphical user interface, advertisements and product offers are displayed in a format that is similar in size and shape to other icons, tools, and windows displayed in the F&L portal's graphical user interface. In this way, advertisements and offers can fit neatly into the grid-like structure of the graphical user interface and be easily moved around, added, or replaced based on available space in a particular page. In one embodiment, the F&L portal server 140 automatically determines how much space is available in the particular customized page that the user 130 is viewing and, if the F&L portal server 140 determines that some space is available, selects one or more advertisements to display in the available space. Furthermore, in one embodiment, the F&L portal server 140 selects the advertisements based on the user's financial information and/or user preferences determined by the F&L portal server 140. For example, in the illustrated embodiment, the F&L portal server 140 may display the wine advertisement to the user 130 based on, for example, such financial information as the user's income, the user's total net worth, the fact that the user's debit card information indicates that the user makes regular wine store purchases, etc.

Referring again to FIG. 10, if the user selects the "transact" link of the today's money portion 910, the F&L portal server 140 presents a transaction dashboard to the user 130. FIG. 14 is an illustration of a transactions dashboard 1300 of the graphical user interface, in accordance with an embodiment of the invention. The transaction dashboard 1300 provides the user 130 with links to tools that allow the user 130 to make transactions. In the illustrated embodiment, the transaction dashboard 1300 includes links that allow a user to make new payments, access bill pay, view, amend, or stop payments already in progress, transfer funds, direct debits, order items, and conduct mobile banking.

If the user selects the "track rewards" link of the today's money portion 910 in FIG. 10, the F&L portal server 140 presents a rewards tracking dashboard to the user 130. FIG. 15 is an illustration of a rewards tracking dashboard 1400 of the graphical user interface, in accordance with an embodiment of the invention. The rewards tracking dashboard 1400 allows the user 130 to track rewards obtained by the user 130 from one or more of the user's rewards cards/accounts. For example, in the illustrated embodiment, the rewards tracking dashboard 1400 provides links that allow a user 130 to view the user's rewards by category, such as, for example, airline miles rewards, petrol rewards, food and wine rewards, fashion rewards, entertainment rewards, arts and culture rewards, house and home rewards, technology rewards, and/or cash back rewards.

If the user selects the "personal loans" link of the today's money portion 910 in FIG. 10, the F&L portal server 140 presents a loan management dashboard to the user 130. FIG. 16 is an illustration of a loan management dashboard 1500 of the graphical user interface, in accordance with an embodiment of the invention. The loan management dashboard 1500 provides the user 130 with the ability to view, manage, and apply for loans in one place. In this regard, the illustrated embodiment of the loan management dashboard 1500 includes links to view, manage, and/or apply for auto loans, mortgages, and personal loans. The illustrated loan management dashboard 1500 also includes a link to a credit monitoring agency (e.g., Privacy Assist®) that allows the user to monitor his or her credit rating.

If the user selects the "my money coach" link of the today's money portion 910 in FIG. 10, the F&L portal server 140 may present a financial advising tool to the user 130. FIG. 17 is an illustration of a financial advising tool 1600, in accordance with an embodiment of the invention. The financial advising tool 1600 provides the user with information that will help advise the user on everyday financial decisions. In the illustrated embodiment, the financial advising tool 1600 includes frequently updated podcasts 1610 that instruct and/or inform the user about one or more financial products or current issues in the financial world. Selected podcasts 1610 are played in the "money coach" window 1620. In one embodiment of the invention, podcasts 1610 are selected by the F&L portal server 140 and presented to the user 130 based on the user's financial information and/or user preferences. For example, in one embodiment, the F&L portal server 140 determines to include a podcast on home equity loans in the list of podcasts 1610 provided to the user 130 based on financial information that the F&L portal server 140 has access to that shows the user 130 as owning a home and having a significant amount of equity in the home.

In another example, the F&L portal server 140 may determine, from user-entered data or from analyzing the user's expenditures, that someone in the user's household is a teenager or a college student. In such an example, as a result of this determination, the F&L portal server 140 may provide a podcast to the user that provides the user 130 with tips for paying for college.

Referring again to FIG. 10, the illustrated embodiment of the today's money content field 910 of the dashboard 900 also highlights one or more aspects of the user's current financial situation. For example, in the illustrated embodiment, a graph is provided that charts "investment capacity" by comparing the user's income over an upcoming period of time to the user's planned expenditures over the same period of time. In one embodiment, the user can select what information, graph, or chart is highlighted in the today's money content field 910 of the dashboard 900.

The tomorrow's money content field 920 of the money dashboard 900 includes links to information about the user's investments, retirement plans, and savings goals, and links to tools that allow the user 130 to analyze the user's investment strategy and develop a financial plan for the future. For example, as illustrated in FIG. 10, the tomorrow's money content field 920 includes links to the user's personal investments, available funds, total assets, current growth plans, and property value information. The tomorrow's money content field 920 also includes links to the user's retirement plan, college savings plan, research tools, share trading tools, and a financial advisor.

In one embodiment, if the user 130 selects the personal investments link in FIG. 10, the F&L portal server 140 presents a personal investments tool to the user 130. FIG. 18 is an illustration of a personal investments tool 1700, in accordance with an embodiment of the invention. In the illustrated embodiment, the personal investments tool 1700 includes a graph 1710 that displays a performance summary for the user's investments. More particularly, the graph 1710 charts the share value, total value, change in value, or percentage change in value of each investment or class of investment that the user 130 holds versus a defined period of time, such as two months. In this regard, the personal investments tool 1700 includes switches 1720 that toggle between displaying and not displaying a selected investment or investment type. In the illustrated embodiment, the graph 1710 also plots a selected index, such as the Dow Jones Industrial Average, and a total investments chart, so that the user 130 can compare the user's investments and individual investments against one or more well-known market indexes to better judge the performance of the user's investments.

The illustrated example of the personal investments tool 1700 also includes a pie chart 1740 illustrating asset allocation, such as the percentage of the total investments in large cap equity stocks/funds, small cap equity stocks/funds, international equity stocks/funds, fixed income investments, cash, and commodities. The personal investments tool 1700 also includes a performance summary 1750 showing the current value of each type of investment in the user's portfolio, as well as the total value.

The illustrated embodiment of the personal investments tool 1700 further includes a share trading tool 1760, a market summary tool 1770, a market research tool 1780, and a growth planning tool 1790. In the illustrated embodiment, the share trading tool 1760 includes several indicators that show the current trends (up or down) of several selected investments. In one embodiment, the investments shown in the share trading tool 1760 are selected by the user 130. In other embodiments, the investments shown are selected automatically by the F&L portal server 140 based, for example, on the value of the investment in the user's portfolio, or the investments in which the user 130 most recently expressed an interest. In another embodiment, the investments in the share trading tool 1760 rotate through popular investments or through the investments owned by the user 130.

The market summary tool 1770 provides a summary of the market by illustrating a graph of a selected market index and a summary of the real-time or near-real-time performance of several popular or user-selected market indexes. This tool also includes a quick quote tool that allows the user to enter a stock symbol and, in return, receive a performance chart and a real-time or near-real-time performance summary of the entered stock.

The market research tool 1780 includes one or more links to one or more market reports, market research websites, and other market research tools. In one embodiment, the market research tool 1780 includes a search function that allows the user to search a database of market reports based on, for example, one or more keywords and/or stock symbols.

In one embodiment of the personal investments tool 1700, the user 130 can expand the share trading tool 1760 by, for example, actuating the summary button. FIG. 19 is an illustration of a share trading dashboard 1800 that, in accordance with an embodiment of the invention, is presented to the user upon the user selecting to expand the share trading tool 1760. As illustrated in FIG. 19, the share trading dashboard 1800 includes a graph 1810 of selected share prices versus time. The share trading dashboard 1800 includes a number of buttons 1820 that each relate to one or more specific investments. For example, there may be a button for each of the investments that exist in the user's portfolio or for each investment of a plurality of user-selected investments. Clicking on these buttons 1820 changes the graph 1810 and the related share information 1840 to reflect the real-time or near-real-time performance information about a share of the selected investment.

The graph 1810 of the share trading dashboard 1800 also includes, in one embodiment, a control tool 1830 that allows the user to select the period of time displayed in the graph 1810 along the horizontal axis. In this regard, the control tool 1830 includes a scrolling tool 1832 that allows the user to scroll forward and backward in time, and a time period selection tool 1834 that allows the user to select a particular time period for the horizontal axis of the graph 1810. In the illustrated embodiment, the time period selection tool 1834 includes a first and a second bar that the user can select and drag across the control tool 1830 to select a first date and a second date, respectively, that mark the beginning and ending of a selected time period. As the user moves the first or second bars of the time period selection tool 1834, the graph 1810 changes to reflect the new time period along the horizontal axis. The control tool 1830 also includes a scroll bar 1836 that allows the user to pan forward and backward in time in graph 1810 without changing the length of time represented by the horizontal axis of the graph 1810.

More generally, the graph viewing tool illustrated in FIG. 19 includes a first display area displaying a first graph 1810 and a second display area showing a second graph 1830. The first graph 1810 includes a first axis and a second axis. The first axis represents a first parameter over a first range of values. The second axis represents a second parameter over a first range of values. In the illustrated embodiment, the first parameter is time and the second parameter is money. The first graph displays a portion of a line graph 1842 representing the relationship between the first and second parameters, such as the second parameter as a function of the first parameter for some item selected using a button 1820.

The second graph 1830 in the second display area serves as a selection tool for selecting a portion of the line graph 1842 to display in the first graph 1810 in the first display area. The second graph 1830 includes two axes, referred to herein as a third axis and a fourth axis. The third axis represents the first parameter (i.e., the same parameter as the first axis of the first graph), but may represent a range of values larger than the range of values represented by the first axis of the first graph. The fourth axis represents the second parameter (i.e., the same parameter as the second axis of the first graph) and may represent a range of values the same or different than the range of values represented by the second axis of the first graph. In the illustrated example, the selection tool has been manipulated so that only a portion of the line graph 1842 of the second graph 1830 is selected and displayed in the first graph 1810. As such, in the illustration, the range of values covered by the third axis is significantly greater than the range of values covered by the first axis.

The second graph 1830 includes a first sliding tool 1835 and a second sliding tool 1834 that can be used to select the range of first parameter values covered by the first axis in the first graph 1810. In the illustrated example, the first sliding tool 1835 and the second sliding tool 1834 are both bars displayed on the second graph 1830 so that they are proximate and perpendicular to the third axis. In the illustrated example, the first sliding tool 1835 and the second sliding tool 1834 span the height of the second graph 1830. The user 130 can use the user input device 123 to click on the first sliding tool 1835 or the second sliding tool 1834 and slide the selected sliding tool along the third axis either toward or away from the other sliding tool. Sliding a sliding tool toward the other sliding tool decreases the range of first parameter values displayed in the first graph 1810. Sliding a tool away from the other sliding tool increases the range of first parameter values displayed in the first graph 1810. In other words, the data displayed on the second graph 1830 between the first and second tools 1835 and 1834 is displayed in the first graph 1810.

In one embodiment, the fourth axis covers the same range of the second parameter as the second axis. However, in other embodiments, the range of the second parameter covered by the second axis is adjustable by the user. In still other embodiments, the range of the second parameter covered by the second axis is automatically adjusted by the F&L portal server 140 based on the high and low values of the second parameter in the data selected by the sliding tools 1835 and 1834. For example, in one embodiment the upper end of the range of the second axis is a predefined percentage greater than the maximum second parameter value in the data displayed in the first graph 1810, and the lower end of the range of the second axis is a predefined percentage lower than the minimum second parameter value in the data displayed in the first graph 1810.

The second graph 1830 also includes a scrolling tool, such as a scrolling bar 1836 and/or scrolling buttons 1831 and 1832. The scrolling tools move the sliding tools 1834 and 1835 along the third axis while keeping the distance between the sliding tools 1834 and 1835 the same. In this way, the information displayed in the first graph 1810 is scrolled forward or backward without changing the range covered by the first axis. For example, the user 130 can use a user input device 123 to click on the scrolling bar 1836 and drag it left or right along the third axis. Alternatively, the user 130 can use the user input device 123 to click and hold one of the scrolling buttons 1831 and 1832 to move the sliding tools 1834 and 1835 right or left. In another embodiment, the scrolling buttons 1831 and 1832 instead scroll the forward or backward of the data displayed in the second graph 1830. In other embodiments, however, the second graph 1830 displays all available data stored in the memory for the selected security or other graphed item.

In the illustrated embodiment, the line graph 1842 displayed in the second graph 1830 outside of the area defined by the sliding tools 1834 and 1835 is a dashed or dotted line, while the line graph 1842 is a solid line between the sliding tools 1834 and 1835. In other embodiments, other techniques may be used in the second graph 1830 to distinguish between areas of the second graph 1830 selected for display in the first graph 1810 and unselected areas. For example, in one embodiment, the unselected area of the graph has a gray background and the selected area has a white background.

Although FIG. 19 shows the graph viewing tool as being used to display information about securities, the graph viewing tool described herein can be used to display any line graph or other similar types of graphs. For example, as described above, FIG. 13A illustrates an embodiment of the graph viewing tool being used to display past and projected expenditures or account balances (e.g., assets or liabilities associated with credit, deposit, checking, debt, and/or other financial accounts). As used herein, a "security" may be a stock, fund, bond, or other negotiable instrument or investment vehicle.

Referring again specifically to the share trading dashboard 1800 of FIG. 19, the share trading dashboard 1800 also includes a market indices tool 1850, a latest financial news tool 1860, an independent research and analysis tool 1870, and a "how to" tool 1880. The market indices tool 1850 allows the user to select a market index to display from a plurality of popular market indices. The latest financial news tool 1860 lists the latest financial news headlines and provides links to the articles or sources at which the articles can be found. The independent research and analysis tool 1870 provides links to recent market reports. The "how to" tool 1880 provides the user 130 with information about how to trade, choose shares, set up an account, use the tools of the share trading dashboard 1800, pay for trades, and/or the like. The share trading dashboard 1800 also includes links 1890 that the user 130 can use to buy and sell selected investments.

Referring again to FIG. 18, if the user selects the growth planning tool 1790, the F&L portal server 140 provides the user 130 with the growth planning tool dashboard 1900 illustrated in FIG. 20 in accordance with an embodiment of the invention. As illustrated in FIG. 20, the growth planning tool 1900 may highlight a plan of the user's and also provides links to one or more other financial tools and products that help the user to plan for the future. For example, the links provided by the growth planning tool 1900 include links to a life insurance planning tool, a saving for college planning tool, a retirement planning tool, an inheritance planning tool, a tax planning tool, an annuities planning tool, and a long-term products tool. The growth planning tool 1900 also includes links to the share trading tool and research articles on the subject of financial planning, as well as a link that instructs the user 130 on how to open an individual retirement account (IRA).

For example, if the user 130 selects the link to the retirement planning tool, the F&L portal server 140 may present the user 130 with the retirement planning tool 2000 illustrated in FIG. 21 in accordance with an embodiment of the invention. In one embodiment, the retirement planning tool 2000 includes a retirement roadmap calculator 2010 that plots the user's retirement goals against the user's current net worth and the user's projected net worth. More particularly, the user enters information into the retirement goal tool 2030 to set a goal for retirement and one or more target milestones between now and the user's planned retirement. The F&L portal server 140 then uses the user's goal and milestone information to plot the user's net worth goals over time 2020. As described above, the F&L portal server 140 aggregates the user's financial information across a plurality of financial products and/or institutions to determine an approximation of the user's net worth. The user's net worth is then plotted over time 2025 to show how the user's performance to date compares to the user's goal and any previous target milestones. The F&L portal server 140 then projects the user's performance into the future by first fitting a line or a curve to the user's performance data to date, and then extending this line or curve beyond the current date. Such a projection illustrates how the user's performance to date compares to the user's future goals and milestones. From here, the user can use the adjustments tool 2040 to adjust the user's retirement plan to help determine how certain adjustments may bring the user 130 closer to or further from the user's retirement goal. For example, in the illustrated embodiment, sliding tools are provided that allow the user to easily adjust the user's planned retirement age, planned annual contributions, and planned annual spending.

FIG. 22 is an illustration of an investment research tool 2100, in accordance with an embodiment of the invention. The investment research tool 2100 provides the user with the latest financial, economic, and social reports and articles to help the user make educated and timely investment decisions.

FIG. 23 is an illustration of an individual retirement accounts (IRA) tool 2200, in accordance with an embodiment of the invention. The IRA tool 2200 allows the user to open an IRA by first selecting the type of IRA (Roth, traditional, or roll-over) and then selecting an investment (stocks, mutual funds, exchange traded funds, and/or bonds, versus CDs and/or money market savings accounts).

FIG. 24 is an illustration of set-up tool 2300 for establishing user-specific goals in the growth planning tool, in accordance with an embodiment of the invention. As illustrated, the set-up tool 2300 allows the user to select the particular goals most important to the user and that the user would like address. These selections provide the user 130 with tools to help the user 130 meet his or her goals. These selections also provide an indication to the F&L portal server 140 about the user's goals so that the F&L portal server 140 can automatically direct the proper information, tools, and advisors to the user to help the user meet his or her goals. In some embodiments, these user selections also help to define certain user preferences and interests that are used by the F&L portal server 140 to direct certain lifestyle links and content to the user 130, such as certain product offers and advertisements. For example, if the user 130 selects "paying for a wedding" as a goal, the F&L portal server 140 may direct offers and advertisements for wedding products and services to the user and/or information about wedding planning, links to wedding-related websites, and information about personal loans that may be available to the user 130.

Referring back to FIG. 10, the tomorrow's money content field 920 also highlights one or more aspects of the user's financial plan. For example, in the illustrated embodiment, the tomorrow's money content field 920 includes a graph that charts "net worth vs. goals" by charting the user's total net worth goals over a period of time against the user's total net worth performance to date and projected net worth performance over a period of time in the future. The tomorrow's money portion 920 also provides a pie chart illustrating the user's assets and a link to a similar pie chart showing the user's liabilities.

The alerts tool 930 of the money dashboard 900 highlights certain information that may be useful for the user 130 to see on a day-to-day basis, such as the user's current cash position, the user's current liabilities due over some period of time, the user's recent transactions over the last twenty-four hours or some other period of time, any balance or savings alerts, the user's current credit score, and the number of bills due this month or over some other period of time.

The total net worth tool 940 of the money dashboard 900 provides the user 130 with an indication of the user's short term, long term, and total net worth. The compare tool link 950 provides a link to a compare tool that allows the user to compare the user's financial situation and/or financial plans to the average financial situation and/or financial plan amongst a selected group of peer users. The compare tool is described in greater detail below with reference to FIGS. 29A, 29B, and 30.

The share watch tool 960 of the money dashboard 900 provides the user 130 with an indication of the recent performance of a select few stocks or a rotating view of a select list of stocks. As described above with respect to a similar share tracking tool, these stocks may be selected by the user 130 or automatically selected by the F&L portal server 140 based on user financial information, user preferences, user interest in the shares, and/or popularity of the shares. The rewards tool 970 of the money dashboard 900 provides a link to a rewards tracking tool described above, and also provides alerts to the user, such as an alert about a recent reward.

In one embodiment, if the user 130 clicks on the financial advisor link of the money dashboard 900, the F&L portal server 140 provides the user with the financial advisor tool 2400, illustrated in FIG. 25, in accordance with an embodiment of the invention. As illustrated in FIG. 25, the financial advisor tool 2400 provides the user 130 with access to a personal financial advisor to help the user to manage the user's money today and to plan for tomorrow. In one embodiment, the user 130 can select from a plurality of services and receive a financial advisor with expertise in the selected service. For example, in the illustrated embodiment, the services include, but are not limited to, financial planning, retirement planning, college savings, estate planning, tax planning, philanthropy planning, investment planning, and inheritance planning. The financial advisor tool 2400 also includes a newsletter that can be used by the financial advisors to contact the user 130. For example, in one embodiment, the F&L portal server 140 automatically notifies a certain financial advisor if the user 130 enters into certain activities that signify a potential need for financial advice. The financial advisor can then reach out to the user 130 to suggest a financial product that the user 130 may be interested in, based on some recent activity by the user 130. The financial advisor tool 2400 may also include a window for displaying podcasts from and/or video chats with a financial advisor.

FIG. 26A is an illustration of a "what if" financial advising tool 2500, in accordance with an embodiment of the invention. In one embodiment, the "what if" financial advising tool 2500 is configured to automatically provide personalized recommendations about how the customer can save money, reduce liabilities, create a budget, and invest appropriately. For example, in one embodiment, the "what if" tool analyzes the user's spending habits, compares them to the average spending habits of a peer group of people, and makes recommendations, based on this comparison, about areas where the user 130 may be able to save money. In one embodiment, the financial advising tool 2500 provides a recommended budget that the user 130 should try to follow in order to reduce spending and save more money.

FIG. 26B illustrates a process 2550 for making savings recommendations to a user, the process performed by the finance and lifestyle integration system of FIG. 3, in accordance with an embodiment of the invention. As illustrated by block 2552, the F&L portal server 140 analyzes the user's financial data to determine which financial transactions are regular and which financial transactions are ad hoc. For example, in one embodiment, the F&L portal server 140 performs the process described above with respect to FIG. 5 to make these determinations.

As represented by block 2554, the F&L portal server 140 then determines trends in the regular and ad hoc transactions, such as trends in when the transactions are made, their values, and/or where they will likely be made. As represented by block 2556, the F&L portal server 140 then predicts the user's future transactions based on certain rules stored in the memory, the determined trends, and/or whether the transactions are regular or ad hoc. For example, based on a user's past regular debit card purchases for dog food, the F&L portal server 140 may predict that the user 130 may go to a first grocery store next week to purchase one large bag of dog food. This product level information may be available in some embodiments by, for example, a bank card authorization system in which UPCs are sent to a bank along with an authorization code.

As represented by block 2558, the F&L portal server 140 recommends ways that a user may save on projected future transactions by providing advertisements, promotions, or suggestions to the user 130. For example, in the example above where the F&L portal server 140 identifies that the user 130 is likely to purchase dog food from a first grocery store, the F&L portal server 140 may search a database stored in its memory that contains current offers, advertisements, and promotions and find one or more offers, advertisements, and/or promotions for dog food, the first grocery store, and/or alternative products or product marketers. These one or more offers, advertisements, and/or promotions may then be displayed to the user 130 through the user's customized F&L portal.

As represented by block 2559, in one embodiment, the F&L portal server 140 projects the user's suggested savings in financial planning and projecting tools of the F&L portal. For example, when the F&L portal server 140 suggests a way for the user to save money, the F&L portal server 140 is, in one embodiment, able to temporarily assume that the user 130 incorporates the one or more suggestions that it makes and calculate the effects of the suggestions on the user's budget, projected future cash flow, retirement goals, etc.

In some embodiments, the process represented by block 2558 of FIG. 26B involves the F&L portal server 140 identifying ways to save based on the collective transaction data that the F&L portal server 140 accumulates from other persons that use the F&L portal server 140 and/or have accounts with the affiliated financial institution 150. FIG. 26C illustrates an exemplary process 2560 for making savings recommendations based on transaction information of persons other than the user, in accordance with an embodiment of the invention.

As represented by block 2562, the F&L portal server 140 identifies a regular purchase transaction likely to be repeated in the future. For example, the F&L portal server 140 may perform a process such as the process described in FIGS. 5 and 26B to determine regular transactions and project future transactions.

As represented by block 2564, the F&L portal server 140 determines what the user 130 paid during the identified transaction in the past and where the user made the transaction. For example, in one embodiment of the invention, the F&L portal server 140 identifies a weekly trip to grocery store A as a regular purchase and then computes the average amount spent in each of these trips to grocery store A. In another example, where product-level transaction information is available to the F&L portal server 140, the F&L portal server 140 identifies a purchase of product B as a bi-monthly purchase and averages the amount of money the user has paid for product B over some period of time, or, in another embodiment, identifies what the user paid for product B during the last purchase of product B.

As represented by block 2566, the F&L portal server 140 determines what other persons recently paid for similar purchase transactions and where the other persons made these transactions. For example, in the above grocery store example, one embodiment of the F&L portal server 140 identifies a peer group of people for which the F&L portal server 140 has access to financial information, such as a group of people having the same family size, living in the same geographic area as the user, and making weekly trips to the grocery store. In such an example, the F&L portal server 140 may average the amount spent by the average member of the peer group during their weekly trips to the grocery store and compare this average to the user's weekly grocery store expense. Where product-level transaction data is available to the F&L portal server 140, then, in one embodiment, the F&L portal server 140 maintains in its memory 146 a database of products and what people are paying for those products at various retailers. This database can than be used to compare the user's purchase price for a particular product to the purchase price of others and offer suggestions to the user for retailers that sell that product at a cheaper price than the price paid by the user 130.

As represented by block 2568, the F&L portal server 140 then recommends options to the user 130 where the user can make the transaction in the future and save money based on the recent transaction information of the other persons. For example, in the above examples, the F&L portal server 140 may display to the user 130 a comparison of the user's weekly grocery store bill and the weekly grocery store bill of the average member of the peer group. The F&L portal server 140 may then suggest other nearby grocery stores where the average peer group member that spends less shops. In the other example, the F&L portal server 140 may recognize that other persons are purchasing the same product as the user 130 but at a particular retailer that charges significantly less than what the user is paying. The F&L portal server 140 may then display to the user 130 options for accessible retailers that sell the product for less than what the user 130 traditionally pays.

It will be appreciated that, although embodiments of the invention described in FIGS. 26B and 26C are generally described with respect to making savings recommendations for purchase type transactions, other embodiments of the invention use similar processes to make suggestions for improving the user's outcome in other types of transactions, such as investments, sales, income, returns, withdrawals, transfers, and other financial transactions. For example, in one embodiment, the F&L portal server 140 looks at the user's interest rates on loans and money market accounts and compares these to interest rates paid by average members of a peer group. In this way, the user 130 may know whether he or she can possibly obtain lower rates. In another example, the F&L portal server 140 considers withdrawal fees paid at ATMs frequented by the user and recommends nearby ATMs that charge lower fees.

FIG. 27 is an illustration of a small business dashboard 2600 of the graphical user interface, in accordance with an embodiment of the invention. This dashboard provides tools and resources directed to helping a small business owner manage the finances of a small business. This customizable dashboard includes a "today's money" content field that includes a graph showing the recent balance history of the business's bank and credit accounts. The "today's money" content field also includes links to the business's deposit and credit accounts, mortgage(s), business loans, statements, the bill pay tool, the expenditure tracking tool, and the transaction dashboard.

The small business dashboard 2600 also includes a financial alerts portion and a products portion. The financial alerts portion lists important information about the business, such as the balance in the business checking account, accounts payable, payments made/received in the last twenty-four hours, savings, reports, and a stock watch list. The products portion of the small business dashboard 2600 provides links to financial products offered by the financial institution 150 that may be useful to the small business owner, such as deposit accounts, business credit cards, loans, lines of credit, leasing products, merchant services, and payroll and tax products.

The small business dashboard 2600 further includes links to a number of tools available to the user 130. In the illustrated embodiment, such tools include an online payroll tool, a "pay employees" tool, a "pay vendors" tool, an online small business community resource, a tax service, an invoicing service, a tool to access finances online, and a link to the user's personalized portal homepage.

It should be appreciated that, like many of the dashboards described herein, the small business dashboard 2600 is customizable. In this regard, FIG. 28 is an illustration of set-up tool 2700 for allowing the user 130 to customize the small business dashboard 2600, in accordance with an embodiment of the invention. The set-up tool 2700 allows the user 130 to select which types of information, financial tools, and resources should be displayed on the small business dashboard 2600. The set-up tool 2700 also provides links that allow the user to set-up accounts, payroll, bill pay, and other products and resources for the small business.

Financial Comparison Tool

As described above, one embodiment of the money dashboard 900 illustrated in FIG. 10 includes a compare tool 950 that a user can implement to compare the user's (or a business's) financial situation, history, and/or plan to the financial situation, history, and/or plan of an average person (or business) in a selected peer group. FIG. 29A is a flow chart illustrating a financial information comparison procedure 2800 that may be performed by the F&L portal server 140, in accordance with an embodiment of the invention.

As represented by block 2810 in FIG. 29A, the F&L portal server 140 receives information from the user about a peer group of entities to use to compare to the user 130 or the user's business. In one embodiment, the peer group of entities includes all users for which the F&L portal server 140 has access to their financial information. In one embodiment, the peer group of entities includes only those users that are customers of the financial institution 150, where the financial institution 150 is affiliated with the F&L portal server 140. In another embodiment, the peer group includes only those users that are enrolled in the F&L integration system and have an account on the F&L portal server 140. In yet another embodiment, the peer group includes only users that share one or more user-selected or F&L portal server-selected characteristic(s) with the user 130. In one embodiment, the characteristic(s) include, for example, a geographic location, a zip code, a state, a city, a region, an age range, an occupation, a job title, an education level, a net worth range (the net worth computed by the F&L portal server 140), an income range, retirement goals, and/or the like.

As represented by block 2820, the F&L portal server 140 then obtains financial information about each of the entities that make up the selected peer group. As described above, the F&L portal server 140 gathers financial information about users from, for example, an affiliated financial institution 150 and/or one or more other financial institutions 160.

As represented by block 2830, the F&L portal server 140 then computes the average financial information amongst the selected peer group of entities. For example, the F&L portal server 140 identifies a financial characteristic to compare, such as monthly spending, and computes the average monthly spending for the selected peer group. In one embodiment, the user 130 selects the financial characteristic that the user wishes to run a comparison on, from, for example, a list of financial characteristic comparisons provided by the F&L portal server 140. For example, the financial characteristic to compare may include total spending, spending by category, income, investments, debt, net worth, retirement goals, financial history, account balance, projected savings, and/or the like.

As represented by block 2840, the F&L portal server 140 then provides the user 130 with a comparison of the user's financial information with the average financial information of the selected peer group. For example, in one embodiment, the F&L portal server 140 displays one or more charts or graphs illustrating the user's financial information alongside of the average peer's financial information for a particular characteristic to compare.

For example, FIG. 29B illustrates a spending comparison tool 2900, in accordance with an embodiment of the invention. In the illustrated embodiment, the F&L portal server 140 compares the user's expenditures during the month of June to the average June expenditures amongst a user-selected peer group. The spending comparison tool 2900 includes a criteria selection tool 2920 that allows the user to select a peer group based on location, zip code, and/or age range. In the illustrated embodiment, the user 130 has selected a peer group that includes other users between the ages of 16 and 24 residing within a particular user-entered zip code.

The exemplary spending comparison tool 2900 also includes a bar graph 2910 that compares the user's expenditures during the month of June to the average peer's expenditures, where the expenditures have been divided based on the type of expenditure. For example, in the illustration, the user 130 spends slightly less than the average peer user on food and petrol, clothing, entertainment, home, and utility bills, and spends significantly less on education than the average peer user.

FIG. 30 provides an illustration of an income comparison tool 3000, in accordance with an embodiment of the invention. In the illustrated embodiment, the F&L portal server 140 compares the user's income during the month of June to the average June income amongst a user-selected peer group. The income comparison tool 3000 includes a criteria selection tool 3020 that allows the user to select a peer group based on location, zip code, age range, industry, and/or job title. The exemplary income comparison tool 3000 also includes a bar graph 3010 that compares the user's income history during a select period of time to the average peer's income history during this period of time.

In one embodiment, in order to ensure anonymity of the members of a peer group, the F&L portal server 140 has a minimum size requirement for a selected peer group. For example, if the user 130 selects a peer group comprised of all doctors located in a certain zip code and between the ages of 30 and 35, and the resulting peer group includes only one or two people, the F&L portal server 140 may not allow the comparison to take place so as to maintain confidentiality of those people's financial information. Likewise, if a peer group is so large that computing an average of all members of the peer group would be costly, timely, and/or unnecessary, the F&L portal server 140 may average only a sample of the peer group large enough to provide an accurate estimate of the average member of the peer group.

Customized Card Tool

FIG. 31 is an illustration of set-up tool 3100 for customizing the financial tools offered on the money dashboard 900, in accordance with an embodiment of the invention. This set-up tool 3100 allows the user to input details about the user's current bank accounts, credit cards, savings, investments, and the like to be accessible through the F&L portal server 140. The set-up tool 3100 also allows the user to customize the money dashboard 900 and other dashboards, as well as certain products and tools, like a bill pay tool and a financial planning tool.

In the illustrated embodiment, the set-up tool 3100 also includes a link to a customized card tool that allows a user to create a customized rewards card/account. FIG. 32A is an illustration of a customized card tool 3200 for creating a customized rewards card and applying for the card, in accordance with an embodiment of the invention. As illustrated in FIG. 32A, the customized card tool 3200 allows a user to select from a plurality of types of cards, such as credit or debit, and other finance options related to the card, such as interest rates and finance options. The user 130 can also select from a plurality of available types of rewards, such as points provided by the financial institution, cash back, airline miles, and the like. The user 130 can also choose to create a customized card design using a card design tool 3220 provided on the customized card tool 3200. The customized card design tool 3220 allows the user to select certain design options and a customized card display tool 3230 displays an image of what the card will look like with the user's selected options and the user's name printed thereon.

More particularly, FIG. 32 illustrates an example card customization tool 3200 where the user 130 can select financing options using a finance option selection tool 3210. The finance option selection tool 3210 is a content field in the user interface that provides different finance options to the user 130 and allows the user 130 to enter a selection of one or more of the options. For example, in the illustrated example, the user 130 can select whether the requested card is to be a credit card 3211 or a debit card 3212. In the illustration, the user 130 has clicked on "credit" indicating the selection of a credit card.

Other options may also be offered to the user 130 and, in some embodiments, the user selecting a certain option may cause the graphical user interface to display other options related to the selected option. For example, in the illustrated embodiment, the finance option selection tool 3210 includes an "interest rates" option 3213. In one embodiment, selection of the interest rates option 3213 causes the graphical user interface to display interest rates that may be available to the user. In some embodiments, selection of a particular option may also cause the graphical user interface to limit the options the user can select. For example, selecting the lowest available interest rate may limit the reward options available to the user 130.

In the illustrated card customization tool 3200, the user 130 can also select rewards options using a rewards selection tool 3214. The rewards selection tool 3214 is a content field in the user interface that provides different reward options to the user 130 and allows the user 130 to enter a selection of one or more of the options. For example, in the illustrated example, the user 130 can select between such rewards a bank points, airline miles, cashback, and/or other rewards.

The illustrated card customization tool 3200 also allows the user 130 to decide between designing a custom card design 3218 and accepting a classic card design 3219. If the user clicks on the "design your card" button 3218, then the user in provided with a customized card design tool 3220 and a customized card display tool 3230.

The customized card design tool 3220 includes a tool that allows the user to select an image to use on the customized card. In the illustrated embodiment, the user is presented with buttons 3221 that provide images to the user 130 based on the subject of the image. For example, the subject buttons may include, for example, an "architecture" button, a "travel" button, a "landscapes" button, and a "nature" button. In the illustrated example, the "landscapes" button is selected which causes landscape type images to be displayed in the image selection tool 3222. The image selection tool 3222 shows a plurality of images that the user 130 can scroll through using scrolling buttons. The middle image is the selected image and is shown larger than the other images. In one embodiment, the images are stored in the memory 146 of the F&L portal server 140. In some embodiments, the user 130 has the option to select images stored in the memory 126 of the user terminal 124 or located elsewhere on the network 110, such as at the website of a company that manages the user's digital photographs.

The example customized card design tool 3220 illustrated in FIG. 32A also includes an option for creating second card, such as for a spouse, who shares the credit or debit account corresponding to the new card(s). In the illustrated embodiment, the image selection tool 3224 for the other card is grayed-out unless the user 130 selects the "choose a second card" button 3223.

Although not shown in the example illustrated in FIG. 32A, in some embodiments the customized card design tool 3200 also allows the user to select between a plurality of different card shapes and/or sizes. For example, the user may have the option of selecting a classic rectangular shape, a smaller rectangular or shape for attaching to a key chain, or other shapes and/or sizes. In one embodiment, the different available shapes and/or sizes are displayed using a tool similar to the image selection tool 3222 illustrated in FIG. 32A.

The customized card design tool 3220 also includes a customized card display tool 3230 that is configured to display to the user 130 an image 3231 of the customized card as the user 130 selects the various options. In this way, the user 130 can see what the card will actually look like with the selected options so that the user 130 can be sure to request a card that the user 130 will enjoy. In one embodiment, the image 3231 of the card is displayed in its actual size. In other embodiments, however, the image of the card may be displayed larger or smaller than the actual card size so that the user can see details more clearly or so that the image 3231 can fit on the screen of the user terminal 120.

As illustrated, in one embodiment the front of the card is shown and includes a designation 3235 of whether the card is a credit or debit card. Although not shown in the illustrated example, the card may also include one or more indicators identifying the type of rewards associated with the card. The card is also shown as having the image selected by the user 130 using the image selection tool 3222 as the card's background image 3233. The card also displays the bank's logo 3234, whether the card is a VISA, MASTERCARD, or some other type of card 3236, the expiration date 3237 that the card would have, and a card number 3232. In one embodiment, the card number displayed is the actual card number that the card will have. In other embodiments, the card number may be a made-up number for illustration purposes only. Where shape and/or size of the card are also options, the image 3231 also shows the user-selected shape and/or size.

The image 3231 of the card also shows the user's name 3238 on the card. In one embodiment, the user's name is obtained from information associated with the F&L portal account or corresponding financial account. In the illustrated embodiment, the customized card display tool 3230 includes a text box 3240 that a user can type 3239 text into. The customized card display tool 3230 instructs the user 130 to enter the cardholder's name into the text box 3240 as the name should appear on the card. As the user types the cardholder's name 3239 into the text box 3240 the name 3238 is displayed on the card image 3231 just as it will appear on the actual card.

The user 130 can then review the image of the card and the selected reward options and, if the user approves of the customized card, the user indicates approval and the F&L portal server 140, in response, uses the user-selected card options and initiates the card generation process. In one embodiment, the card generation process involves the F&L portal server 140 preparing an application for the card.

FIG. 32B is a flow chart illustrating a card customization process 3250 performed by the F&L integration system of FIG. 3, in accordance with an embodiment of the invention. As represented by block 3252, the F&L portal server 140 provides a graphical user interface for display on the user terminal 120. As represented by 3254, the graphical user interface displays bank card options and a text box to the user 130. As represented by block 3256, the F&L portal server 140 receives an indication of user-selected options and text entered into the text box. As represented by block 3258, the F&L portal server 140 creates an image of a customized bank card having the user-selected options and the text from the text box printed thereon. As represented by block 3260, the F&L portal server 140 displays the image of the customized bank card in the graphical user interface. As represented by block 3262, the F&L portal server 140 receives user approval of the customized card image and selections. As represented by block 3264, the F&L portal server 140 initiates the card application process using the user-selected options.

Customized Lifestyle Tools and Dashboards

As described above, in addition to providing the user 130 with a portal that attempts to be a one-stop shop for the user's financial needs, embodiments of the invention also attempt to be a one-stop shop for the user 130 when the user 130 is pursuing information about personal interests online. Embodiments of the invention also are directed to providing the user 130 with a customized online experience based on the user's particular preferences and interests. In this regard, FIG.

33 provides a flow chart illustrating a portal customization process 3300 performed by the finance and lifestyle integration system of FIG. 3, in accordance with an embodiment of the invention.

As represented by block 3310 in FIG. 33, the F&L portal server 140 receives financial information about a user 130 and user-selected preferences. As described above, the F&L portal server 140 receives the financial information about the user 130 from an affiliated financial institution 150 and/or one or more other financial institutions 160. The F&L portal server 140 also receives user-selected preferences. Such user-selected preferences may be based, for example, on the user 130 selecting a plurality of personal interests from a list of personal interests during set up of the user's portal account. In another example, the user-selected preferences are based on the user 130 selecting certain tools or links when setting up other aspects of the user's portal interface. For example, the user 130 selecting a sports-related link as a favorites link on the user's homepage 600 may indicate that the user has a significant interest in sports.

As represented by block 3320, the F&L portal server 140 then automatically provides the user with customized non-financial lifestyle tools based on the user's financial information and/or preferences. For example, in one embodiment, the F&L portal server 140 provides a default "life" dashboard that includes links to certain portal dashboards directed to certain subject matter. The default links on this dashboard may be selected by the F&L portal server 140 based on the user's financial information and/or preferences. For example, the F&L portal server 140 may compare the user's information obtained to date to a plurality of preference rules, and then provide links and tools to the user 130 based on the comparison. These preference rules may be based on generalizations about people and can be used to determine likely user preferences based on certain limited information about the user. The user 130, however, can change these default links by using the set-up tool for the "life" dashboard.

As represented by block 3330, the F&L portal server 140 also automatically provides the user with web content, product offers and advertisements, event information, and/or the like, based on the user's financial information and/or user preferences. For example, in one embodiment, along with product offers and advertisements, the product marketers 170 provide one or more rules associated with each offer and advertisement that instruct which users the offers and advertisements are targeted to. The F&L portal server 140 then compares the user's financial information and/or preferences to the rules provided by the product marketers 170 to determine if a particular product offer or advertisement should be made available to the user 130 on the user's personalized portal interface. In this way, product marketers 170 can more effectively and efficiently target offers and advertisements to particular people and/or types of people. This also can limit the annoyance that a user experiences by seeing constant advertisements and offers for products that the user is not interested in.

FIG. 34 is an illustration of a "life" dashboard 3400 of the graphical user interface, in accordance with an embodiment of the invention. As illustrated, the life dashboard 3400 includes a plurality of "lifestyle" links 3410, each directed to a different subject matter. The life dashboard 3400 also includes a link 3420 to product offers and a concierge link 3430.

For example, FIGS. 35-43 illustrate exemplary subject matter dashboards provided by the F&L portal server 140 when the user 130 clicks on the corresponding lifestyle link in the life dashboard 3400. Specifically, FIG. 35 is an illustration of an environment and eco-friendly dashboard 3500, in accordance with an embodiment of the invention. FIG. 36 is an illustration of a travel dashboard 3600, in accordance with an embodiment of the invention. FIG. 37 is an illustration of a family-friendly dashboard 3800, in accordance with an embodiment of the invention. FIG. 38 is an illustration of a film dashboard 3900, in accordance with an embodiment of the invention. FIG. 39 is an illustration of a philanthropy-related dashboard 4000, in accordance with an embodiment of the invention. FIG. 40 is an illustration of a community-related dashboard 4100, in accordance with an embodiment of the invention. FIG. 41 is an illustration of a sports-related dashboard 4200, in accordance with an embodiment of the invention. FIGS. 42 and 43 illustrate a fashion-related dashboard 4300, in accordance with an embodiment of the invention.

As illustrated in FIGS. 35-43, the subject matter dashboards provide the user 130 with information about events, links, resources, products, podcasts, news, videos, and other information about the subject matter to which the dashboard relates. In one embodiment, at least some of the information provided on the subject matter dashboards is customized based on user profile information, user financial information, and/or user preferences. For example, if the user 130 is a male within a certain age range, the film dashboard illustrated in FIG. 38 may be configured by the F&L portal server 140 to default to a display of information and trailers about movies where the targeted demographic includes males in the user's age range.

As illustrated in FIGS. 42 and 43, in one embodiment, if the user selects certain content, offers, or advertisements in the dashboard, a new window may "pop up" in the F&L portal interface or using the web-browsing application of the user terminal, and direct the user 130 to another location on the Internet, such as the website of a product marketer or information provider.

In one embodiment, one or more of the subject matter dashboards illustrated in FIGS. 35-43 are sponsored and/or maintained by a product marketer 170 and may display the logo thereof. In this way, embodiments of the present invention provide a mechanism through which multiple product marketers can access a customer in an integrated, seamless, and user-friendly tool that attempts to provide the user with a one-stop shop on the Internet.

FIG. 44 is an illustration of the concierge tool 4600 accessible via the concierge link on the life dashboard 3400, in accordance with an embodiment of the invention. The concierge tool 4600 provides the user with a range of customized services, such as a property search service, a gifts service, a travel service, an events planning service, a ticket service, and/or the like.

FIG. 45 is an illustration of a shopping offers tool 4700 accessible via the product offers link on the life dashboard 3400, in accordance with an embodiment of the invention. The shopping offers tool 4700 includes a plurality of customized product offers and advertisements available to the user 130. As described above, in one embodiment, the F&L portal server 140 automatically makes certain product offers and advertisements available to a user based on the user's profile, financial information, and/or user preferences. In this way, product marketers 170 can target offers and advertisements more effectively and users of the portal will only see product offers and advertisements that are likely to be of interest to the user.

Since the shopping offers tool 4700 may only display a limited number of the total discount offers and/or advertisements made available to users of the F&L portal server 140 by product marketers 170, in some embodiments the shopping offers tool 4700 also includes a search tool that allows the user 130 to search a database of discount offers and/or advertisements by, for example, keyword, product, marketer, and/or the like. For example, the shopping offers tool 4700 may include a text box where the user 130 can enter keywords and a search button that starts the search. Alternatively or in addition to a text box, the shopping offers tool 4700 may provide the user with an expandable list of product types and/or product marketers that allows the user 130 to drill down and locate discount offers based on product type and/or product marketer.

FIG. 46 is an illustration of a set-up tool 4800 for customizing the portal's life dashboard 3400, in accordance with an embodiment of the invention. As illustrated in FIG. 46, the set-up tool 4800 includes a range of subject matters covered by available lifestyle dashboards and allows the user 130 to select a certain number of the dashboards to include on the user's customized life dashboard 3400. In one embodiment, the user 130 can toggle between including a link on the user's life dashboard 3400 and not including the link on the dashboard 3400 by clicking on the link's icon in the set-up tool 4800. In the illustrated embodiment, links that are not selected for the user's dashboard 3400 are "grayed out" or made semi-transparent to distinguish these links from links that are selected for the user's dashboard 3400, which are displayed in full color.

Other Resources and Tools

FIG. 47 is an illustration of a resources dashboard 4900 of the graphical user interface, in accordance with an embodiment of the invention. The resources dashboard 4900 includes other resources that may be useful to the user 130, such as an ATM locator tool, a link to a portal service team, a life coach, a banking center locator tool, and a digital protection tool. The resources dashboard 4900 may also include links to tools already described above, such as a money coach, the concierge tool, and a credit monitoring service. The F&L portal may also include a resource set-up tool for customizing the portal's resource dashboard 4900. Like the other set-up tools described above, the resource dashboard set-up tool would, in one embodiment, allow a user 130 to choose which tools are displayed in the resources dashboard 4900.

In one embodiment, the F&L portal server 140 provides the user with a digital vault tool that allows the user 130 to store important digital documents in a secure location online. FIG. 48 is an illustration of a digital vault tool 5100, in accordance with an embodiment of the invention. As illustrated, the digital vault tool 5100 allows a user 130 to securely store and organize such important documents as the user's will, mortgage documents, tax documents, utility bills, health care documents, insurance documents, and the like. In one embodiment, the user 130 can configure the F&L portal server 140 to automatically store some of this information that it has access to through other tools on the portal, such as electronic statements received through the bill pay tool. The documents placed in the digital vault are stored in a secure and safe memory location on the network 110. This digital vault tool 5100 may also allow the user 130 to free-up storage space in the user's home.

FIG. 49 is an illustration of a fraud and identity protection tool 5200, in accordance with an embodiment of the invention. As illustrated in FIG. 49, the tool provides the user with the ability to receive a temporary card number tied to a specific monetary amount, limit, date, retailer, or the like. The user 130 can then use the temporary account number to make online purchases or other "card-not-present" purchases without the user having to reveal the user's real card information and, in some embodiments, a limitation on the damage that an identity thief could cause. Specifically, in the illustrated embodiment, the financial institution 150 provides the user with a temporary account number that the financial institution 150 will temporarily recognize as belonging to the user 130. The financial institution 150 will then authorize a transaction received with the temporary card number if the transaction is requested within a predefined length of time or a user-specified length of time, and is equal to or below the user-specified monetary amount. In the illustrated embodiment, the fraud and identity protection tool 5200 also serves as a location for the user 130 to access and/or change the user's other security settings and options, such as the user's SiteKey®.

The following U.S. patent applications are filed concurrently with the present application and are hereby incorporated by reference: U.S. patent application Ser. No. 12/533,273 to Buchanan et al. and entitled "Tools for Relating Financial and Non-Financial Interests;" U.S. patent application Ser. No. 12/533,281 to Buchanan et al. and entitled "Financial Data Comparison Tool;" U.S. patent application Ser. No. 12/533,283 to Buchanan et al. and entitled "Financial Planning Tool;" U.S. patent application Ser. No. 12/533,286 to Buchanan et al. and entitled "Customizable Graphical User Interface;" and U.S. patent application Ser. No. 12/533,289 to Buchanan et al. and entitled "Customized Card-Building Tool."

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
 a memory having data stored therein, wherein the data comprises, at least, information associated with one or more financial accounts associated with a consumer;
 a communication interface configured to provide information to be displayed on a display device; and
 a processor operatively coupled to the memory and the communication interface and configured to use the communication interface to provide a graphical user interface to be displayed on the display device, wherein the graphical user interface comprises a graph viewing tool configured to display a graph of balances and expenditures versus time, wherein the graph of balances and expenditures versus time is based at least partially on transaction data and financial information associated with the one or more financial accounts associated with the consumer, wherein the graph viewing tool is further configured to display, at least, a first element representing balances versus time and a second element representing expenditures versus time on the graph of balances and expenditures versus time, and wherein the graph viewing tool is further configured to display projected expenditures and balances versus time based at least partially on the transaction data and financial information associated with the one or more financial accounts associated with the consumer, the graph viewing tool comprising:
- a first display area displaying a first axis and a second axis of the graph, the first axis representing a first parameter of the data over a first range of values;
- a second display area displaying a third axis representing the first parameter over a second range of values; and
- a first tool and a second tool displayed in the second display area proximate the third axis, wherein the first tool and the second tool are configured such that they can be moved relative to each other and relative to the third axis to increase or decrease the first range of values displayed along the first axis in the first display area, wherein a portion of the second display area that is not between the first and the second tool is configured to display the projected balances and expenditures versus time of the one or more financial accounts associated with the consumer;

wherein, when the first and second tools are moved relative to each other to increase or decrease the first range of values displayed along the first axis, the range of parameters represented by the second axis changes automatically based on high and low values of the parameter in the data captured within the range of the first axis.

2. The apparatus of claim 1, wherein the second range of values is greater than and includes the first range of values.

3. The apparatus of claim 1, wherein the third axis represents an entire range of values stored in the memory for the first parameter of the data.

4. The apparatus of claim 1, wherein the graph viewing tool further comprises:
- a sliding tool displayed in the second display area that is configured to allow a user to move the first tool and the second tool simultaneously relative to the third axis, while keeping a distance between the first tool and the second tool constant, wherein the sliding tool allows the user to change the first range of values displayed along the first axis in the first display area.

5. The apparatus of claim 4, wherein the first tool and the second tool comprise a first bar and a second bar, respectively, perpendicular to the third axis, and wherein the sliding tool comprises a third bar parallel to the third axis.

6. The apparatus of claim 4, wherein the sliding tool comprises a scroll button proximate to an end of the third axis.

7. The apparatus of claim 1, wherein the first tool and the second tool each comprise a bar perpendicular to the third axis.

8. The apparatus of claim 1, wherein the graph viewing tool is configured such that when the first tool and the second tool are moved toward each other, the first range of values displayed along the first axis in the first display area is decreased, and when the first tool and the second tool are moved away from each other, the first range of values displayed along the first axis in the first display area is increased.

9. The apparatus of claim 1, wherein the second axis represents a second parameter of the data, and wherein the second display area further displays a fourth axis representing the second parameter.

10. The apparatus of claim 9, wherein the second axis and the fourth axis display the same range of values for the second parameter.

11. The apparatus of claim 1, wherein the second axis represents a second parameter of the data over a second range of values, and wherein the graph displays a line graph of the second parameter as a function of the first parameter.

12. The apparatus of claim 11, wherein the first parameter is a measure of time.

13. The apparatus of claim 1, wherein the first display area and the second display area provide line graphs of monetary parameters as a function of time.

14. The apparatus of claim 1, wherein the first display area and the second display area chart at least one price history for at least one security.

15. The apparatus of claim 14, wherein the graph viewing tool comprises buttons that the user can select to show or hide at least one price history for at least one security.

16. The apparatus of claim 1, wherein the first display area and the second display area chart assets or liabilities.

17. The apparatus of claim 1, wherein the first display area and the second display area chart assets or liabilities for a plurality of financial accounts.

18. The apparatus of claim 17, wherein the graph viewing tool comprises buttons that the user can select to show or hide one or more of a plurality of financial account histories or projections.

19. The apparatus of claim 1, wherein the graph viewing tool is configured so that the second display area is displayed beneath and lined up with the first display area.

20. A method of displaying data, the method comprising:
providing a graphical user interface for display on a user terminal, wherein the graphical user interface is configured to display a graph of balances and expenditures versus time, wherein the graph of balances and expenditures versus time is based at least partially on transaction data and financial information associated with one or more financial accounts associated with a consumer, wherein the graphical user interface is further configured to display, at least, a first element representing balances versus time and a second element representing expenditures versus time on the graph of balances and expenditures versus time, and wherein the graphical user interface is further configured to display projected expenditures and balances versus time based at least partially on the transaction data and financial information associated with the one or more financial accounts associated with the consumer, wherein the graphical user interface comprises:
- a first display area displaying a first axis and a second axis of the graph, the first axis representing a first parameter of the data over a first range of values;
- a second display area displaying a third axis representing the first parameter over a second range of values; and
- a first tool and a second tool displayed in the second display area proximate the third axis, wherein the first tool and the second tool are configured such that they can be moved relative to each other and relative to the third axis to increase or decrease the first range of values displayed along the first axis in the first display area, wherein a portion of the second display area that is not between the first and the second tool is configured to display the projected balances and expenditures versus time of the one or more financial accounts associated with the consumer;

receiving an electronic communication from the user terminal indicating that a user moved the first and second tools relative to each other to increase or decrease the first range of values displayed along the first axis; and using a processor to increase or decrease the amount of the data displayed by the first display area based on the user's movement of the first and second tools relative to each other and relative to the second display area and wherein the processor automatically changes a range of parameters represented by a second axis based on high and low values of the data displayed by the first display area.

21. The method of claim 20, wherein the graphical user interface further comprises:
a sliding tool displayed in the second display area that is configured to allow a user to move the first tool and the second tool simultaneously relative to the third axis, while keeping a distance between the first tool and the second tool constant, wherein the sliding tool allows the user to change the first range of values displayed along the first axis in the first display area.

22. The method of claim 20, wherein the electronic communication indicates that a user moved the first tool and the second tool toward each other, and wherein the method further comprises:
using the processor to decrease the amount of the data displayed by the first display area based on the extent that the user moved the first and second tools toward each other.

23. The method of claim 20, wherein the electronic communication indicates that a user moved the first tool and the second tool away from each other, and wherein the method further comprises:
using the processor to increase the amount of the data displayed by the first display area based on the extent that the user moved the first and second tools away from each other.

24. A computer program product comprising a non-transitory computer-readable medium, the computer-readable medium comprising computer-executable program code stored therein, the computer-executable program code comprising:
computer-executable code portion configured to provide a graphical user interface, wherein the graphical user interface is configured to display a graph of balances and expenditures versus time, wherein the graph of balances and expenditures versus time is based at least partially on transaction data and financial information associated with one or more financial accounts associated with a consumer, wherein the graphical user interface is further configured to display, at least, a first element representing balances versus time and a second element representing expenditures versus time on the graph of balances and expenditures versus time, and wherein the graphical user interface is further configured to display a projected expenditures and balances versus time based at least partially on the transaction data and financial information associated with the one or more financial accounts associated with the consumer, the graphical user interface comprising:
a first display area displaying a first axis and a second axis of the graph, the first axis representing a first parameter of the data over a first range of values;
a second display area displaying a third axis representing the first parameter over a second range of values; and
a first tool and a second tool displayed in the second display area proximate the third axis, wherein the first tool and the second tool are configured such that they can be moved relative to each other and relative to the third axis to increase or decrease the first range of values displayed along the first axis in the first display area, wherein a portion of the second display area that is not between the first and the second tool is configured to display the projected balances and expenditures versus time of the one or more financial accounts associated with the consumer;
computer-executable program code portion configured to receive a communication indicating that a user moved the first and second tools relative to each other to increase or decrease the first range of values displayed along the first axis; and
computer-executable program code portion configured to increase or decrease the amount of the data displayed by the first display area based on the received communication indicating the user's movement of the first and second tools and automatically change a range of parameters represented by a second axis based on high and low values of the data displayed by the first display area.

25. The computer program product of claim 24, wherein said graphical user interface further comprises:
a sliding tool displayed in the second display area that is configured to allow a user to move the first tool and the second tool simultaneously relative to the third axis, while keeping a distance between the first tool and the second tool constant, wherein the sliding tool allows the user to change the first range of values displayed along the first axis in the first display area.

\* \* \* \* \*